United States Patent
Sato et al.

(10) Patent No.: US 7,418,823 B2
(45) Date of Patent: Sep. 2, 2008

(54) FREEZER, FREEZING METHOD AND FROZEN OBJECTS

(75) Inventors: Motohiko Sato, Tokyo (JP); Kazuhiko Fujita, Tokyo (JP)

(73) Assignee: Shounan Jitsugyou Corporation, Fukushima (JP)

( * ) Notice: Subject to any disclaimer, the term of this patent is extended or adjusted under 35 U.S.C. 154(b) by 611 days.

(21) Appl. No.: 10/513,232

(22) PCT Filed: May 8, 2003

(86) PCT No.: PCT/JP03/05790

§ 371 (c)(1),
(2), (4) Date: Dec. 20, 2004

(87) PCT Pub. No.: WO03/095911

PCT Pub. Date: Nov. 20, 2003

(65) Prior Publication Data

US 2006/0112699 A1    Jun. 1, 2006

(30) Foreign Application Priority Data

| Date | | |
|---|---|---|
| May 10, 2002 | (JP) | 2002-135684 |
| May 17, 2002 | (JP) | 2002-142629 |
| May 29, 2002 | (JP) | 2002-156057 |
| May 29, 2002 | (JP) | 2002-156058 |
| May 29, 2002 | (JP) | 2002-156059 |
| May 29, 2002 | (JP) | 2002-156060 |
| May 29, 2002 | (JP) | 2002-156061 |
| Jun. 7, 2002 | (JP) | 2002-167241 |
| Jul. 11, 2002 | (JP) | 2002-202111 |
| Jul. 11, 2002 | (JP) | 2002-202112 |
| Jul. 11, 2002 | (JP) | 2002-202113 |
| Jul. 11, 1920 | (JP) | 2002-202111 |

(51) Int. Cl.
*F25C 1/00* (2006.01)

(52) U.S. Cl. .................. 62/66; 62/78; 62/340

(58) Field of Classification Search .......... 62/62, 62/66–74, 340–356, 78, 264
See application file for complete search history.

(56) References Cited

U.S. PATENT DOCUMENTS

| | | | |
|---|---|---|---|
| 4,510,169 A * | 4/1985 | Linner | 427/4 |
| 5,024,830 A * | 6/1991 | Linner | 435/40.52 |
| 6,250,087 B1 | 6/2001 | Owada et al. | |
| 7,029,587 B2 * | 4/2006 | Andrews | 210/739 |

FOREIGN PATENT DOCUMENTS

| | | |
|---|---|---|
| JP | 2000-220940 | 8/2000 |
| JP | 2000-297977 | 10/2000 |
| JP | 2000-325062 | 11/2000 |
| JP | 2001-041632 | 2/2001 |
| JP | 2001-086967 | 4/2001 |
| WO | WO 01/24647 A1 | 4/2001 |

OTHER PUBLICATIONS

International Preliminary Examination Report for PCT/JP2003/005790 (In English).

* cited by examiner

*Primary Examiner*—William E Tapolcai
(74) *Attorney, Agent, or Firm*—Kilyk & Bowersox, P.L.L.C.

(57) ABSTRACT

The present invention provides a freezer capable of preventing/restraining quality of foods from being deteriorated, freezing method, and frozen objects manufactured using the freezer and freezing method. The freezer 10 comprises a freezer main body 101, a cluster fragmenting device 1A for fragmenting water clusters contained in the objects 5, a loading part 7 for loading the objects 5, a heat exchanger 8 and a cold gas supply device. The cold gas supply device comprises a dehumidifying device 11 for dehumidifying a cold gas heat-exchanged by the heat exchanger 8, and a fan 9 for circulating dehumidified cold gas to maintain the inside of the freezer 101 in a dry state. Further, the cluster fragmenting device 1A includes plural magnetic field generating devices 2 that imparts magnetic fields to the objects 5 containing water and changes the strength of magnetic fields with time elapsed.

43 Claims, 36 Drawing Sheets

FREEZER, FREEZING METHOD AND FROZEN OBJECTS

This application is a National Stage Application of PCT/JP2003/05790, filed May 8, 2003.

TECHNICAL FIELD

The present invention relates to a freezer, a freezing method and frozen objects.

BACKGROUND ART

Freezers, which freeze foods and the like at a temperature below the freezing point and store them therein, are widely used. A major purpose of such freezers is to prevent the foods from decaying etc., so as to store the object for a long period of time.

However, when a conventional freezer is used for freezing foods, there is a case where a quality of foods (for example, flavor, appearance, fragrant and the like) is deteriorated due to changes in microscopic structure of foods during freezing (for example, destruction of cells constituting the foods and the like). Also, some kinds of foods cannot endure frozen storage practically because of significant quality deterioration through freezing.

To solve the above problem, there are some proposals in which nuclear magnetic resonance is generated in hydrogen nucleus to freeze foods (for example, Japanese Laid-open Patent Publication No. 2000-325062). However, even when such method is employed, it is difficult to satisfactorily prevent the deterioration of the quality due to the freezing.

Ordinarily, frozen foods are unfrozen and served for eating. In the methods as described above, depending on the type of the food, the drip generation can not satisfactorily prevented during unfreezing. Further, in the case of noodles such as Chinese noodle and pasta, when they are frozen and then unfrozen to cook, the flavor and appearance thereof are easily degraded in general. Thus, the above-mentioned method cannot solve such problems.

DISCLOSURE OF THE INVENTION

An object of the present invention is to provide a freezer and a freezing method capable of preventing or restraining the quality of foods from being deteriorated, and to provide frozen objects manufactured by means of the freezer and the freezing method.

In order to achieve the above object, the present invention relates to a freezer for freezing an containing water, which comprises a magnetic field generating device that imparts magnetic field to the object to be frozen, at least in a process of cooling the object, and a cold gas supply device that supplies a cold gas with content of vapor less than an atmosphere.

The cold gas supply device may preferably include a dehumidifying device that dehumidifies the cold gas.

Further, the magnetic field generating device preferably changes a strength of the magnetic field with time elapsed.

Further, the cold gas supply device preferably maintains the inner pressure of the freezing compartment over the pressure outside the freezing compartment or higher than that.

Further, the freezer of the present invention preferably may comprise a freezing compartment that freezes the objects to be frozen, a transportation path that passes inside the freezing compartment therethrough and a transportation device that transports the objects to be frozen along the transportation path, wherein a magnetic field generating device is disposed in the freezing compartment and imparts magnetic field to the objects to be frozen being transported.

In this case, the magnetic field generating device preferably moves accompanying the movement of the transportation device.

Further, the freezer of the present invention preferably may comprise a first magnetic field generating device disposed in that freezing compartment, and a second magnetic field generating device that moves accompanying the movement of the transportation device.

In this case, the transportation path is preferably arranged to provide a spiral shape in the freezing compartment.

Further, the configuration of the freezing compartment is preferably of a tunnel-like shape.

Further, that magnetic field generating device preferably generates a steady state magnetic field with a constant strength of magnetic field.

Furthermore, the freezer of the present invention preferably comprises a rotating device that rotates the objects to be frozen relative to the magnetic field generating device.

Further, the freezer of the present invention preferably comprises a plural magnetic field generating device.

In this case, the freezing operation may preferably be arranged to control the magnetic field generating timing from at least one of the magnetic field generating devices to be different from the magnetic field generating timing of other magnetic field generating devices.

Further the freezer of the present invention may preferably comprise three or more magnetic field generating devices, wherein, in the freezing operation, the magnetic field generating timing from at least two of the magnetic field generating devices is controlled to be different from the magnetic field generating timing from one or more magnetic field generating devices other than those two magnetic field generating devices.

Further, the freezer of the present invention preferably comprises three or more magnetic field generating devices, wherein in the freezing operation, the magnetic fields generating timing of at least two of these magnetic field generating devices are controlled so as to be synchronized with each other and to be different from the magnetic fields generating timing of one or more devices other than those magnetic field generating devices; the combination of two or more of those magnetic field generating devices which are synchronized with each other in terms of the magnetic field generating timing may change with time elapsed.

Further, when plural magnetic field generating devices is included as described above, at least two magnetic field generating devices are preferably disposed so as to face to each other.

Further, plural magnetic field generating devices is preferably disposed so that the planes facing to the object to be frozen are disposed perpendicular to each other.

Further, a freezer of the present invention preferably comprises a loading part for loading the objects to be frozen, and at around near the loading part, the generation of the magnetic fields from the magnetic field generating devices may be arranged so that the direction of the magnetic lines may be controlled to rotate.

Further, the freezer of the present invention may preferably comprise a loading part for loading the object to be frozen, a heat exchanger and a circulation device for circulating cold gas.

In this case, the magnetic field generating devices are preferably disposed in the loading part or in the vicinity thereof.

Further, the freezer of the present invention preferably comprises a light irradiating device that irradiates the light to the object to be frozen.

In this case, the wavelength of the light is preferably 500 nm or shorter.

Further, the freezer of the present invention preferably may comprise a minus ion generating device that generates minus ions with electric voltage.

Further, the freezer of the present invention preferably may also comprise a minus ion generating device that generates minus ions by applying stress.

Further, the freezer of the present invention preferably may comprise a minus ion generating device that generates minus ions when a minus ion generating source is oscillated or vibrated.

Further, the magnetic field generating device is preferably controlled so as to impart the magnetic fields with predetermined strength to the object to be frozen placed inside the freezer for a predetermined period of time T [minute], and then to stop the generation of the magnetic field.

Further, the magnetic field generating device may also be controlled so as to impart the magnetic fields with predetermined strength to the object to be frozen placed inside the freezer for a predetermined period of time T [minute], and then to reduce the strength of the generated magnetic field.

Further, the magnetic field generating device may also be controlled so that the magnetic field generation of the magnetic field generating devices may be stopped when the temperature in the vicinity of the surface of the object to be frozen has reached to a predetermined value Ts [° C.].

Further, the magnetic field generating device may also be controlled so that the magnetic field strength of the magnetic field generating devices is reduced when the temperature in the vicinity of the surface of the object to be frozen reaches to a predetermined value Ts [° C.].

Further, assuming that the temperature in a vicinity of a surface of the objects to be frozen is Ts [° C.]; and estimated value of the temperature in a vicinity of the central area of the objects to be frozen is Tc [° C.], at a point of time when Tc−Ts reaches to a predetermined threshold value or less, the magnetic field generating devices may be controlled to stop the generation of the magnetic fields.

Further, assuming that the temperature in the vicinity of the surface of that objects to be frozen is Ts [° C.]; and estimated value of the temperature in the vicinity of the central area of that objects to be frozen is Tc [° C.], at a point of time when Tc−Ts reaches to a predetermined threshold value or less, that magnetic field generating devices may be controlled so as to reduce the strength of the generated magnetic fields.

In this case, the predetermined threshold value is preferably 30° C. or less.

Further, the Ts is preferably −60 to −20° C.

Further, in the freezer of the present invention, the magnetic field generating devices preferably generate alternate magnetic fields.

Further, the freezer of the present invention is preferably arranged so that the object to be frozen may be frozen in a state that the water clusters in the object to be frozen are fragmented.

Further, in the freezer of the present invention, the temperature inside the freezer in use is preferably −20° C. or lower.

Further, the magnetic field generating device preferably has low temperature resistance.

Further, the freezer of the present invention preferably comprises an energy imparting device that irradiates at least one of microwave, α-ray, far infrared ray, ultrasonic wave, ultraviolet light and minus ions, to the object to be frozen.

Further, in the present invention, the object to be frozen is preferably food.

Further, in the freezer of the present invention, the cold gas supply device preferably has a function to prevent frost from being accumulated inside the freezer.

Further, in the freezer of the present invention, the cold gas supply device may also be arranged to repeat start and stop of the operation at every predetermined time.

Further, the freezer of the present invention may comprise a humidity detecting device that detects the humidity inside the freezer, and the operation of the cold gas supply device is controlled corresponding to the detection result thereby.

Further, another aspect of the present invention relates to a freezing method characterized in freezing an object to be frozen using such a freezer as described above.

Further, another aspect of the present invention is a freezing method for freezing an object to be frozen containing water, which comprises a step of imparting a magnetic field generated by a magnetic field generating device to the object to be frozen in a freezing compartment for freezing the object while supplying a cold gas with content of water vapor less than those in atmosphere.

In this case, the cold gas is preferably the dehumidified air.

Further, the above method preferably comprises a step of varying the strength of the magnetic field with time elapsed at least during a process of cooling the object to be frozen.

It is also preferable to supply the cold gas so that the pressure value inside the freezing compartment may be maintained to a pressure value outside that freezing compartment, or higher.

Further, the magnetic field is preferably imparted to the object to be frozen while transporting the objects along a transportation path provided in the freezing compartment.

In this case, the magnetic field generating device preferably moves accompanying the movement of the transportation device.

In this case, said transportation path may be arranged to a spiral type in the freezing compartment.

Further, the configuration of the freezing compartment may be of a tunnel-like shape.

Further, in the above methods, the magnetic fields are preferably generated while the object to be frozen is rotating relatively to the magnetic field generating device.

Further, in the above methods, said magnetic fields are preferably generated from plural magnetic field generating devices.

Further, in the above methods, in the freezing operation, the magnetic field generating timing of at least one of the magnetic field generating devices is preferably controlled so as to be different from the magnetic field generating timing of other magnetic field generating devices.

In the case of cooling and freezing the object to be frozen while generating the magnetic fields from three or more magnetic field generating devices, the magnetic field generating timing from at least two of the magnetic field generating devices is preferably controlled so that the magnetic field generating timing may be different from that of one or more magnetic field generating devices other than the magnetic field generating devices.

Further, in the case of freezing operation having three or more magnetic field generating devices, the magnetic fields generating timing from at least two of the magnetic field generating devices is controlled so as to be synchronized with each other and to be different from the magnetic field generating timing from one or more magnetic field generating devices other than those two magnetic field generating devices, and the combination of the two or more magnetic field generating devices of which the magnetic fields generating timing are synchronized with each other may be arranged to vary with time.

Further, in the above method, a loading part for loading the object to be frozen is provided, and the magnetic fields generation from that magnetic field generating devices are preferably controlled so that the direction of the magnetic field lines rotates in the vicinity of the loading part.

Further, in the above method, that objects to be frozen are also preferably cooled while the light with a wavelength of 500 nm or shorter is irradiating to the objects to be frozen.

Further, the magnetic field generating device may be controlled so as to impart the magnetic fields with a predetermined strength to the object to be frozen placed inside the freezer for a predetermined period of time T [minute], and then, to stop the generation of that magnetic fields.

Further, the magnetic field generating device may be controlled so as to impart the magnetic fields with a predetermined strength to the object to be frozen placed inside the freezer for a predetermined period of time T [minute], and then, to reduce the strength of the generated magnetic fields.

Further, the magnetic field generating device may also be controlled so that the magnetic field generation of the magnetic field generating devices may be stopped when the temperature in the vicinity of the surface of the object to be frozen has reached to a predetermined value Ts [° C.].

Further, the magnetic field generating device may also be controlled so that the magnetic field strength of the magnetic field generating devices may be reduced when the temperature in the vicinity of the surface of the object to be frozen has reached to a predetermined value Ts [° C.].

Further, assuming that the temperature in the vicinity of the surface of that objects to be frozen is Ts [° C.], and estimated value of the temperature in the vicinity of the central area of that objects to be frozen is Tc [° C.], at a point of time when Tc–Ts reaches to a predetermined threshold value or less, the magnetic field generating devices may be controlled to stop the generation of the magnetic fields.

Further, assuming that the temperature in the vicinity of the surface of that objects to be frozen is Ts [° C.]; and estimated value of the temperature in the vicinity of the central area of that objects to be frozen is Tc [° C.], at a point of time when Tc–Ts reaches to a predetermined threshold value or less, the magnetic field generating devices may be controlled so as to reduce the strength of the generated magnetic fields.

In this case, the predetermined threshold value is preferably 30° C. or less.

Further, that Ts is preferably –60° C. to –20° C.

Further, in the above method, the magnetic field generating devices preferably generate alternate magnetic fields.

Further, in the above method, the freezer of the present invention is preferably arranged so that the object to be frozen is preferably frozen in a state that the water clusters in the object to be frozen are fragmented.

Further, in the above method, that objects to be frozen are preferably foods.

Further, a different aspect of the present invention is a frozen object obtained by freezing an object containing water, wherein the frozen object is obtained by using a freezer comprising: a magnetic field generating device that imparts magnetic field to the object to be frozen at least during a process for cooling the object to be frozen, and a cold gas supply device that supplies cold gas with a content of vapor less than the atmosphere.

The above-described or other objects, constitution and effect of the present invention will be further clarified by the following description of preferred embodiments based on the attached drawings.

DETAILED DESCRIPTION OF INVENTION

Hereinafter, the present invention will be described in detail based on the preferred embodiments.

Figure 1:
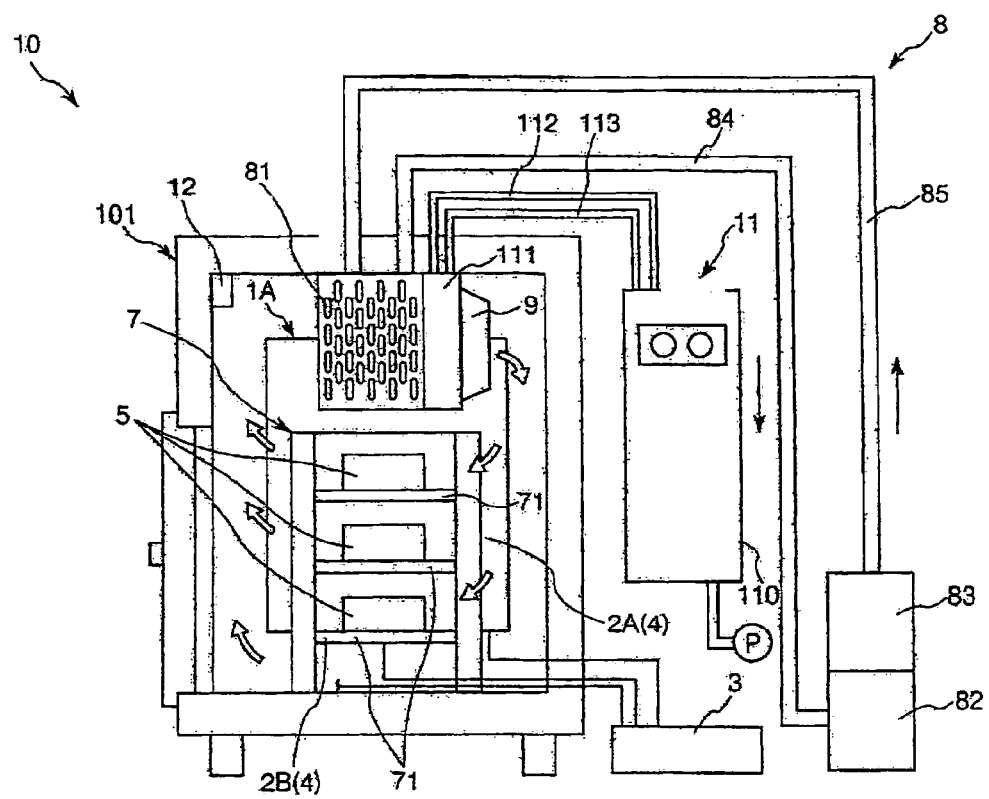
FIG. 1 is a schematic view showing a freezer in accordance with a first embodiment of the present invention.
Figure 2:
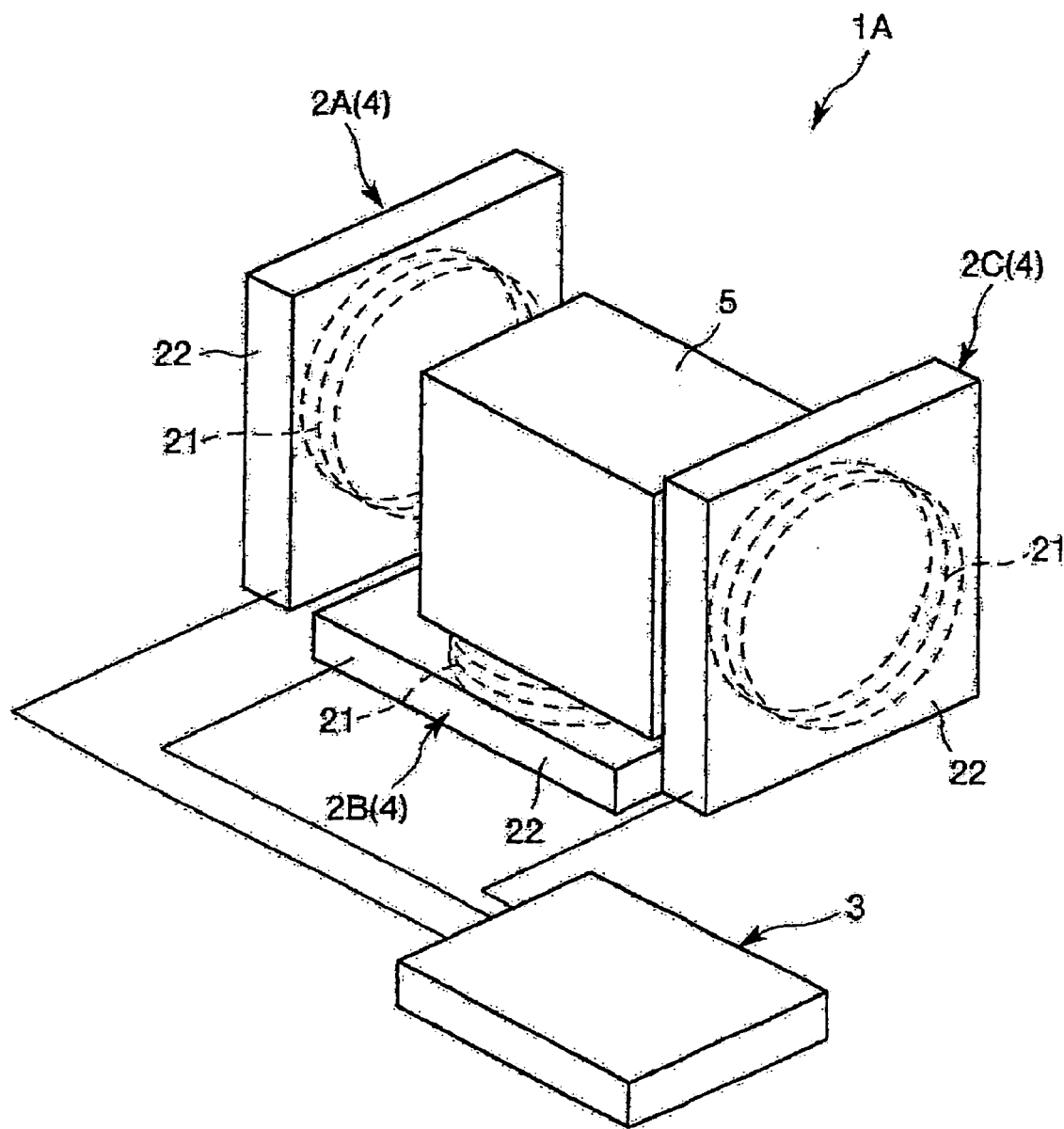
FIG. 2 is a schematic view showing constitution of a cluster fragmenting device included in the freezer shown in FIG. 1.
Figure 3:
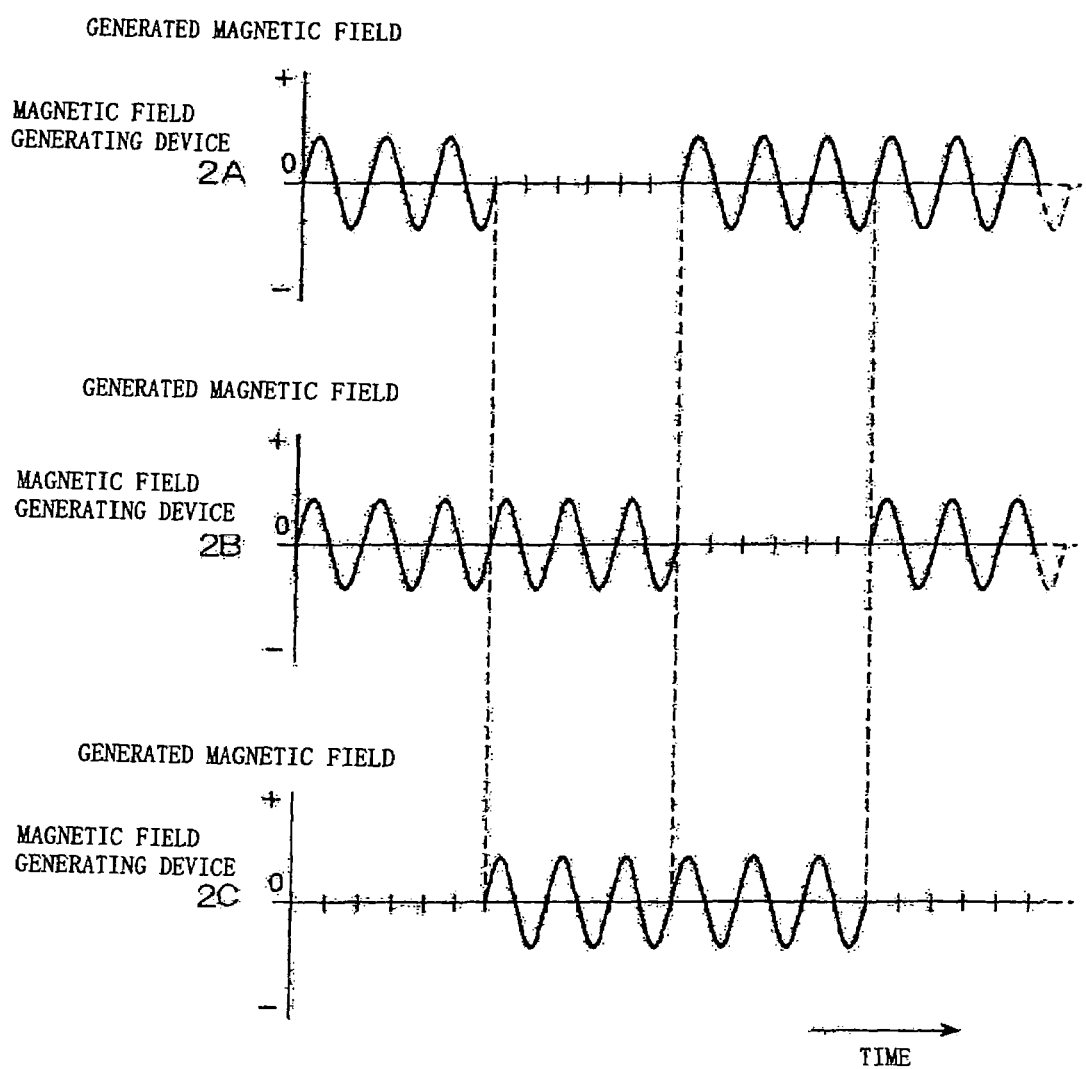
FIG. 3 is an example of a timing chart showing generating timing of magnetic fields from each of the magnetic field generating devices in the cluster fragmenting device.
Figure 4:
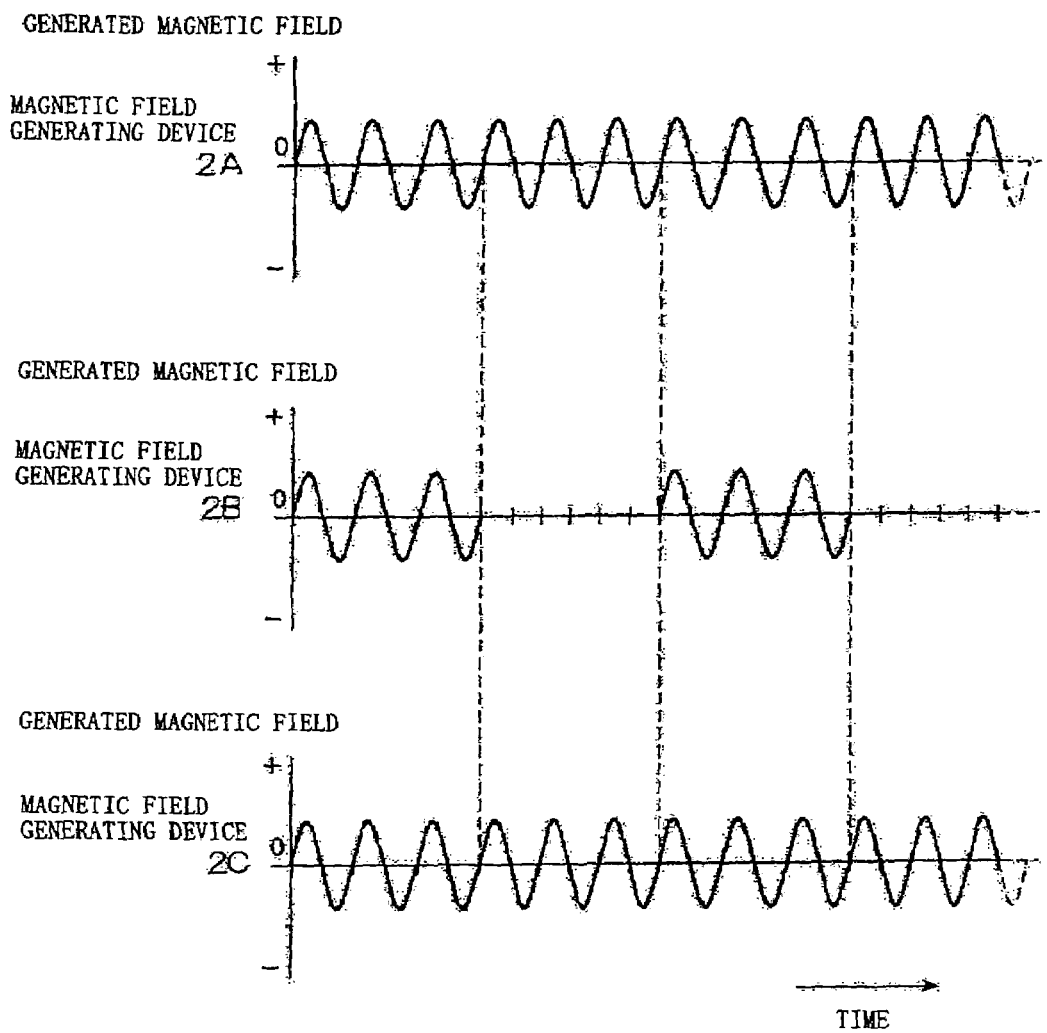
FIG. 4 is an example of a timing chart showing generating timing of magnetic fields from each of the magnetic field generating devices in the cluster fragmenting device.

FIG. 1 is a schematic view showing a freezer in accordance with a first embodiment of the present invention. FIG. 2 is a schematic view showing constitution of a cluster fragmenting device included in the freezer shown in FIG. 1. FIGS. 3 and 4 are examples of timing charts showing the magnetic field generating timing from each of the magnetic field generating devices in the cluster fragmenting device. In FIGS. 1 and 2 (also in FIGS. 5 to 33 described later), a part of devices is shown in an exaggerated manner, and the actual size is not always respected.

The freezer 10 of the present invention is used for objects 5 to be frozen containing water, and the freezer 10 has a function to freeze water clusters contained in the objects 5 in a fragmented state. In other words, the freezer 10 of the present invention has a function to freeze the objects 5 in a state that the hydrogen bond formed in water molecules and the like in the objects 5 are broken off partially.

In the description of the present invention, the wording "water clusters" device clusters mainly composed of water molecules. As for examples of "water clusters", water clusters, which are substantially composed of water molecules only, and clusters, which are composed mainly of water molecules and additionally includes components other than water (molecules other than water molecules such as ion) and the like can be enumerated.

As for the objects 5 to be frozen applied to the freezer 10 of the present invention, any objects may be included if the objects contain water therein. As for such objects 5 to be frozen, for example, foods (including beverages), animal feeding stuff, living tissue, (for example, blood (constituent of blood), organs and various kinds of tissues such as skin structure, muscular tissue, nervous tissue, bone tissue and cartilage tissue, and various kinds of cells such as generative cells), flowers, chemicals (including medical medicines and reagent) and objects including at least one of the above are listed. These objects may be applied to the freezer 10 as they are, or, for example, in a packaged or wrapped state. Among the above listed objects, foods are preferred as the objects 5 to be frozen. When a conventional freezer is used, some foods tend to degrade quality particularly (for example, flavor, appearance, fragrant and the like) and hardly endure frozen storage. In the foods, noodles such as Chinese noodle and pasta particularly tend to degrade the configuration (structure) and the flavor thereof when they are unfrozen and cooked after freezing. Also, foods such as green and yellow vegetables tend to loose their freshness. In the following descriptions, foods will represent the objects 5 to be frozen.

As shown in FIG. 1, the freezer 10 according to this embodiment comprises a freezer main body 101, a cluster fragmenting device 1A that fragments the water clusters included in the objects 5 to be frozen, a loading part 7 for loading objects 5 to be frozen, a heat exchanger 8 and a cold gas supply device that supplies cold gas (cold air) with a content of vapor less than the atmosphere. As for the cold gas, a gas comprised of any components may be used. For example, an inert gas such as He gas, Ar gas and $N_2$ gas, atmospheric air and the like may be used. When the atmospheric air (cold air) is used as the cold gas, the freezer 10 can be built into a relatively simple constitution. Also, when an inert gas is used as the cold gas, such adverse influence as oxidization and the like can be efficiently prevented even though the objects 5 to be frozen is what can be affected easily by oxidization and the like. In the following descriptions, it is assumed that the cold air is used as the cold gas. Further, in this embodiment, the cold gas supply device comprises a dehumidifying device 11 that dehumidifies cold gas (cold air) after heat exchange by the heat exchanger 8 and a fan 9 that circulates the dehumidified cold gas.

The loading part 7 is disposed inside the freezer main body 101.

In the constitution shown in FIG. 1, the loading part 7 comprises racks having a plural trays 71. Since the loading part 7 is of such racks, the objects 5 to be frozen, for example, can be disposed so as to ensure a large contact area between the cold gas circulating in the freezer main body 101 and the objects 5 to be frozen. Owing to this, for example, even when total amount of the objects 5 to be frozen is relatively large (even when a plurality of objects 5 are placed), the freezing of the objects 5 can be carried out efficiently.

The rack may be formed of any material. The rack is preferably formed mainly of a nonmagnetic metal such as aluminum and copper or a nonmagnetic material such as various kinds of plastics; particularly, the rack is more preferably formed of aluminum.

The heat exchanger 8 has an evaporator 81, a compressor 82 and a condenser 83. The evaporator 81 and the compressor 82, and the evaporator 81 and the condenser 83, are connected by refrigerant pipes 84 and 85 respectively. The heat exchanger 8 is filled with refrigerant.

Such a heat exchanger 8 has a function to maintain the inside of the freezer main body 101 at a low temperature by heat exchange between the inside and the outside of the freezer main body 101.

That is, in the heat exchanger 8, the refrigerant filled in the exchanger 8 deprives the heat from the inside of the freezer main body 101 by means of the evaporator 81, compressed by the compressor 82 and discharges the heat to the atmosphere by means of the condenser 83; thereby the inside of the freezer main body 101 is maintained to a low temperature.

As described above, according to this embodiment, the cold gas supply device has a dehumidifying device 11 to dehumidify the cold gas that is heat-exchanged by the heat exchanger 8, and a fan 9 that circulates the dehumidified cold gas.

The dehumidifying device 11 comprises a dehumidifying device 110 including a drier therein, a guide and discharge portion 111 having a collection port (not shown) for collecting the cold gas (ambient air in the freezer main body 101) and a discharge port (not shown) for discharging the cold gas, a guide path 112 for guiding the cold gas collected at the collection port to the dehumidifying device 110, and a transfer path 113 for transferring the cold gas, which is dehumidified by the dehumidifying device 110, to the guide and discharge portion 111. The guide and discharge portion 111 in the dehumidifying device 11 is disposed inside the freezer main body 101, connected to the evaporator 81 at the collection port and connected to the fan 9, which will be described later, at the discharge port.

The dehumidifying device 11, as such, has a function to maintain the inside of the freezer main body 101 in a dry state through dehumidifying the cold gas, which is circulated (supplied to the objects 5 to be frozen) in the freezer main body 101.

That is, the dehumidifying device 11 collects the cold gas (cold air), which is heat-exchanged by the heat exchanger 8 at the collection port of a guide and discharge portion 111, a guide path 112 guides the collected cold gas to the dehumidifying device 110, the dehumidifying device 110 dehumidifies the guided cold gas, a transfer path 113 transfers the dehumidified cold gas to the guide and discharge portion 111, and the discharge port of the guide and discharge portion 111 discharges the dehumidified cold gas to the inside of the freezer main body 101 via a fan 9; thus the inside of the freezer main body 101 is maintained in a dry state. The dehumidifying device 11 will be described later in detail.

The fan (circulation device) 9 has a function to circulate the dehumidified cold gas inside the freezer main body 101. Owing to this arrangement, since the difference in temperature and humidity at each portion inside the freezer main body 101 is small, the objects 5 to be frozen can be cooled and frozen at a further stable freezing speed.

The blowing speed (blowing amount) from the fan 9 is not particularly limited. For example, the blowing speed is preferably 0.5 to 10 m/s, more preferably 2 to 8 m/s.

When the blowing speed from the fan 9 is smaller than the above lower limit value, depending on the volume and the like of the freezer main body 101, variation of temperature and humidity at each portion inside the freezer main body 101 may not be controlled to a satisfactorily small level. On the other hand, when the blowing speed from the fan 9 exceeds the above upper limit value, the cluster fragmenting device 1A, which will be described later, may not function satisfactorily, and there may be a case that the objects 5 are frozen in a state where the water clusters in the objects 5 is not satisfactorily fragmented. As a result, the quality of the objects 5 to be frozen (foods) may not be satisfactorily prevented or restrained from degrading.

The temperature inside the freezer main body 101 in the operation of the freezer 10 is not particularly limited, if the temperature is low enough enabling to freeze even a part of the objects 5 to be frozen. However, for example, the temperature is preferably −20° C. or lower, more preferably −80 to −20° C., further more preferably −70 to −30° C. By controlling the temperature in the freezer main body 101 within a range of the above value, as described later, the objects 5 can be frozen in a state in which the water clusters contained in the objects 5 is fragmented satisfactorily and evenly (in a state the hydrogen bond is cut off efficiently). After freezing, even when the operation of the cluster fragmenting device 1A is stopped, or even when the frozen objects 5 are taken out of the freezer 10 of the present invention and placed in a conventional freezer (freezer without the cluster fragmenting device), the frozen objects 5 can be reliably maintained in a state that the clusters in the frozen objects 5 are fragmented for a satisfactory long period of time. Consequently, the quality of the objects 5 can be maintained for a satisfactory long period of time.

To the contrary, when the temperature inside the freezer main body 101 exceeds the above upper limit values, the objects 5 is hardly stored in a state that the water clusters are fragmented satisfactorily. As a result, the long-term stability improvement of the frozen objects 5 may be difficult to realize. On the other hand, when the temperature inside the freezer main body 101 is too low, the freezing speed of the objects 5 to be frozen becomes too fast. As a result, the objects 5 are frozen in a state that the fragmentation of the water clusters has not satisfactorily advanced yet, and the effect of the present invention may not be obtained satisfactorily.

Owing to the function of the cluster fragmenting device 1A, water clusters contained in the objects 5, which is disposed in the freezer main body 101, are fragmented. Hereinafter, the cluster fragmenting device 1A will be described in detail.

As shown in FIG. 1 and FIG. 2, the cluster fragmenting device 1A includes plural magnetic field generating devices 2 (magnetic field generating devices 2A, 2B and 2C), which impart a magnetic fields to the objects 5 to be frozen containing water, and a magnetic field control device 3, which controls the strength of the magnetic fields generated by each of the magnetic field generating devices 2. When a plurality of magnetic field generating devices are provided as above, the synergy action of which promotes the effect of the magnetic field generating devices and it will be described below.

First, a plural magnetic field generating devices 2 will be described. Since the magnetic field generating devices 2A, 2B and 2C have same constitution, the description will be made as to the magnetic field generating device 2A as the representative example.

The magnetic field generating device 2A includes a coil 21 and a nonmagnetic cover 22.

When the current passes through the coil 21, a magnetic field is generated around the coil 21, and the magnetic field is applied to the objects 5 to be frozen. Any type of the magnetic field generating device 2A may be employed if the magnetic field can be generated, and such a type of the magnetic field generating device as is capable of changing the strength of the magnetic fields with time elapsed is preferable. If a magnetic field generating device 2A can change the strength of the generated magnetic fields with time, accordingly the strength of the magnetic fields (magnetic force received by the objects 5 to be frozen), which is imparted to the objects 5 placed in the vicinity of the magnetic field generating device 2A, can be changed with time elapsed. As a result, in the objects 5 to be frozen, the hydrogen bonds, which are formed between water molecule and water molecule, are cut off efficiently, and the water clusters are fragmented efficiently. Also, the changing strength with the time elapsed of the magnetic fields (magnetic force received by the objects 5 to be frozen) prevents the hydrogen bonds from reforming between the water molecules, and prevent efficiently hydrogen ion ($H^+$) and hydroxide ion ($OH^-$) contained in the water from combining with each other. Consequently, the state in which the water clusters are fragmented can be maintained efficiently. The strength of the magnetic fields generated by the magnetic field generating device 2A can be changed by, for example, controlling the direction and the amount of the current passing through the coil 21.

When the water clusters are fragmented in this way, the quality such as, for example, flavor, appearance and fragrance of the objects 5 to be frozen (food) is hardly deteriorated.

Also as described above, the inside of the freezer main body 101 under the operation is controlled to a temperature capable of freezing at least a part of the objects 5 to be frozen. Owing to this, the water clusters contained in the objects 5 to be frozen are solidified in a fragmented state. Accordingly, the crystals of ice formed in the objects 5 to be frozen are also fragmented (small in diameter of the crystal).

When a conventional freezer is used for freezing of foods, the quality of the foods (for example, flavor, appearance and fragrance etc) is occasionally deteriorated. It is conceivable that the deterioration of the quality of foods like this is caused by changes in the microscopic structure of foods during freezing (for example, destruction of cells constituting foods or the like). The inventor of the present invention has found that the changes in the microscopic structure are caused by grown-up ice, which is formed mainly during freezing.

As described above, when the freezer 10 of the present invention is used, the crystals of the ice formed in the objects 5 to be frozen are fragmented. Owing to this, according to the present invention, the microscopic structure in the objects 5 before being frozen can be efficiently prevented or restrained from being changed from the structure before freezing due to freezing (the cells constituting the objects can be efficiently prevented from being destroyed). As a result, it becomes possible to maintain the quality of the objects 5 satisfactorily and store the objects 5 for extremely long period of time. Also, since the cells can be efficiently prevented or restrained from being distracted during freezing, dripping occurrence can be prevented as well when unfreezing the objects 5.

Figure 35:
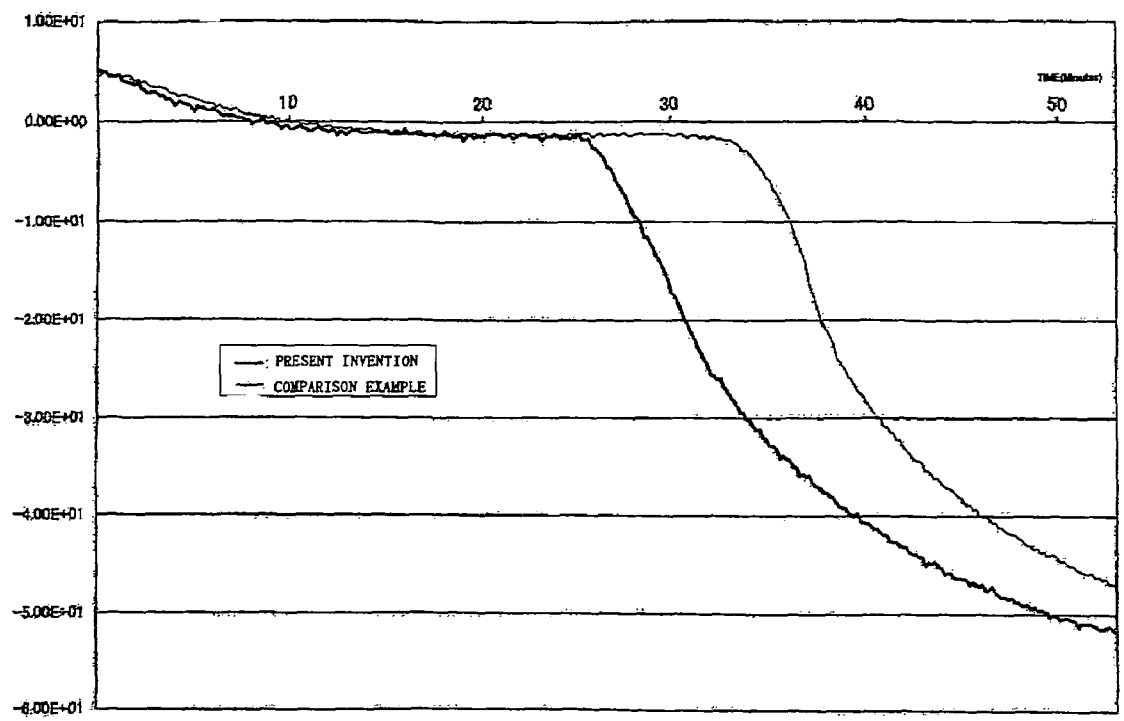
FIG. 35 is a graph showing temperature changes in an object to be frozen (pork) with the time elapsed when the object is frozen.
Figure 36:
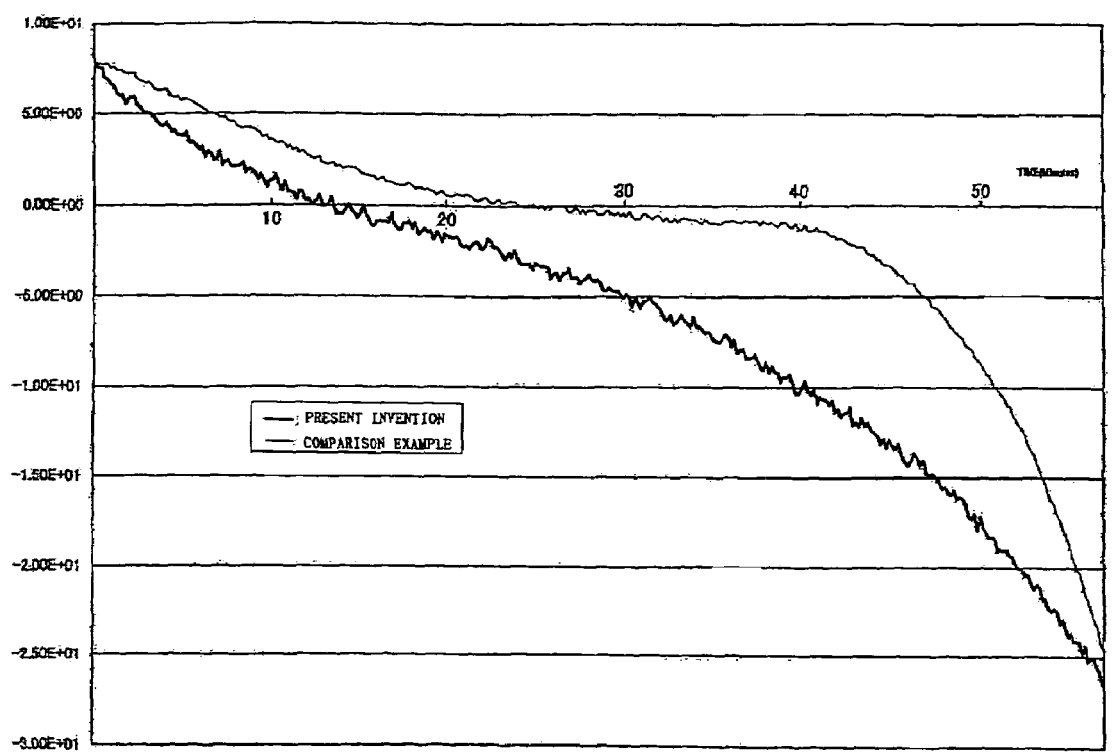
FIG. 36 is a graph showing temperature changes in an object to be frozen (hard type tofu) with the time elapsed when the object is frozen.

Further, the inventor found the fact that, by freezing the objects to be frozen while giving magnetic fields to the objects, the latent heat during freezing of the objects to be frozen becomes smaller compared to the case of using an ordinary freezer, and thus the objects to be frozen can be freezed effectively. That is, in the case where the objects to be frozen are feezed at a substantially constant freezing speed, the temperature of the objects to be frozen reaches around to a certain value in a predetermined time generally, in solidification of water in the objects. However, by using the freezer of the present invention, the period of time required for the water to be frozen from the start of freezing to the completion thereof can be reduced as shown in FIG. 35. Accordingly, the temperature of the objects to be frozen can be lowered in a shorter period of time. The tendency described above can be more enhanced by appropriate selection of, materials as the objects to be frozen, operational conditions of the freezer, and the like. In some extreme cases, as shown in FIG. 36, the latent heat during freezing of the objects to be frozen is not observed substantially. Owing to this, the quality deterioration due to freezing of the objects can be more efficiently prevented.

The current passing through coil 21 may be DC or AC current. Particularly, when the current through the coil 21 is AC current, the strength of the magnetic fields, which is generated by the magnetic field generating device 2A, can be changed relatively readily.

The constitution of the coil 21 shown in the figure has a circular shape. However, the configuration of the coil 21 is not particularly limited thereto. The coil 21 may be formed into any configuration such as, for example, a baseball coil or a rectangular coil, etc.

The nonmagnetic cover 22 has a function to protect and fix the coil 21.

As for component materials of the nonmagnetic cover 22, various kinds of resin materials or the like, such as, for example, acrylic resin and silicone resin can be enumerated.

The magnetic field generated by the magnetic field generating device 2A is not particularly limited, but for example, alternate magnetic fields are preferably employed. Owing to this, the strength of the magnetic fields in the objects 5 to be frozen can be changed readily. The water clusters in the objects 5 can be fragmented more efficiently.

The frequency of the alternate magnetic fields is not particularly limited, but for example, preferably set to 20 to 25000 Hz, more preferably set to 40 to 1200 Hz. When the frequency of the alternate magnetic fields is a value within the above range, the water clusters in the objects 5 to be frozen can be fragmented more efficiently.

The maximum strength (absolute value) of the magnetic fields generated by the magnetic field generating device 2A is not particularly limited, but for example, the magnetic fields in the objects 5 to be frozen is preferably set to 100 to 12000 Gs, more preferably set to 300 to 7000 Gs. When the strength of the magnetic fields generated by the magnetic field generating device 2A is less than the lower limit value, the variation of the strength of the magnetic fields in the objects 5 hardly widened satisfactorily, resulting in that water clusters in the objects 5 to be frozen may not be fragmented to a satisfactorily small size depending on the kind of the objects 5 to be frozen etc. On the other hand, when the strength of the magnetic field generated by the magnetic field generating device 2A exceeds the above upper limit value, it leads to a larger size of the apparatus. Also, when the strength of the magnetic field, which is generated by the magnetic field generating device 2A, exceeds the above upper limit value, such tendency that the voltage necessary for generating the magnetic fields becomes higher, and accompanying that, the heat release value from the coil becomes larger resulting in a reduced cooling efficiency.

Further, the magnetic field generated by the magnetic field generating device 2A is not limited to the above-described alternate magnetic field. For example, the magnetic fields generated by magnetic field generating device 2A may be intermittent fields. In this case, preferable ranges of frequency and the maximum strength and the like of the generated magnetic fields are same to those in the above. Further, as for the magnetic field generated by the magnetic field generating device 2A, the strength may be constant (steady state magnetic field).

The description has been made as to the magnetic field generating device 2A. The magnetic fields generating devices 2B and 2C also have the same constitution and function as those of the magnetic field generating device 2A.

As described above, in the present invention, the freezer preferably has a plural magnetic field generating devices. By having a plural magnetic field generating devices, for example, as described later in detail, the generating pattern of the magnetic fields, which are generated by each of the magnetic field generating devices, can be controlled independently from each other by the magnetic field control devices. Owing to this, the magnetic fields generated (the sum of the magnetic fields generated by each of the magnetic fields generating devices 2) for the entire cluster fragmenting device can be readily controlled to the magnetic fields having desired configuration, size and strength. As a result, the water clusters in the objects to be frozen can be fragmented more efficiently.

As described above, the freezer of the present invention has a plural magnetic field generating devices, i.e. preferably two or more magnetic field generating devices, more preferably three or more magnetic field generating devices. Owing to this, water clusters in the objects to be frozen can be fragmented more efficiently.

Also, in the magnetic field generating devices constituting the cluster fragmenting device 1A, at least two magnetic field generating devices are preferably disposed so as to face to each other (in FIG. 2, the magnetic field generating device 2A and the magnetic field generating device 2C are disposed so as to face to each other being interposed by the placing space for the objects to be frozen. Owing to this, water clusters in the objects 5 to be frozen can be fragmented more efficiently.

Further, for example, in each of the magnetic field generating devices 2, the configuration and size of the coils 21 may be the same or different from each other. Furthermore, in each of the magnetic field generating devices 2, the strength, cycle, output time duration, phase and the like of the generated magnetic fields may be the same with or different from each other.

The magnetic field generating devices 2 are preferably disposed in the loading part 7 or adjacent thereto. Owing to this, the water clusters in the objects 5 to be frozen can be fragmented more efficiently.

The distance (the shortest distance) between the magnetic field generating devices 2 (magnetic field generating device 2A, magnetic field generating device 2B or magnetic field generating device 2C) and the objects 5 to be frozen varies depending on the strength of the magnetic fields or the like generated by the magnetic field generating devices 2, however, for example, it is preferably 150 cm or less, more preferably 50 cm or less, and still more preferably 20 cm or less. Depending on the strength of the magnetic fields or the like generated by the magnetic field generating devices 2, when the distance (the shortest distance) between the magnetic field generating devices 2 and the objects 5 to be frozen exceeds 150 cm, there may be a case where the water clusters in the objects 5 to be frozen are hardly fragmented into a satisfactorily small size.

As shown in the figure, in this embodiment, the magnetic field generating device 2B and the loading part 7 (particularly, tray 71) are integrally formed. Owing to this, the distance between the objects 5 to be frozen and the magnetic field generating devices 2 can be always maintained in a short distance. As a result, the effect of fragmenting the clusters can be further increased. Further, since the number of magnetic field generating devices 2, which are provided as separate members can be reduced, it is advantageous for big capacity increase and saving a space of the freezer.

Still further, each of the magnetic field generating devices 2 preferably has low temperature resistance performance to withstand the temperature in the freezer main body 101. Owing to this, since the durability of the magnetic field generating devices 2 is enhanced, the freezer 10 demonstrates a stable effect for a long period of time. Also, since the magnetic field generating devices do not have to be exchanged (or, the number of exchanges of the magnetic field generating devices can be reduced), the maintenance of the freezer 10 can be readily carried out.

Next, the magnetic field control device 3 will be described.

The magnetic field control device 3 has a function to control the strength of the magnetic fields independently, which are generated by each of the magnetic field generating devices 2 (magnetic field generating device 2A, 2B and 2C). Owing to this, the timing to generate the magnetic fields from at least one of the magnetic field generating devices 2 (generating pattern of the magnetic fields) can be controlled so as to be different from the magnetic field generating timing from the other magnetic field generating devices 2. In such an arrangement that the magnetic field generating timing is different from each other among a plurality of magnetic field generating devices 2, the water clusters in the objects 5 to be frozen can be fragmented more efficiently. That is, the hydrogen bonds, which are formed by the moisture molecules or the like in the objects 5 to be frozen, can be cut off efficiently. As a result, the objects 5 can be frozen while preventing and restraining the quality thereof from being deteriorated satisfactorily.

The magnetic field control device 3 may have a variable function of, for example, the direction (polarity), frequency and amount of the current passing in the coil 21 of each magnetic field generating device 2 (magnetic field generating devices 2A, 2B and 2C) Owing to this, the magnetic field strength generated by each magnetic field generating device 2 can be controlled more precisely, thus the overall magnetic field strength generated in the entire cluster fragmenting device 1A (the sum of the magnetic fields generated by each of the magnetic field generating devices 2) can be controlled readily so that to meet a desired configuration, size and strength. As a result, the water clusters in the objects 5 to be frozen can be fragmented more efficiently.

The generating timing (generating pattern) of the magnetic fields from each of the magnetic field generating devices 2 can be controlled, for example, as shown in FIG. 3.

That is, alternating current voltage is applied to the coils 21 to make the magnetic field generating device 2A and the magnetic field generating device 2B to generate the magnetic. At this time, the coil 21 of the magnetic field generating device 2C is not applied with the voltage (no power distributed). And it is arranged so that the magnetic field generating timing from the magnetic field generating device 2A and the magnetic field generating timing from the magnetic field generating device 2B are synchronized with each other. Accompanying the changes in the magnetic fields, which are generated by the magnetic field generating device 2A and magnetic field generating device 2B, the magnetic fields in the objects 5 to be frozen change, and the water clusters in the objects 5 to be frozen are fragmented.

After supplying the power to the coils 21 of the magnetic field generating device 2A and the magnetic field generating device 2B for predetermined time, the power supply to the coil 21 of the magnetic field generating device 2A is suspended, and the power supply to the coil 21 of the magnetic field generating device 2C is started. That is, the supply of alternating current voltage is switched from the coil 21 of the magnetic field generating device 2A to the coil 21 of the magnetic field generating device 2C. Owing to this, the directions of the magnetic fields imparted to the objects 5 to be frozen is switched in terms of the entire cluster fragmenting device 1A. The direction of the magnetic field lines in the vicinity of the objects 5 to be frozen changes. In this way, the magnetic fields in each portion of the objects 5 to be frozen can be changed all-around, and the clusters in the objects 5 to be frozen are accordingly fragmented efficiently.

Then, same as the above, the power is supplied to the coils 21 of the magnetic field generating device 2B and the magnetic field generating device 2C for a predetermined time. Owing to this, the clusters in the objects 5 to be frozen are further fragmented.

Then, the power supply to the coil 21 of the magnetic field generating device 2B is suspended, and the power supply to the coil 21 of the magnetic field generating device 2A is started. That is, the supply of the alternating current voltage is switched from the coil 21 of the magnetic field generating device 2B to the coil 21 of the magnetic field generating device 2A. Owing to this, the directions of the magnetic fields imparted to the objects 5 to be frozen is switched in terms of the entire cluster fragmenting device 1A, and the direction of the magnetic field lines in the vicinity of the objects 5 to be frozen changes. Owing to this, the clusters in the objects 5 to be frozen are fragmented further efficiently.

Then, same as the above, the coils of the magnetic field generating devices on which alternating current voltage is applied are repeatedly changed. Owing to this, the directions of the magnetic field lines and the strength of the magnetic fields in the objects 5 to be frozen change with time elapsed. As described above, by changing the direction of the magnetic field lines and the strength of the magnetic fields in the objects 5 to be frozen with time elapsed, in each portion of the objects 5 to be frozen, the water clusters can be fragmented more uniformly.

As described above, the freezer 10 according to this embodiment repeats the operation and suspension with respect to each of the magnetic field generating devices 2. The inventor found the fact that freezing of moisture in the objects 5 was progressed preferentially on the timing of suspending the magnetic field generating devices 2 in operation (i.e., magnetic field generating devices 2 for generating the magnetic fields were changed), despite that the temperature inside the freezer main body 101 was maintained at a substantially constant level. The reason of this is conceivable as described below.

That is, in a state where the magnetic fields are generated from the magnetic field generating devices 2, the moisture molecules and the like in the objects 5 to be frozen are vibrating due to the imparted magnetic fields, accordingly even when the temperature thereof reaches a freezing temperature or below, the objects 5 are not frozen but stay in a super-cooled state. In such a state, when the operation of the magnetic field generating devices 2, which is generating the magnetic fields, is suspended, the moisture in the objects 5 is frozen at once. According to this embodiment, since the magnetic fields are repeatedly turned ON and OFF as described above, the freezing of the objects 5 proceeds swiftly. Also, since the magnetic fields are repeatedly turned ON and OFF in turn with respect to each of the magnetic field generating devices 2 as described above, the freezing of the objects 5 proceeds uniformly in each portion. Owing to this, the objects 5 are frozen while the quality thereof is satisfactorily maintained.

Further, as described above, according to this embodiment, the magnetic field generating timing from two magnetic field generating devices 2 is synchronized with each other, and the combination of the magnetic field generating devices 2, which are synchronized with each other is changed with time elapsed. Thereby the generation of the magnetic fields is controlled so that the magnetic field lines rotate in the vicinity of the objects 5 to be frozen. Owing to this, in each portion in the objects 5, the water clusters can be fragmented more uniformly.

In the timing chart shown in FIG. 3, in the two magnetic field generating devices, which are synchronized with each other, the phases of the generated magnetic fields coincide always with each other. However, the phases may not always coincide with each other. For example, in the two magnetic field generating devices 2, which are synchronized with each other, the phases thereof may be shifted by a half of the wavelength or so.

Further, the maximum strength of the magnetic fields generated by each of the magnetic field generating devices 2 may be substantially equal to each other, or may be different from each other among the magnetic field generating devices 2.

Furthermore, the cluster fragmenting device 1A does not have to be always operated. For example, after freezing the objects 5 is completed, the operation of the cluster fragmenting device 1A may be terminated.

Still further, the generating timing (generating pattern) of the magnetic fields from each of the magnetic field generating devices 2 may be controlled, for example, as shown in FIG. 4.

That is, while continuously generating the alternate magnetic fields of a predetermined frequency from the magnetic field generating devices 2A and 2C, the alternate magnetic field of a predetermined frequency may be generated discontinuously (intermittently) from the magnetic field generating device 2B.

In this case, the frequency of the alternate magnetic fields generated from the magnetic field generating devices 2 may be the same each other, or may be different from each other.

Furthermore, the present invention is characterized by being provided with a cold gas supply device that supplies cold gas containing less content of vapor than the atomosphere. As described above, since the cold gas containing less content of vapor is supplied, the inside of the freezer (freezing compartment) can be maintained in a dry state. Accordingly, it is possible to prevent the clusters in the objects to be frozen from growing up due to moisture or the like coming into the inside of the objects to be frozen from the outside. That is, in the present invention, the effect by the cluster fragmenting device (magnetic field generating devices) as described above and the effect by the cold gas supply device function works in a synergic way. Thus, the objects can be frozen in a state that the water clusters in the objects are fragmented efficiently.

Further, since the freezer has the cold gas supply device, frost is efficiently prevented from accumulating on the inner surface of the freezer, and the cooling efficiency deterioration of the freezer can be efficiently prevented.

Further, since the freezer has the cold gas supply device, the frost is prevented from accumulating on the surface of the objects to be frozen. Accordingly, any harmful effects occurrence caused by the accumulation of the frost as described below can be efficiently prevented.

That is, when the frost (water), which has a relatively large specific heat, accumulates on the surface of the objects to be frozen, the freezing speed of the objects to be frozen in the vicinity of a portion where the frost has accumulated is reduced. As a result, the time from a point when the objects to be frozen are placed in the freezer to a point when the freezing is completed becomes longer. As a result, there may be a case that the quality deterioration of the objects can not be prevented satisfactorily. Also, when the frost accumulates on a part of the surface of the objects to be frozen, the freezing speed largely differs in the area vicinity of the accumulated frost and in the area other than that. As a result, there may be a case that the quality deterioration of the objects to be frozen can not be prevented satisfactorily. To the contrary, according to the present invention, the problem as described above can be efficiently prevented from rising.

If the content of water vapor of the cold gas supplied by the cold gas supply device is smaller than the content of water vapor (content) of the atmosphere, the content of water vapor of the cold gas is not particularly limited. The content of water vapor of the cold gas is preferably $4.0 \times 10^{-3}$ g/L or less, more preferably $3.0 \times 10^{-3}$ g/L or less, and further more preferably $2.0 \times 10^{-4}$ g/L or less. Owing to this, the above-described effects are further remarkable.

Further, particularly, according to this embodiment, the cold gas supply device has a fan (circulation device) 9 that circulates the cold gas (cold air) inside the freezer main body 101 and a dehumidifying device 11 that dehumidifies the circulated cold gas. Owing to this, the cold gas of a smaller content of water vapor can be efficiently supplied to the objects 5 to be frozen. As a result, the above-described effects are further remarkable.

Also, since the dehumidifying device 11 is provided, the ambient gas in freezer main body 101 can be repeatedly used (circulated) as the above-described cold gas. Owing to this, the gas supply from the outside of the freezer main body 101 is not required (or, the feed rate of the gas from the outside of the freezer main body 101 can be reduced) during operation or the like of the freezer 10. As a result, the energy efficiency of the freezer 10 is particularly improved and the structure of the freezer 10 can be simplified.

Further, according to this embodiment, a pump P is connected to the dehumidifying device 11 (dehumidifying device 110). Owing to this, the volume of displacement into the freezer main body (freezing compartment) 101 by the dehumidifying device 11 can be made larger than the volume of air-intake from the freezer main body (freezing compartment) 101 by the dehumidifying device 11. That is, according to this embodiment, the pressure inside the freezer main body 101 can be relatively larger than the pressure outside of freezer main body 101. Owing to this, the moisture can be efficiently prevented from coming into the inside of the freezer main body 101 (particularly, the moisture is prevented from coming in when the objects 5 are placed therein, or taken out therefrom), accordingly the above-described effects can be further remarkable. The pump P may or may not always perform during the operation of the freezer 10. For example, it may be arranged so that, during the operation of the freezer 10, the pump P may be controlled so as to perform in the initial stage (or, a predetermined period of time from a point of time when door, not shown, is operated to be opened or closed), and then, stopped. Also, it may be arranged so that the freezer 10 has an pressure sensor, not shown, that detects the pressure in the freezer main body 101, and based on the pressure value detected by the pressure sensor, the operation of the pump P is controlled. As described above, by controlling the operation of the pump P, the above-described effects are satisfactorily exercised, and the energy can be saved.

During the operation of the freezer 10, the pressure inside the freezer main body (freezing compartment) 101 is preferably maintained to, compared to the pressure outside the freezer main body (freezing compartment) 101, a pressure higher by 100 Pa or more, more preferably-to a pressure higher by 1000 Pa or more, and further preferably to a pressure higher by 3000 Pa or more. Owing to this, the above-described effects are further remarkable.

Further, during the operation of the freezer 10, the pressure inside the freezer main body (freezing compartment) 101 is preferably $1.02 \times 10^5$ Pa or higher, more preferably $1.03 \times 10^5$ Pa or higher, and further preferably $1.05 \times 10^5$ to $8 \times 10^5$ Pa. Owing to this, the above-described effects are further remarkable.

Further, the guide and discharge portion 111 in the dehumidifying device 11 preferably has the low temperature resisting performance capable of enduring the temperature inside freezer main body 101. Owing to this, the durability of the dehumidifying device 11 is increased. Accordingly, the freezer 10 demonstrates a stable effect for a long period of time. Further, since the guide and discharge portion 111 does not have to be exchanged (or, the number of exchanges of the guide and discharge portion 111 can be reduced), the freezer 10 can be maintained easily.

Generally, the density of a gas in a low temperature state is larger than the density thereof in a high temperature state. Accordingly, in the freezing compartment (freezer main body), there may be a case that the temperature in the upper portion is higher than the temperature in the lower portion. On the other hand, in the freezer according to this embodiment, the fan (circulation device) 9 and the guide and discharge portion 111 of the dehumidifying device 11 are provided in an upper portion (ceiling portion) of the freezer 10 (freezer main body 101). Owing to this, since the ambient air (gas) in the freezer main body 101 can be agitated efficiently, the difference in the temperature in each portion can be reduced to a small level. Also, for example, even when the containing volume of the freezer main body 101 is relatively large, the temperature difference in each portion in the freezer main body 101 can be reliably reduced to a small level.

The cold gas supply device, as described above, may or may not always perform during the operation of the freezer 10. For example, it may be arranged so that, during operation of the freezer 10, the cold gas supply device is controlled to perform in the initial stage, and then stopped (for example, the cold gas supply device may be controlled in the same manner as that of the magnetic field generating devices in 15th to 17th embodiments, which will be described later). Or, it may be controlled so that the operation and suspension are repeated at every predetermined point of time. Also, as shown in FIG. 1, it may be arranged so that the freezer 10 has a humidity sensor (humidity detector) 12 that detects the humidity in the freezer main body 101, and based on the humidity value detected by the humidity sensor 12, the operation of the cold gas supply device (at least either one of the fan 9 or the dehumidifying device 11) is controlled. As described above, by controlling the operation of the cold gas supply device, the above-described effects can be satisfactorily exercised as well as the energy can be saved.

Further, the cluster fragmenting device 1A preferably has an energy imparting device 4, which irradiates at least one of microwaves, $\alpha$-rays, far infrared rays, ultrasonic waves, ultraviolet light and minus ions. When the cluster fragmenting device 1A has such energy imparting device 4, the water clusters in the objects 5 to be frozen can be fragmented further efficiently. In the case that the energy imparting device 4 is what irradiates microwaves, the microwaves are preferably irradiated intermittently (discontinuously). Particularly, repetitive operation of the microwave irradiation for 0.1 to 10 seconds and the microwave suspension for 0.1 to 20 seconds are preferred. Owing to this, the water clusters in the objects 5 to be frozen can be fragmented further efficiently.

In the constitution shown in the figures, each of the magnetic field generating devices 2A, 2B, 2C and the energy imparting device 4 are formed integrally.

When the energy imparting device 4 is what irradiates far infrared rays, as component materials for the energy imparting device 4, ceramics such as, for example, alumina ($Al_2O_3$), magnesia (MgO), zirconia ($ZrO_2$), titania ($TiO_2$), silica dioxide ($SiO_2$), chromium oxide ($Cr_2O_3$), ferrite ($FeO \cdot Fe_3O_4$), spinel ($MgO \cdot Al_2O_3$), ceria ($CeO_3$), beryllia (BeO), $Na_2O_3$, $SnO_2$, SiC, ZrC, TaC, $ZrB_2$, and ores such as tourmaline and the like can be listed. Ceramics among these component materials are preferably employed as the component material for the energy imparting device 4, from the point that far infrared rays can be irradiated with a remarkable efficiency.

Further, in the case that the energy imparting device 4 is what irradiates ultrasonic waves, as the energy imparting device 4, for example, an ultrasonic transducer or the like may be employed.

Furthermore, in the case that the energy imparting device 4 is what irradiates the minus ions, as for the component material for the energy imparting device 4, for example, ores such as tourmaline, davidite, brannerite, uraninite, ningyoite, autunite, carnotite, thuyamunite, metathuyamunite, francevillite, thorite, coffinite, samarskite, thorianite, thorogummit, MOZUNA and the like, $BaTiO_3$, $PbTiO_3$, $PbZrO_3$, $Pb(Zr,Ti)O_3$, $KNbO_3$, $KTaO_3$, $K(Ta,Nb)O_3$, $LiNbO_3$, Rochelle salt, glycine sulfate, potassium phosphate, calcium strontium propionate and the like can be listed. When the energy imparting device 4 is what irradiates minus ions, the objects 5 to be frozen can be prevented or restrained from being oxidized or the like, thus the quality can be maintained. Owing to this, for example, in the case that the objects 5 to be frozen are foods, even when stored for a longer period of time, remarkable flavor and the like can be maintained.

Further, the energy imparting device 4 preferably has the low temperature resisting performance capable to withstand the temperature inside the freezer main body 101. Owing to this, since the durability of the energy imparting device 4 is improved, the freezer 10 demonstrates stable effect for a long period of time. Also, since the energy imparting device 4 may not be exchanged (or, the number of exchanges of the energy imparting device 4 can be reduced), the freezer 10 can be maintained easily.

By freezing objects using the freezer as described above, frozen objects according to the present invention can be obtained. Since the water clusters are frozen in a fragmented state, the frozen objects according to the present invention which are obtained in this way can preserve a satisfactorily high quality in comparison with the state before freezing. Also, since the frozen objects according to the present invention is frozen in a state that the water clusters are fragmented, even when stored for relatively long period of time, the quality can be satisfactorily prevented or restrained from being deteriorated.

Further, the freezer 10 may be provided with an ozone supply device (not shown), which supplies ozone inside the freezer main body 101. Owing to this, by the sterilizing function and the like of the ozone supplied inside the freezer main body 101, the objects 5 to be frozen (frozen objects) can be stored stably for a longer period of time. Accordingly, the objects 5 to be frozen (frozen objects) can be more efficiently prevented from being decayed, changed in quality or the like. As for the ozone supply device, although not particularly limited, for example, an ozone generator (for example, an ultraviolet light lamp or the like), which generates ozone by means of various kinds of reactions such as photochemical reaction, electrolytic reaction, discharge reaction, radiation reaction and the like, or a steel cylinder containing ozone or the like may be used.

Next, a second embodiment of the freezer and the freezing method of the present invention will be described.

Figure 5:
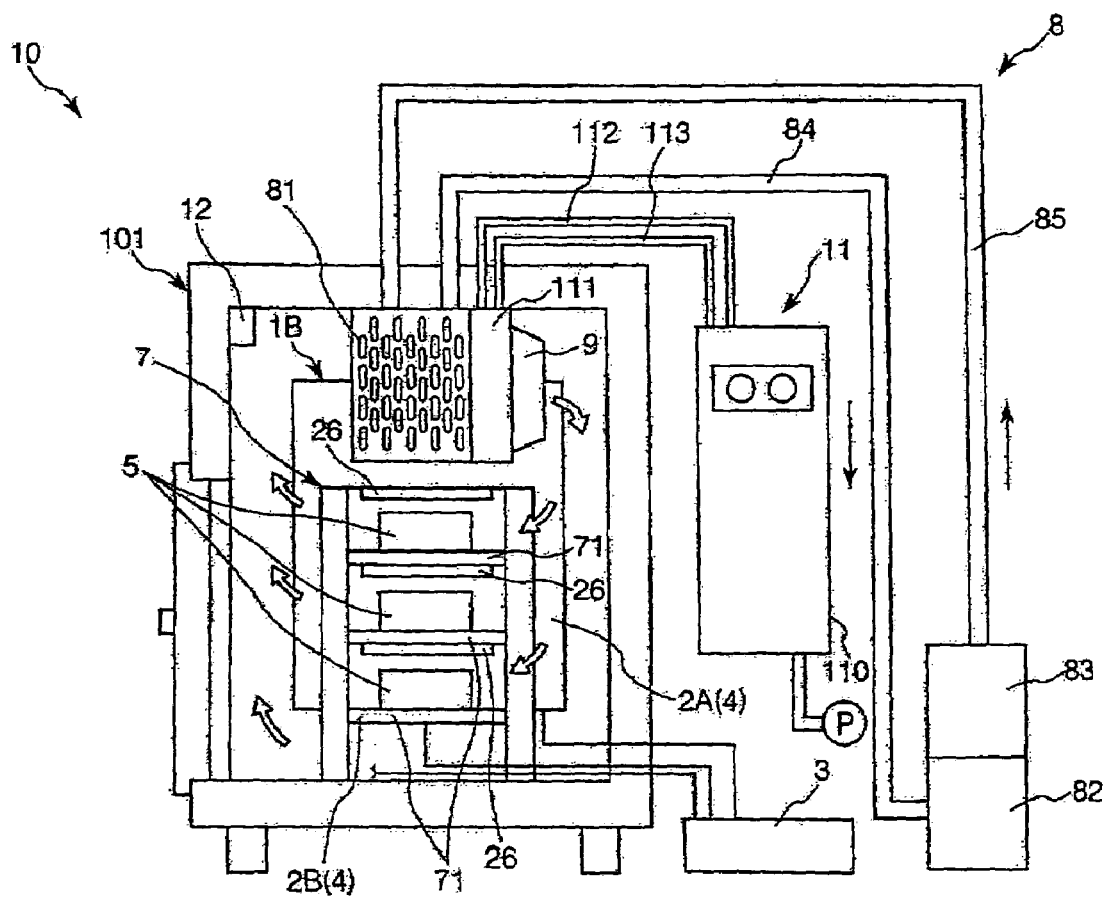
FIG. 5 is a schematic view showing a freezer in accordance with a second embodiment of the present invention.
Figure 6:
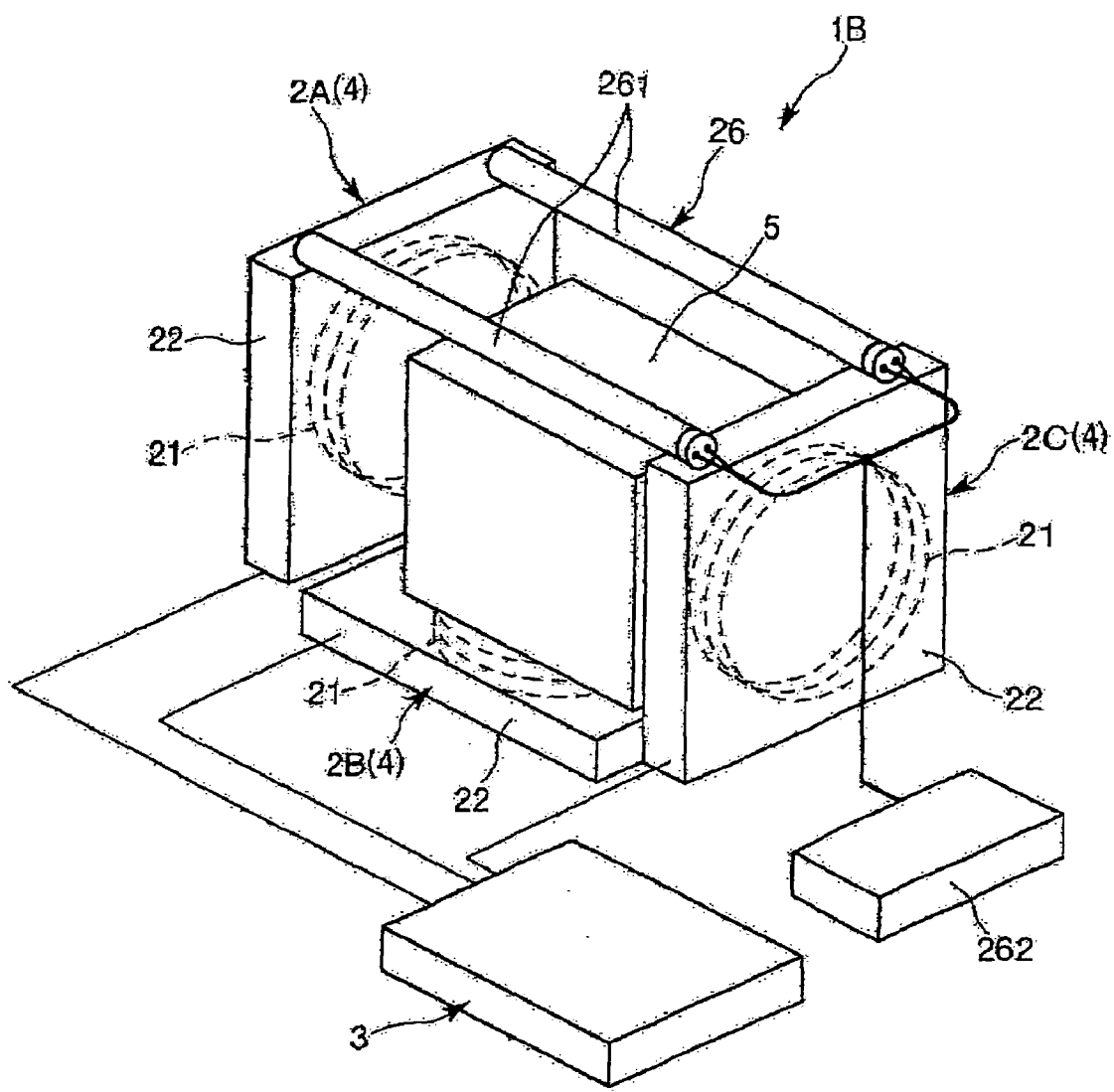
FIG. 6 is a schematic view showing constitution of a cluster fragmenting device included in the freezer shown in FIG. 5.
Figure 7:
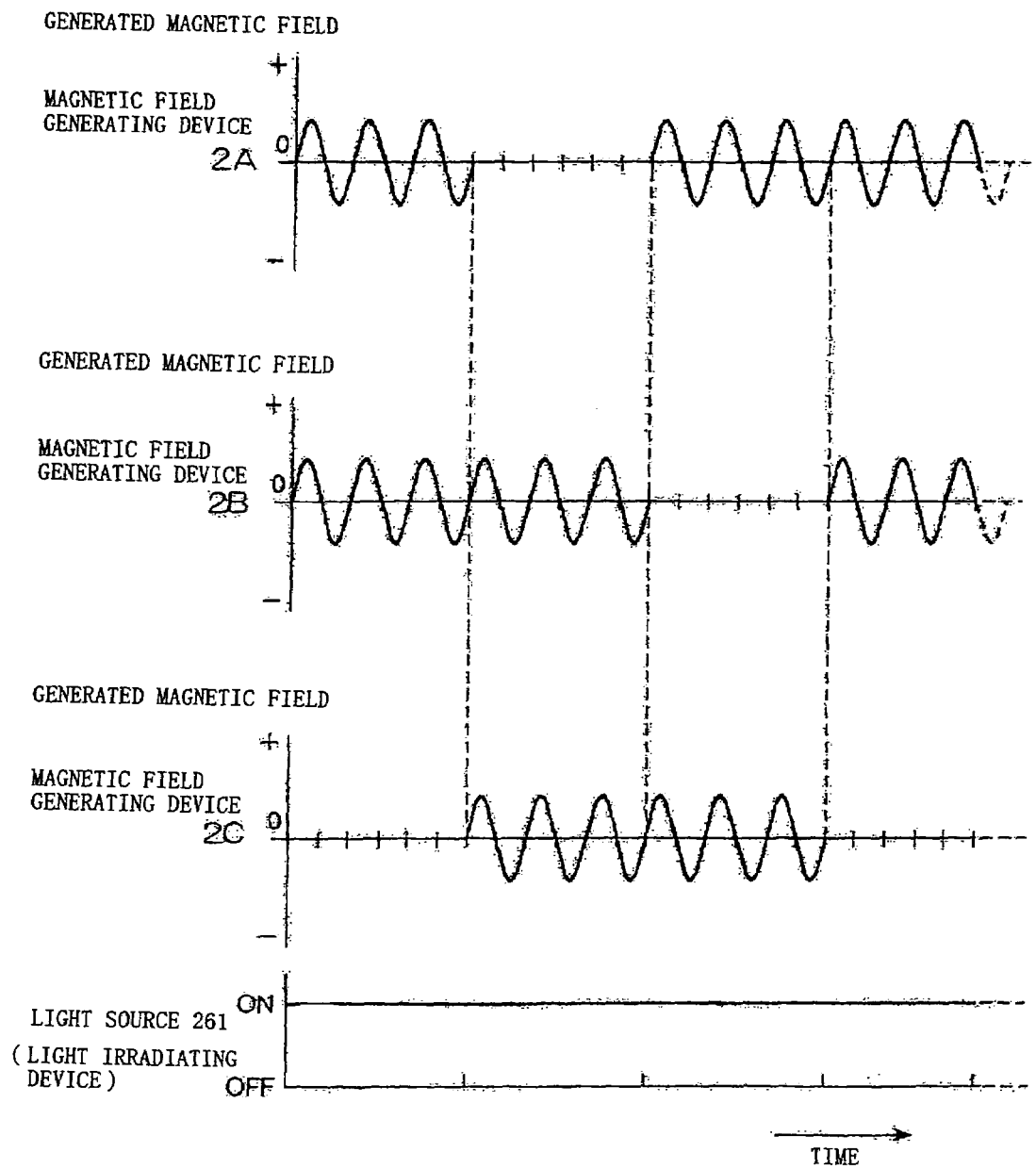
FIG. 7 is an example of a timing chart showing generating timing of magnetic fields from each the magnetic field generating devices in the cluster fragmenting device.
Figure 8:
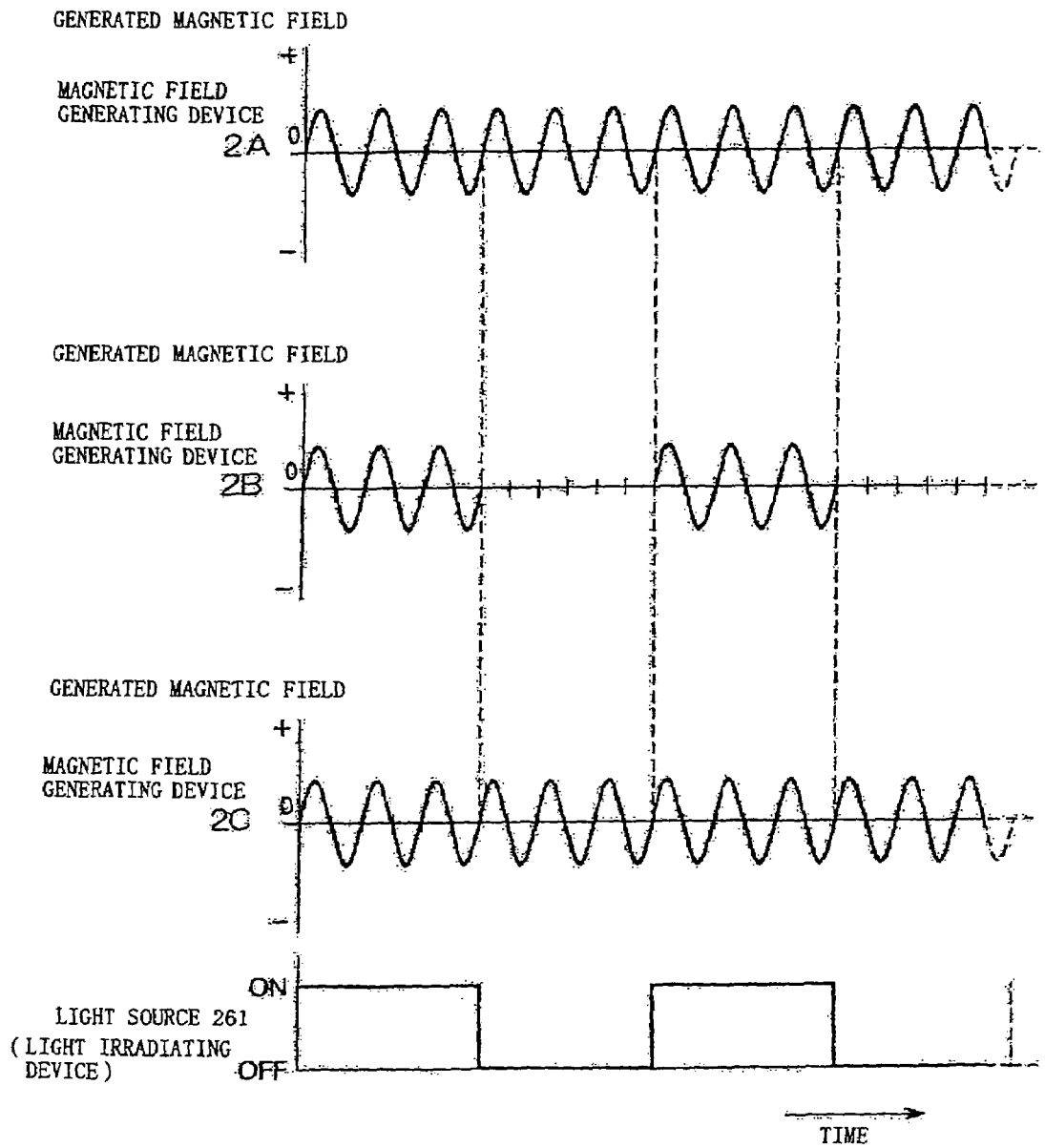
FIG. 8 is an example of a timing chart showing generating timing of magnetic fields from each of the magnetic field generating devices in the cluster fragmenting device.

FIG. 5 is a schematic view showing a freezer in accordance with the second embodiment. FIG. 6 is a schematic view showing a constitution of a cluster fragmenting device included in the freezer shown in FIG. 5. FIG. 7 is an example of a timing chart showing generating timing of magnetic fields from each of the magnetic field generating devices in the cluster fragmenting device. And FIG. 8 is an example of a timing chart showing the magnetic field generating timing from each of the magnetic field generating devices in the cluster fragmenting device.

Hereinafter, the freezer and the freezing method according to the second embodiment will be described mainly about the points different from the above-described first embodiment, and as to the same items, the description thereof will be omitted.

The freezer 10 according to this embodiment has the same constitution as that of the above-described embodiment except the point that the constitution of the cluster fragmenting device 1B includes a light irradiating device 26, which will be described later.

As show in FIG. 5, the freezer 10 according to this embodiment comprises a freezer main body 101, a cluster fragmenting device 1B for fragmenting water clusters contained in the objects 5 to be frozen, a loading part (rack) 7, a heat exchanger 8, a cold gas supply device (a dehumidifying device 11 and a fan 9), and a light irradiating device 26 that irradiates the objects 5 to be frozen with specified light. Here, the light irradiating device 26 is disposed onto the rack section or the frame section etc of the loading part (rack) 7.

As shown in FIG. 5 and FIG. 6, in the cluster fragmenting device 1B, the magnetic field generating device 2A, the magnetic field generating device 2B and the magnetic field generating device 2C are disposed in a U-like shape so as to enclose the portion for placing the objects 5 to be frozen, and above the objects 5 to be frozen, the light irradiating device 26 is disposed. Each of the magnetic field generating devices 2 is connected to a magnetic field control device 3 that controls the strength of the magnetic field generated by each of the magnetic field generating devices 2. Here, the magnetic field generating devices 2A, 2B, 2C and the magnetic field control device 3 are the same as those used in the above-described first embodiment.

The light irradiating device 26 irradiates the objects 5 to be frozen with light of wavelength 500 nm or less. In the constitution shown in the FIG. 1 or 2 or more light sources 261 and a light source operation control device 262 that operates each of the light sources 261 under predetermined conditions, which will be described later, are included.

As practical examples of the light source 261, various kinds of light sources such as blue light lamp, purple-color light lamp, ultraviolet ray lamp, halogen lamp, neon lamp, xenon lamp, semiconductor laser, light emitting diode and X-ray source (hereinafter, these will be generally referred to as "light source") can be enumerated, and a combination of one or two or more from the above may be employed. By irradiating light with such relatively short-wavelength as listed above, in combination with the application of the magnetic field by the magnetic field generating device, which will be described later, the quality of the objects 5 can be preserved in a good condition for a long period of time.

As describe above, the light irradiating device 26 irradiates the light with a wavelength of 500 nm or shorter. The wavelength (light emitting peak value) of the light, which is irradiated by the light irradiating device 26, is preferably 260 to 500 nm, more preferably 270 to 470 nm, and further preferably 290 to 430 nm. Owing to this, the effect by the light irradiation becomes further remarkable, and as the light source therefor, a relatively simple and inexpensive one can be employed. To the contrary, when the wavelength of the irradiating light is too long, the effect by the light irradiation cannot be demonstrated satisfactorily.

Further, when the light irradiating device 11 is what emits the light in the ultraviolet light zone, an appropriate amount (concentration) of ozone can be generated in the freezer main body 101. Owing to this, by the bactericidal action and the like of the ozone supplied inside the freezer main body 101, the objects 5 to be frozen (frozen objects) can be stored stable for a longer period of time. And the objects 5 to be frozen (frozen objects) can be more efficiently prevented from decaying or changing in quality etc.

In the constitution shown in the figure, the light source 261 is disposed in the upper portion of the objects 5 to be frozen shown in the FIG. 5. However, the location and disposition of the light source 261 are not limited to those shown in the figure, and any positions works well such as side, rear, front, lower and diagonally upper portion of the objects 5 to be frozen, if the light can be irradiated to the objects 5 to be frozen in any way.

Light irradiation is not limited to the case that the light emitted from the light source 261 is irradiated directly to the objects 5 to be frozen, but the light may be irradiated via a various kind of optical devices (not shown) such as a mirror, a light reflector, a light collector plate, a lens, a prism, an optical filter, a diffuser plate and an optical fiber. Particularly, it is effective when the objects 5 to be frozen is irradiated with the light more widely or from multi-directions using these optical devices, because the light is irradiated more evenly on the entire objects 5 to be frozen. Further, by employing an optical device (light guide device) as described above, even when the light source 261 is disposed outside the freezer main body 101, the light can be irradiated appropriately to the objects 5 to be frozen. As a result, even when the durability (low temperature resisting performance) of the light source 261 is relatively low under a low temperature conditions, the light of predetermined wavelength can be irradiated for a long period of time. Accordingly, the light source 261 does not have to be exchanged (or, the number of exchanges of the light source 261 can be reduced), and the freezer 10 can be maintained easily.

Further, the light irradiating device 26 may be disposed so that the light source 261 is exposed, and it may be arranged so that the light irradiating device 26 is disposed in a state that the surrounding area of the light source 261 is covered with such a protection against the cold as has the light transmittance performance. Owing to this arrangement, even when the light source 261 has a relatively low durability under low temperature conditions (low temperature resisting performance), the light of predetermined wavelength can be irradiated for a long period of time. Accordingly, the light source 261 does not have to be exchanged (or, the number of exchanges of the light source 261 can be reduced), and the freezer 10 can be maintained easily.

The light irradiating device 26 is preferably capable of continuously or gradually changing (increasing/reducing) the light strength (strength) of the irradiation to the light objects 5 to be frozen. Owing to this, the strength of the irradiating light to the objects 5 to be frozen can be changed with time elapsed, thus the water clusters contained in the objects 5 to be frozen can be fragmented more effectively.

As an example of the method of changing the light intensity (strength) of the irradiating light to the objects 5 to be frozen, a method of increase or decrease of the applied voltage to the light, a method of changing the number (area) of active light sources, a method of changing the distance between the objects 5 to be frozen and the light source 261, a method of shielding the light by means of light shielding unit, a method of switching the wavelength of the irradiating light between 500 nm or less and 500 nm or more, and the similar methods can be enumerated.

Further, the light irradiating device 26 may be arranged so that the direction (or irradiating position) of the light, which is irradiated to the objects 5 to be frozen, can be changed. In this case, for example, such constitution that the position of the light source 261 can be changed with respect to the objects 5 to be frozen (shift, rotation etc) is applicable. In this case, a position changing device (not shown) for relatively changing the position of the light source 261 is included in the component elements of the light irradiating device 26. Furthermore, when the above-described optical device such as mirror is employed, the position of the optical device may be changed (shifted, rotated etc) with respect to the objects 5 to be frozen. By adopting such constitution, the irradiating position of the irradiating light with respect to the objects 5 to be frozen can be changed, or the strength of the irradiating light can be changed. Thus, the water clusters contained in the objects 5 to be frozen can be fragmented more evenly and more effectively.

Further, the water clusters contained in the objects 5 to be frozen, which are disposed inside the freezer main body 101, are fragmented owing to the functions of the cluster fragmenting device 1B and the cold gas supply device (dehumidifying device 11 and fan 9).

The cluster fragmenting device 1B includes the light irradiating device 26, and irradiates the objects 5 to be frozen with the light having a wavelength of 500 nm or shorter, preferably with the light having a wavelength of 260 to 500 nm, more preferably with the light having a wavelength of 270 to 470 nm, and further preferably with the light having a wavelength of 290 to 430 nm (hereinafter, referred to as "short-wavelength light), accompanying with magnetic field generation by means of the magnetic field generating devices (at least one of the magnetic field generating devices 2A, 2B and 2C).

As described above, the water clusters contained in the objects 5 to be frozen are fragmented by magnetic field application. In addition to that, being irradiated with the short-wavelength light, the structure of the objects 5 to be frozen is agitated by the short-wavelength light and change into a state to be readily susceptible to the influence of the magnetic field. As a result, the fragmentation of the water clusters is further accelerated. Particularly, needless to say in the case of ordinary foods, even in the case of foods such as green and yellow vegetables, since the irradiating light is the short-wavelength light, the light is readily absorbed and the above-described effect is obtained.

During the magnetic field is imparted by any of the magnetic field generating devices as shown in FIG. 7, the short-wavelength light may be irradiated continuously or intermittently (periodically). In the latter case, for example, as shown in FIG. 8, the short-wavelength light (operation of the light irradiating device 26) can be irradiated being synchronized with the generation of the magnetic field from the magnetic field generating device 2B.

In the example shown in FIG. 8, the strength of the total magnetic field is controlled to increase and decrease by the three magnetic field generating devices, and the strength of the short-wavelength light is controlled to increase and decrease by the light irradiating device 26 in a synchronized manner with each other. That is, in the example shown in FIG.

8, a phase when the three magnetic field generating devices 2A, 2B and 2C are in operation and a phase when the two magnetic field generating devices 2A and 2C are in operation appear alternately. In the former phase, i.e., the total strength of the magnetic fields is larger, the light irradiating device 26 is turned ON to irradiate the short-wavelength light, synchronizing with that. By arranging in this way, the water clusters contained in the objects 5 to be frozen can be fragmented further effectively.

In the example shown in FIG. 8, when the two magnetic field generating devices 2A and 2C are in operation, (when the magnetic field generating device 2B is not in operation), it is arranged so that the light irradiating device 26 is turned OFF not to irradiate the short-wavelength light. However, the constitution is not limited to this, but the following constitution may be adopted. That is, it may be arranged so that, when the two magnetic field generating devices 2A and 2C are in operation, the power to the light irradiating device 26 is reduced (the number of light sources activated is reduced, and/or the applied voltage to the light sources is reduced etc), to decrease the irradiating light strength of the short-wavelength light. Or, the following constitution may be adopted. That is, it may be arranged so that the irradiating direction (irradiating position) of the light source 261 etc. of the light irradiating device 26 is caused to change its position (shift or rotation) relative to the objects 5 to be frozen to change the irradiating direction (irradiating position) of the short-wavelength light. The light source drive control device 262 controls the above-described ON/OFF operation, the power control and the positional change of the light source 261 etc.

And further, in the above-described embodiment, the freezer, which has such constitution that the light irradiating device is fixed and the objects are frozen in a statically positioned state, has been described. However, such constitution that the light irradiating device and the objects to be frozen moves with respect to each other may be adopted. That is, such constitution may be adopted that at least either of the light irradiating device or the objects to be frozen moves. By adopting such constitution, the magnetic field in the objects to be frozen and the irradiation pattern of the short-wavelength light can be changed more complicatedly. Accordingly, the clusters in the objects 5 to be frozen can be fragmented more efficiently.

The light irradiating device 26 in the freezer 10 according to this embodiment is applicable to the freezers in the following embodiments, and in the respective embodiments, the above-described effect can be obtained.

Next, a third embodiment of the freezer and the freezing method of the present invention will be described.

Figure 9:
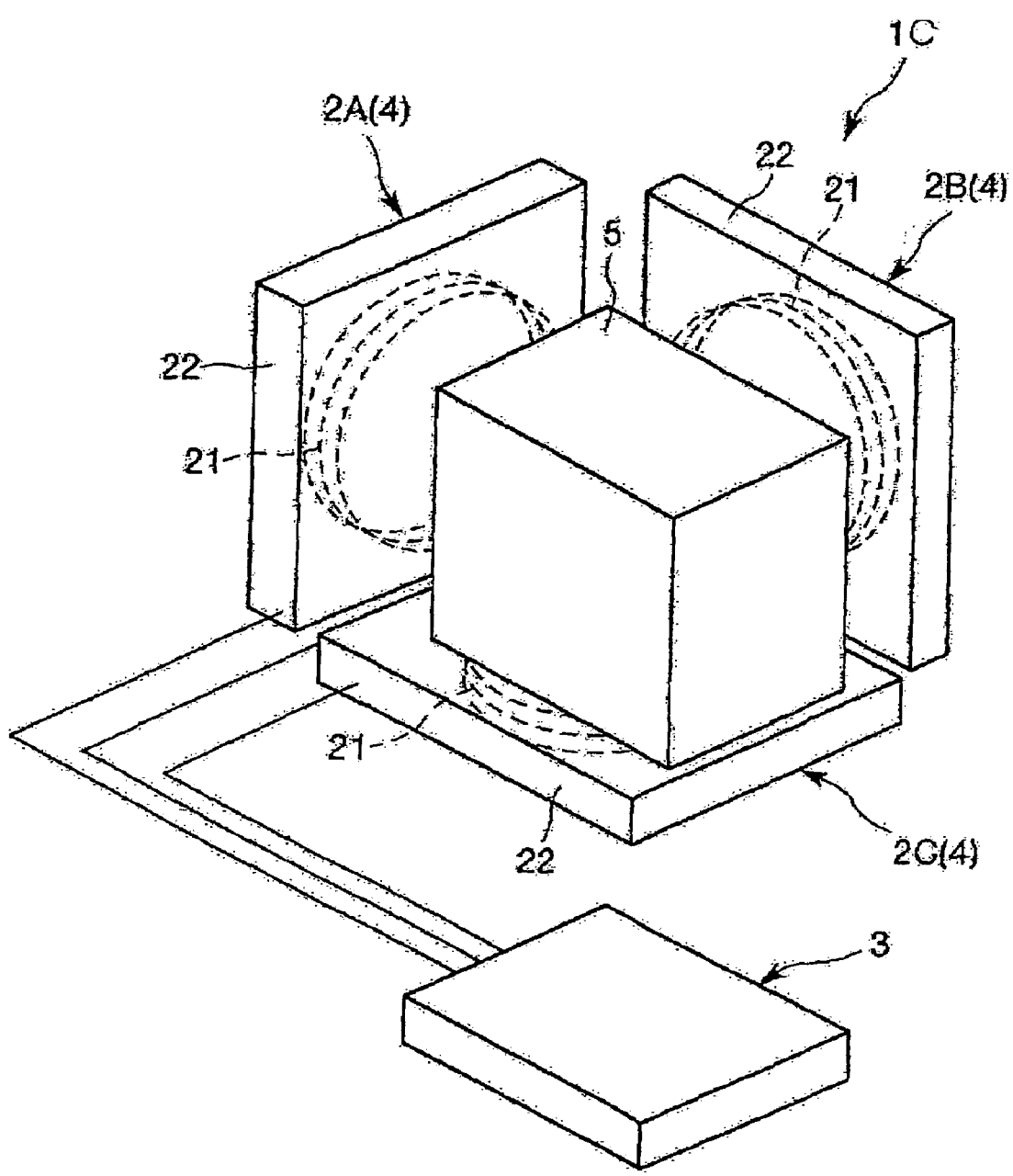
FIG. 9 is a schematic view showing constitution of a cluster fragmenting device included in a freezer in accordance with a third embodiment of the present invention.

FIG. 9 is a schematic view showing a constitution of a cluster fragmenting device included in a freezer in accordance with a third embodiment of the present invention.

Hereinafter, the freezer and the freezing method according to the third embodiment will be described mainly on the points different from the aforementioned embodiments, and as to the same items, the description will be omitted.

The freezer 10 according to this embodiment has the same constitution as that of the above-described embodiment except the point that the constitution of the cluster fragmenting device 1C is different from what is employed in the above-described embodiments.

As shown in FIG. 9, the cluster fragmenting device 1C comprises a plurality of magnetic field generating devices 2 (magnetic field generating devices 2A, 2B and 2C). Each of the magnetic field generating devices 2 is disposed so that each plane thereof facing to the objects 5 to be frozen is perpendicular to each other.

Such disposition arrangement of a plurality of magnetic field generating devices 2 as an entire cluster fragmenting device 1C, allows the configuration of the magnetic fields imparted to the objects 5 to be frozen and the direction of the magnetic field lines in the vicinity of the objects 5 to be changed efficiently in three-dimensional way. Owing to this, the fragmentation of the clusters in the objects 5 to be frozen proceed uniformly and efficiently.

The generating timing (generating pattern) of the magnetic fields from each of the magnetic field generating devices 2 can be controlled, for example, as shown in FIG. 7, which has been described in the second embodiment. Owing to this, the generation of the magnetic field is controlled so that the magnetic field lines rotate three-dimensionally in the vicinity of the objects 5 to be frozen. As a result, even when the objects 5 to be frozen have a complicated configuration, in each portion in the objects 5 to be frozen, the water clusters can be fragmented more uniformly. Also, the generating timing (generating pattern) of the magnetic fields from each of the magnetic field generating devices 2 may be controlled, for example, in a manner shown in FIG. 8, which has been described in the second embodiment.

Although it is not shown in FIG. 9, the freezer 10 (cluster fragmenting device 1C) according to this embodiment includes the light irradiating device 26, which has been described in the above second embodiment.

Next, a 4th embodiment of the freezer and the freezing method of the present invention will be described.

Figure 10:
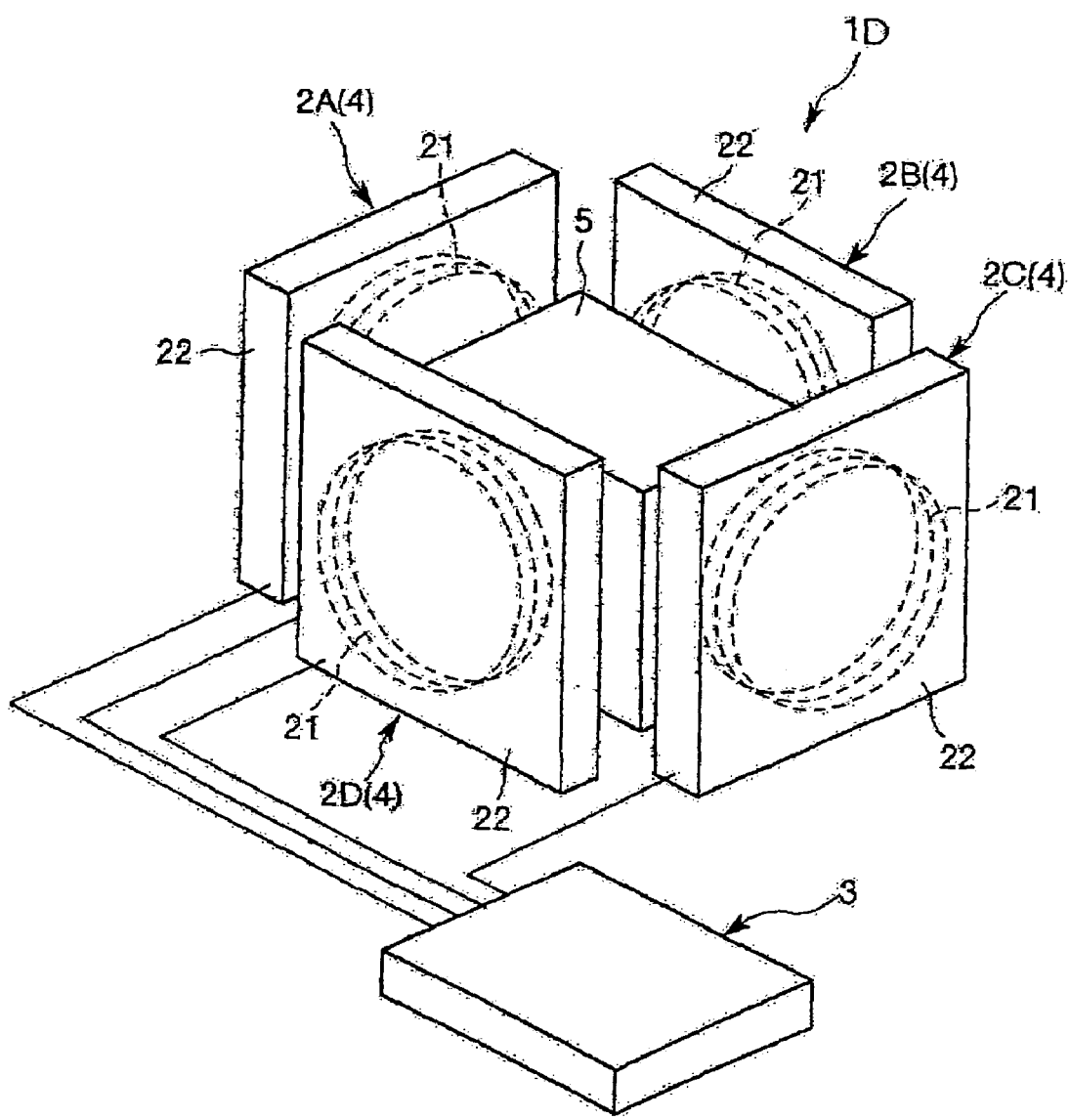
FIG. 10 is a schematic view showing constitution of a cluster fragmenting device included in a freezer in accordance with a 4th embodiment of the present invention.
Figure 11:
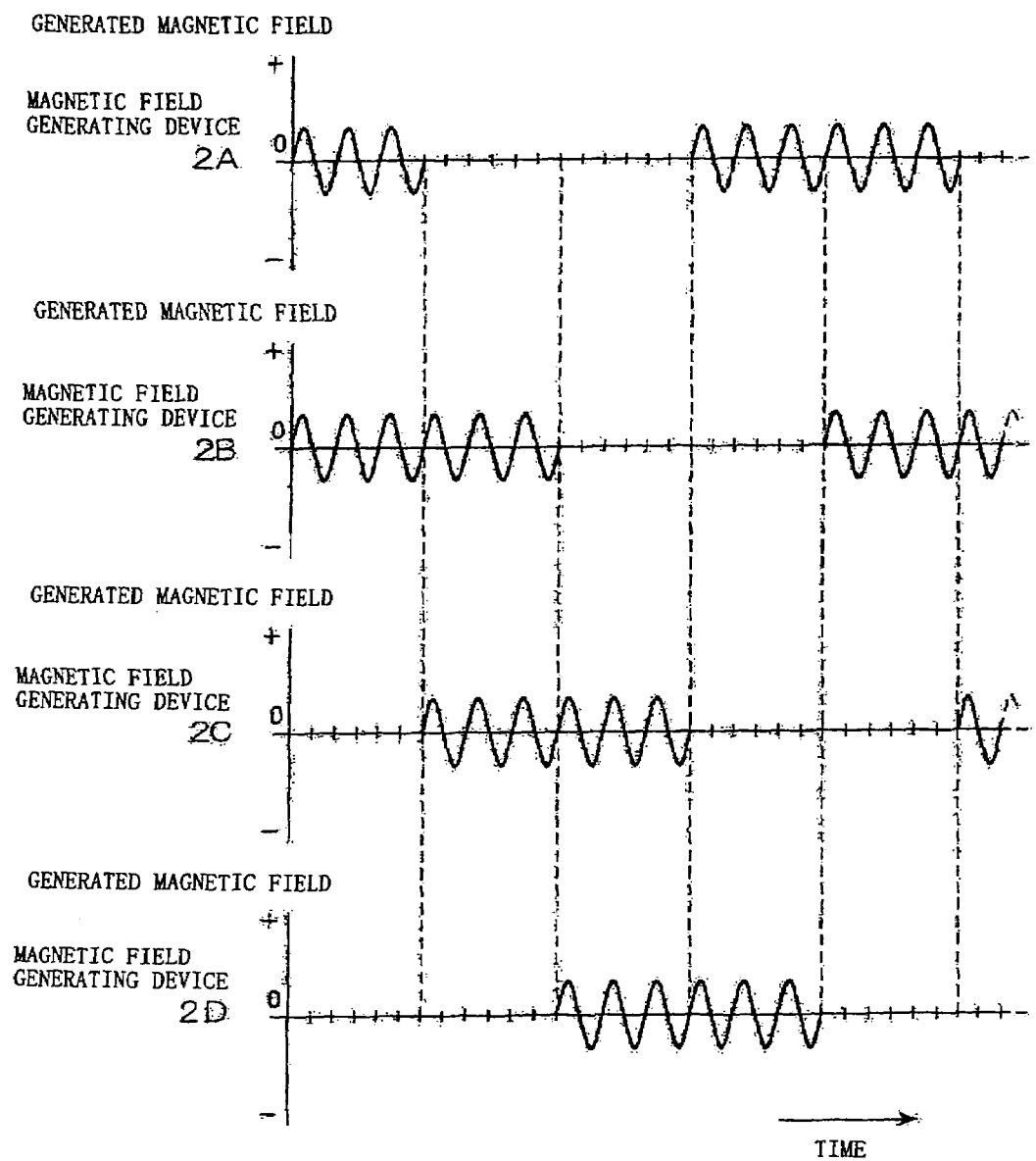
FIG. 11 is an example of a timing chart showing generating timing of magnetic fields from each of the magnetic field generating devices in the cluster fragmenting device.
Figure 12:
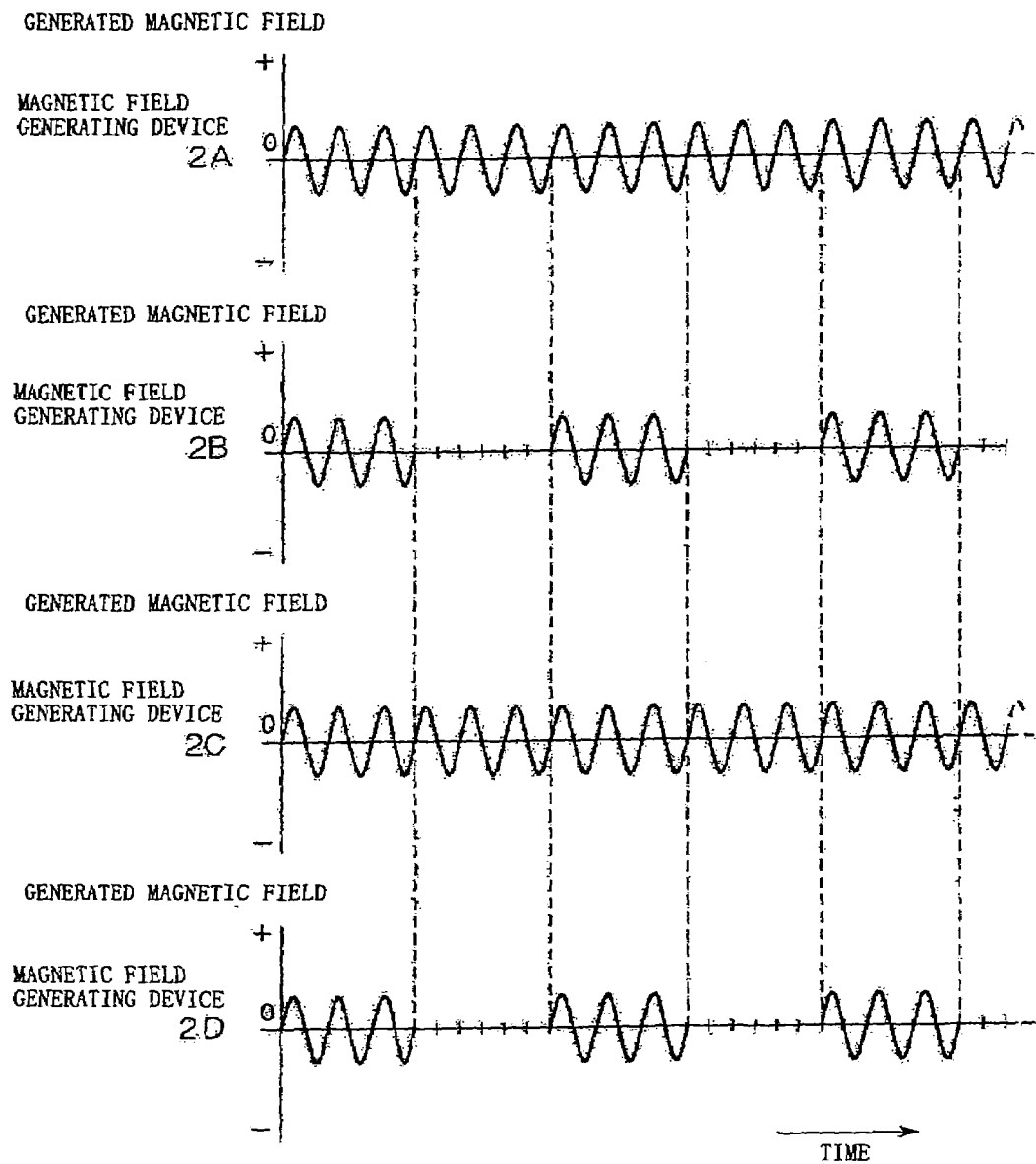
FIG. 12 is an example of a timing chart showing generating timing of magnetic fields from each of the magnetic field generating devices in the cluster fragmenting device.

FIG. 10 is a schematic view showing a constitution of a cluster fragmenting device included in a freezer in accordance with the 4th embodiment of the present invention, FIG. 11 is an example of a timing chart showing generating timing of magnetic field from each of the magnetic field generating devices in the cluster fragmenting device, and FIG. 12 is an example of a timing chart showing generating timing of magnetic field from each of the magnetic field generating devices in the cluster fragmenting device.

Hereinafter, the freezer and the freezing method according to the 4th embodiment will be described mainly on the points different from the above-described embodiments, and as to the same items, the description thereof will be omitted.

The freezer 10 according to this embodiment has the same constitution as that of the above-described embodiment except the point that the constitution of the cluster fragmenting device 1D is different from what is used in the above-described embodiments.

As shown in FIG. 10, a cluster fragmenting device 1D comprises four magnetic field generating devices 2 (a magnetic field generating devices 2A, 2B, 2C, and 2D). In the cluster fragmenting device 1D, the magnetic field generating device 2A and the magnetic field generating device 2C face to each other. And likewise, the magnetic field generating device 2B and the magnetic field generating device 2D face to each other. And each of the magnetic field generating devices 2 are disposed so that the planes of the magnetic field generating device 2A and the magnetic field generating device 2C, which face to the objects 5 to be frozen, are perpendicular to the planes of the magnetic field generating device 2B and the magnetic field generating device 2D, which face to the objects 5.

By disposing a plurality of magnetic field generating devices 2 in this way so as to enclose the four sides of the objects 5 to be frozen, the clusters in the objects 5 to be frozen can be fragmented more efficiently.

The generating timing (generating pattern) of the magnetic fields from each of the magnetic field generating devices 2 can be controlled, for example, as shown in FIG. 11.

That is, first of all, alternating current voltage is applied to the coils 21 of the magnetic field generating devices 2A and 2B to generate magnetic fields from these two magnetic field generating devices. At this time, no voltage is applied to the coils 21 of the magnetic field generating devices 2C and 2D. Also, it is arranged so that the magnetic field generating timing from the magnetic field generating device 2A and the magnetic field generating timing from the magnetic field generating device 2B are synchronized with each other. As the magnetic fields generated by the magnetic field generating devices 2A and 2B change, the magnetic fields in the objects 5 to be frozen change, and the water clusters in the objects 5 to be frozen are fragmented.

After supplying the power to the coils 21 of the magnetic field generating devices 2A and 2B for predetermined period of time, the power supply to the coil 21 of the magnetic field generating device 2A is suspended and the power supply to the coil 21 of the magnetic field generating device 2C is started. That is, the application of the alternating current voltage is switched from the coil 21 of the magnetic field generating device 2A to the coil 21 of the magnetic field generating device 2C. Owing to this, as the entire cluster fragmenting device 1D, the direction of the magnetic fields imparted to the objects 5 to be frozen is changed, and accordingly the direction of the magnetic field lines in the vicinity of the objects 5 to be frozen is changed. Owing to this, the fragmentation of the clusters in the objects 5 to be frozen proceeds efficiently.

Then, in the same manner as described above, the power is supplied to the coils 21 of the magnetic field generating devices 2B and 2C for predetermined period of time. Owing to this, the fragmentation of the clusters in the objects 5 to be frozen further proceeds.

Then, the power supply to the coil 21 of the magnetic field generating device 2B is suspended, and the power supply to the coil 21 of the magnetic field generating device 2D is started. That is, the application of the alternating current voltage is switched from the coil 21 of the magnetic field generating device 2B to the coil 21 of the magnetic field generating device 2D. Owing to this, the direction of the magnetic fields imparted to the objects 5 to be frozen as the entire cluster fragmenting device 1D is changed, hence the direction of the magnetic field lines in the vicinity of the objects 5 to be frozen is changed. Owing to this, the fragmentation of the clusters in the objects 5 to be frozen proceeds efficiently.

Then, in the same manner as described above, the power is supplied to the coils 21 of the magnetic field generating devices 2C and 2D for a predetermined period of time. Owing to this, the fragmentation of the clusters in the objects 5 to be frozen further proceeds.

Then, the power supply to the coil 21 of the magnetic field generating device 2C is suspended, and the power supply to the coil 21 of the magnetic field generating device 2A is started. That is, the application of the alternating current voltage is switched from the coil 21 of the magnetic field generating device 2C to the coil 21 of the magnetic field generating device 2A. Owing to this, the direction of the magnetic fields imparted to the objects 5 to be frozen as the entire cluster fragmenting device 1D is changed, hence the direction of the magnetic field lines in the vicinity of the objects 5 to be frozen is changed. Owing to this, the fragmentation of the clusters in the objects 5 to be frozen proceeds efficiently.

Then, in the same manner as that described above, the power is supplied to the coils 21 of the magnetic field generating devices 2D and 2A for a predetermined period of time. Owing to this, the fragmentation of the clusters in the objects 5 to be frozen further proceeds.

Then, the power supply to the coil 21 of the magnetic field generating device 2B is suspended, and the power supply to the coil 21 of the magnetic field generating device 2A is started. That is, the application of the alternating current voltage is switched from the coil 21 of the magnetic field generating device 2D to the coil 21 of the magnetic field generating device 2B. Owing to this, the direction of the magnetic fields imparted to the objects 5 to be frozen as the entire cluster fragmenting device 1D is changed, hence the direction of the magnetic field lines in the vicinity of the objects 5 to be frozen is changed. Owing to this, the fragmentation of the clusters in the objects 5 to be frozen proceeds efficiently.

Then, in the same manner as that described above, the coils of the magnetic field generating devices applied with the alternating current voltage are switched repeatedly. Owing to this, the direction of the magnetic field lines in the objects 5 to be frozen and the strength of the magnetic fields are changed with time elapsed. In this manner, by changing the direction of the magnetic field lines in the objects 5 to be frozen and the strength of the magnetic field with time elapsed, the water clusters can be fragmented more uniformly in each portion of the objects 5 to be frozen.

As described above, in this embodiment, the magnetic field generating timing from two magnetic field generating devices 2 are synchronized with each other, and the combination of the synchronized magnetic field generating devices 2 is changed with time elapsed. Thereby, in the vicinity of the objects 5 to be frozen, the generation of the magnetic field is controlled so that the magnetic field lines rotate. Owing to this, in each portion in the objects 5 to be frozen, the water clusters can be fragmented more uniformly.

In the timing chart shown in FIG. 11, the phases of the generated magnetic fields from the two magnetic field generating devices 2 which are synchronized are always coincident with each other. However, the phases may not be always coincident with each other. For example, in two magnetic field generating devices 2 which are synchronized with each other, the phases of the generated magnetic fields may be shifted by a half of the wavelength etc.

Further, the maximum strength of the magnetic field generated by each of the magnetic field generating devices 2 may be substantially equal to each other, or may be different from each other in each of the magnetic field generating devices 2.

Further, the cluster fragmenting device 1D does not have to be always operated. For example, after the objects 5 to be frozen have been frozen, the operation of the cluster fragmenting device 1D may be terminated.

In the timing chart shown in FIG. 11, the generating timings of the magnetic fields from two magnetic field generating devices 2 are synchronized with each other, and the combination of the synchronized magnetic field generating devices 2 is changed with time elapsed. However, the number of the magnetic field generating devices 2 of which generating timings are synchronized with each other, may be three.

The generating timing (generating pattern) of the magnetic fields from each of the magnetic field generating devices 2 may be controlled, for example, as show in FIG. 12.

That is, it may be arranged so that, while the alternate magnetic fields of a predetermined frequency are continuously generated from the magnetic field generating devices 2A and 2C, alternate magnetic fields of a predetermined frequency are generated discontinuously (intermittently) from the magnetic field generating devices 2B and 2D.

In this case, the magnetic field generating timing from the magnetic field generating device 2B and the magnetic field generating timing from the magnetic field generating device 2D may be or may not be synchronized with each other.

The frequency of the alternate magnetic fields generated from each of the magnetic field generating devices 2 may be the same or different from each other.

Although it is not shown in FIG. 10, the freezer 10 (cluster fragmenting device 1D) according to this embodiment includes the light irradiating device 26, which has been described in the above second embodiment.

Next, a 5th embodiment of the freezer and the freezing method of the present invention will be described.

Figure 13:
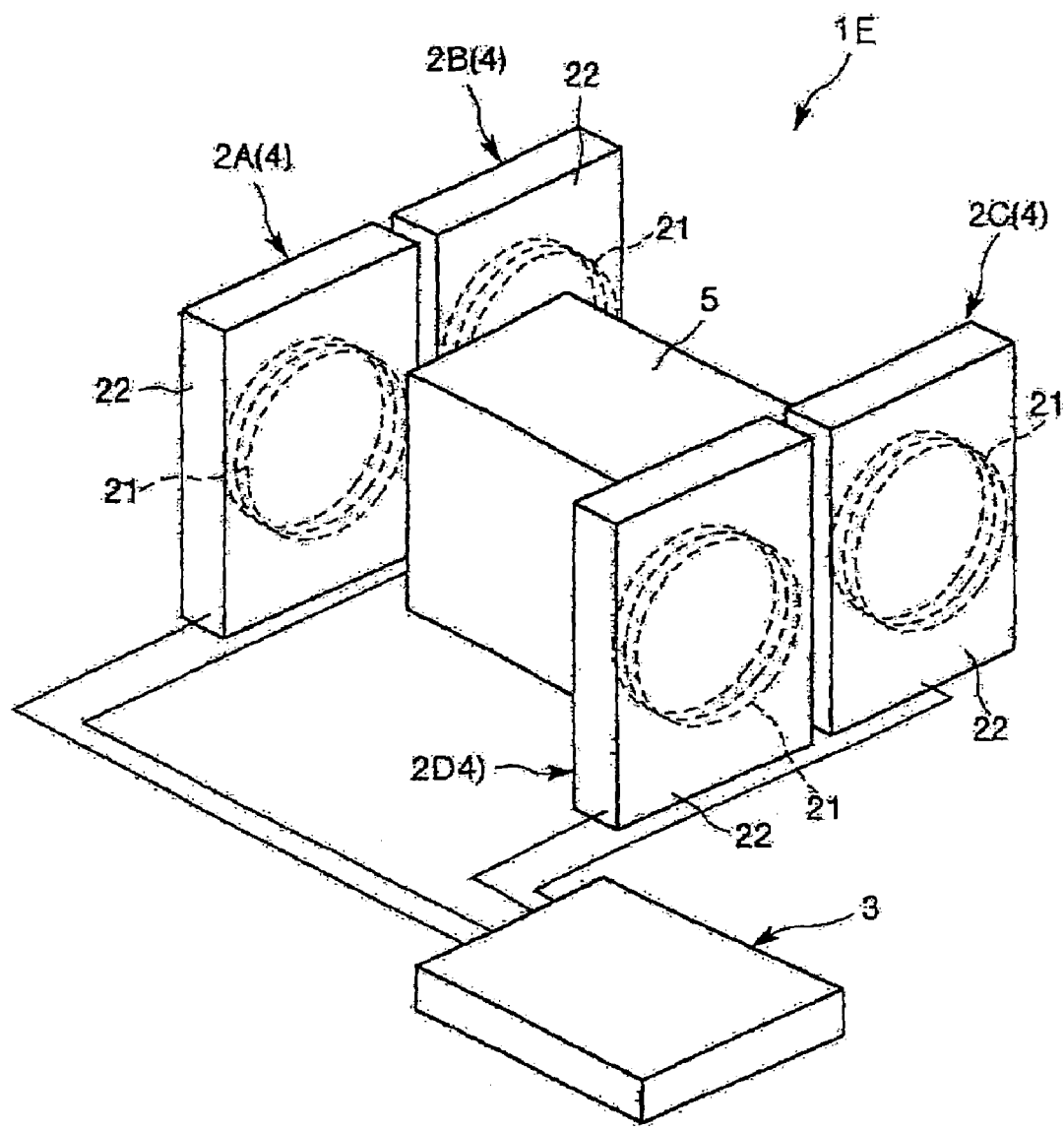
FIG. 13 is a schematic view showing constitution of a cluster fragmenting device included in a freezer in accordance with a 5th embodiment of the present invention.

FIG. 13 is a schematic view showing a constitution of a cluster fragmenting device included in a freezer in accordance with the 5th embodiment of the present invention.

Hereinafter, the freezer and the freezing method according to the 5th embodiment will be described mainly on the points different from the above-described embodiments, and as to the same items, the description thereof will be omitted.

The freezer 10 according to this embodiment has the same constitution as that of the above-described embodiment except the point that the constitution of the cluster fragmenting device 1E is different from what is used in the above-described embodiments.

As shown in FIG. 13, same as the cluster fragmenting device 1D in the above-described 4th embodiment, the cluster fragmenting device 1E comprises four magnetic field generating devices 2 (magnetic field generating devices 2A, 2B, 2C and 2D), and the disposition thereof is different from those in the cluster fragmenting device 1D. That is, in the cluster fragmenting device 1E, the plane of the magnetic field generating device 2A, which faces to the objects 5 to be frozen, and the plane of the magnetic field generating device 2B, which faces to the objects 5 to be frozen, are positioned on the same plane; and the plane of the magnetic field generating device 2C, which faces to the objects 5 to be frozen and the plane of the magnetic field generating device 2D, which faces to the objects 5 to be frozen, are disposed so as to be positioned on the same plane. Also, the magnetic field generating device 2A and the magnetic field generating device 2D are disposed so as to face to each other; and the magnetic field generating device 2B and the magnetic field generating device 2C are disposed so as to face to each other.

The generating timing (generating pattern) of the magnetic fields from each of the magnetic field generating devices 2 can be controlled, for example, as shown in FIG. 11, which has been described in the above 4th embodiment. Owing to this, the generation of the magnetic fields is controlled so that the magnetic field lines rotate in the vicinity of objects 5 to be frozen. As a result, even when the objects 5 to be frozen has a complicated configuration, in each portion of the objects 5 to be frozen, the water clusters can be fragmented more uniformly. Also, the generating timing (generating pattern) of the magnetic fields from each of the magnetic field generating devices 2 may be controlled in such a way, for example, as described in the 4th embodiment as shown in FIG. 12.

Although it is not shown in FIG. 13, the freezer 10 (cluster fragmenting device 1E) according to this embodiment includes the light irradiating device 26, which has been described in the above second embodiment.

Next, a 6th embodiment of the freezer and the freezing method of the present invention will be described.

Figure 14:
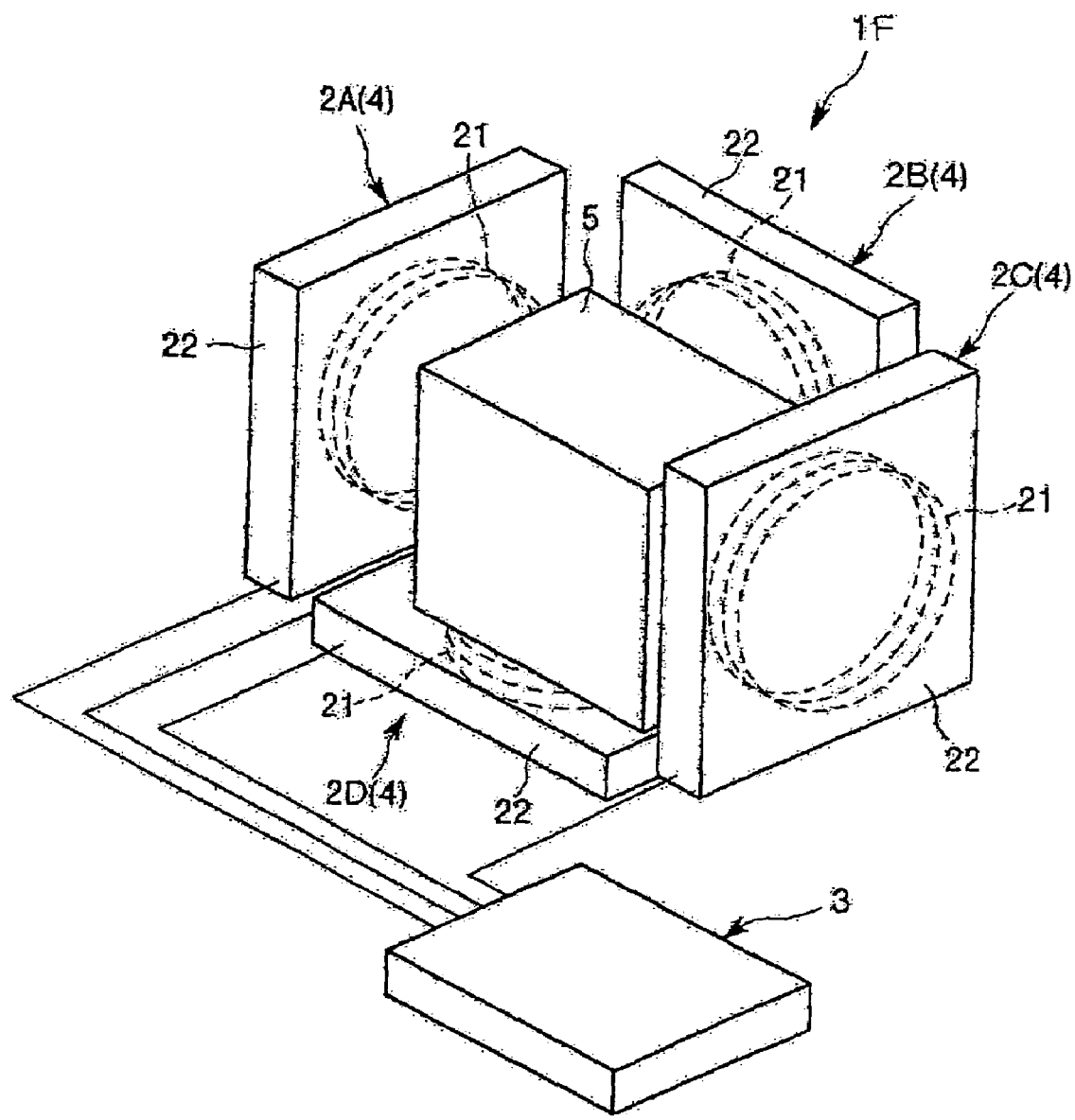
FIG. 14 is a schematic view showing constitution of a cluster fragmenting device included in a freezer in accordance with a 6th embodiment of the present invention.

FIG. 14 is a schematic view showing a constitution of a cluster fragmenting device included in a freezer in accordance with the 6th embodiment of the present invention;

Hereinafter, the freezer and the freezing method according to the 6th embodiment will be described mainly on the points different from the above-described embodiments, and as to the same items, the description thereof will be omitted.

The freezer 10 according to this embodiment has the same constitution as that of the above-described embodiment except the point that the constitution of the cluster fragmenting device 1F is different from what are employed in the above-described embodiments.

As shown in FIG. 14, in the cluster fragmenting device 1F, the magnetic field generating device 2D is formed integrally with the loading part 7. Owing to this, the distance between the objects 5 to be frozen and the magnetic field generating devices can be always maintained in a short distance. As a result, the effect of the cluster fragmentation can be further enhanced. Further, the number of magnetic field generating devices which are provided as separate members, can be reduced. Thus, it is advantageous for big capacity increase and saving a space of the freezer.

Further, by disposing each of the magnetic field generating devices 2 as shown in FIG. 14, the plane of the magnetic field generating device 2D which faces to the objects 5 to be frozen is perpendicular to the planes of the magnetic field generating devices 2A, 2B and 2C, which face to the objects 5 to be frozen. Owing to this, as the entire cluster fragmenting device 1F, the configuration of the magnetic fields imparted to the objects 5 to be frozen and the direction of the magnetic field lines in the vicinity of the objects 5 can be efficiently changed three-dimensionally. Owing to this, fragmentation of the clusters in the objects 5 to be frozen can proceed uniformly and efficiently.

The generating timing (generating pattern) of the magnetic field from each of the magnetic field generating devices 2 can be controlled, for example, as described in the above 4th embodiment as shown in FIG. 11. Owing to this, the generation of the magnetic fields is controlled so that the magnetic field lines rotate three-dimensionally in the vicinity of the objects 5 to be frozen. As a result, in each portion of the objects 5 to be frozen, the water clusters can be fragmented more uniformly. Further, the generating timing (generating pattern) of the magnetic fields from each of the magnetic field generating devices 2 may be controlled, for example, as described in the 4th embodiment as shown in FIG. 12.

Although it is not shown in FIG. 14, the freezer 10 (cluster fragmenting device 1F) according to this embodiment includes the light irradiating device 26, which has been described in the above second embodiment.

Next, a 7th embodiment of the freezer and the freezing method of the present invention will be described.

Figure 15:
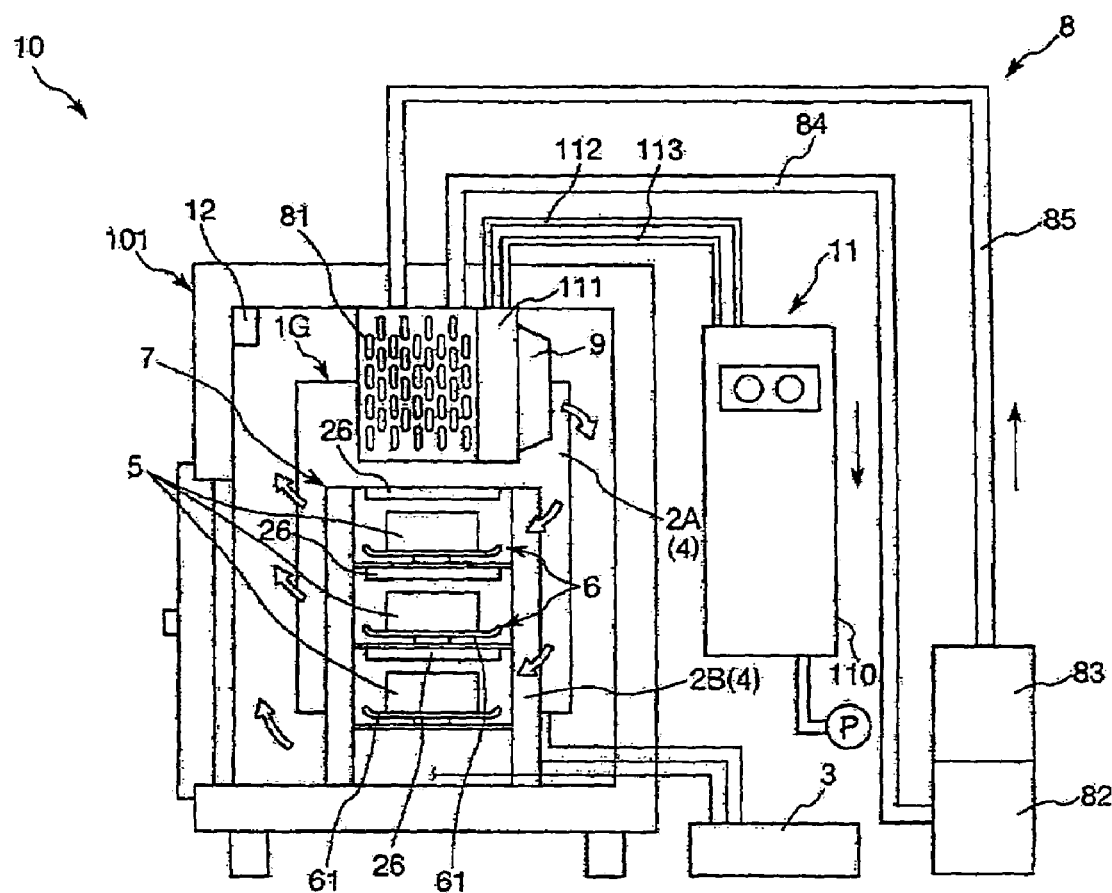
FIG. 15 is a schematic view showing a freezer in accordance with a 7th embodiment of the present invention.
Figure 16:
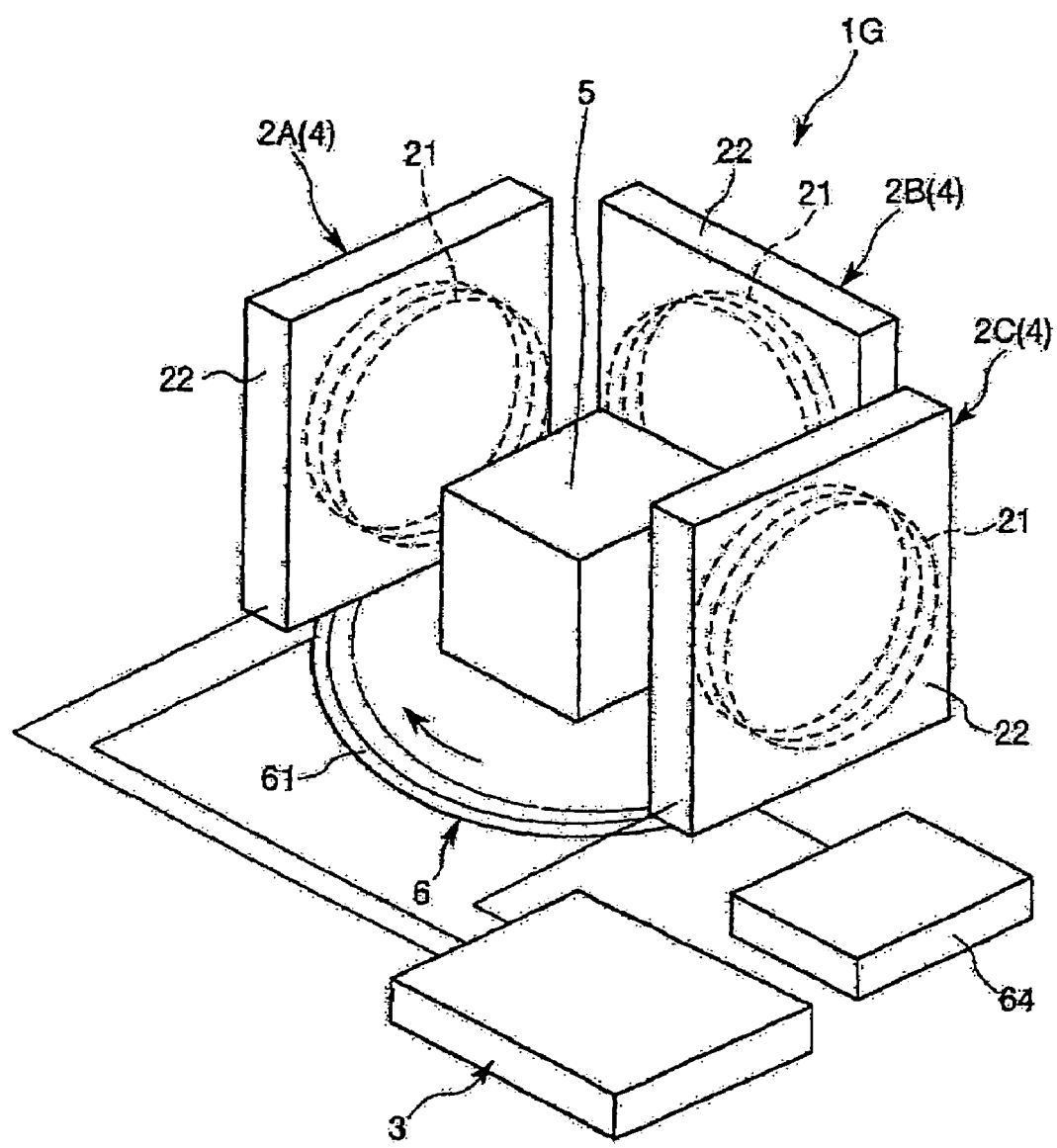
FIG. 16 is a schematic view showing an example of a constitution of a cluster fragmenting device included in the freezer shown in FIG. 15.
Figure 17:
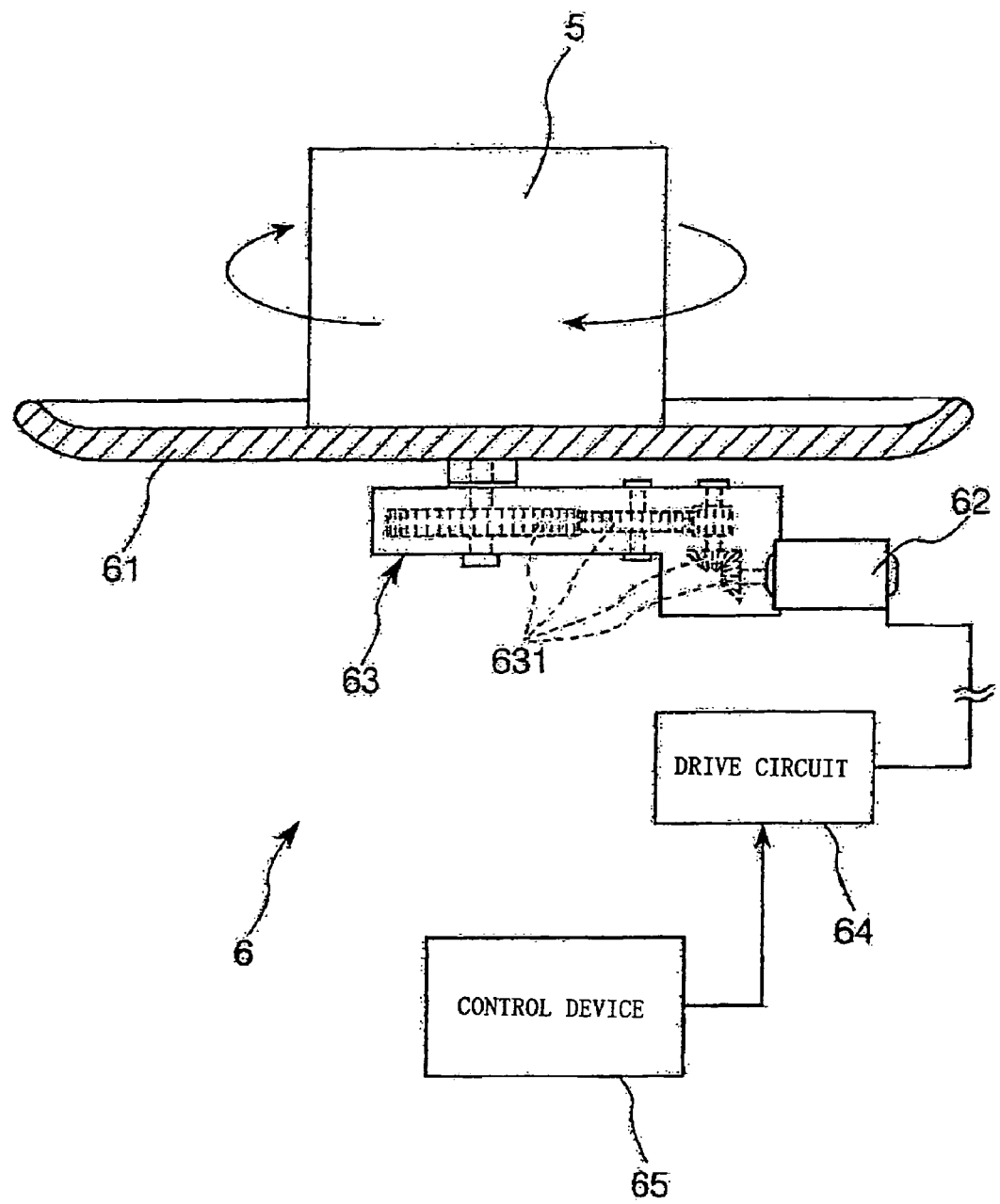
FIG. 17 is a side view showing an example of constitution of a turning device in the cluster fragmenting device shown in FIG. 16.

FIG. 15 is a schematic view showing a freezer in accordance with the 7th embodiment of the present invention, FIG. 16 is a schematic view showing an example of a constitution of a cluster fragmenting device included in the freezer shown in FIG. 15, and FIG. 17 is a side view showing an example of a constitution of a turning device in the cluster fragmenting device shown in FIG. 16.

Hereinafter, the freezer and the freezing method according to the 7th embodiment will be described mainly on the points different from the above-described embodiments, and as to the same items, the description thereof will be omitted.

The freezer 10 according to this embodiment has the same constitution as that of the above-described embodiment except the point that cluster fragmenting device 1G has a rotating device 6, which will be described later.

As shown in FIG. 15, the freezer 10 according to this embodiment comprises a freezer main body 101, a cluster fragmenting device 1G for fragmenting the water clusters contained in the objects 5 to be frozen, a loading part (rack) 7, a heat exchanger 8, a cold gas supply device (dehumidifying device 11 and fan 9) and a rotating device 6 that rotates the objects 5 to be frozen. Here, the rotating device 6 is disposed on the rack section or the frame section or the like in the loading part (rack) 7.

As shown in FIGS. 15 and 16, in the cluster fragmenting device 1G, the magnetic field generating devices 2A, 2B and 2C are disposed in a U-like shape so as to enclose the area for placing the objects 5 to be frozen (hereinafter, referred to as "objects placing space"). The objects 5 to be frozen are rotated by the rotating device 6 and the magnetic fields are imparted thereto in this rotating state. The generating timing (generating pattern) of the magnetic fields from each of the magnetic field generating devices 2 may be controlled, for example, as described in the second embodiment as shown in FIG. 8.

The generating timing (generating pattern) of the magnetic fields from each of the magnetic field generating devices 2 can be controlled, for example, as described in the second embodiment as shown in FIG. 7. That is, the application of the alternating current voltage is switched among the coils 21 of a plurality of magnetic field generating devices 2. Owing to this, the direction of the magnetic fields imparted to the objects loading space is changed as the entire cluster fragmenting device 1G, and thus the direction of the magnetic field lines in the objects loading space (in the vicinity of the objects 5 to be frozen) is changed. Further, the generating timing (generating pattern) of the magnetic fields from each of the magnetic field generating devices 2 may be controlled, for example, as described in the second embodiment as shown in FIG. 8.

Assuming that the period from the point when the magnetic field generating device 2A starts the operation to the point when the next operation is started as shown in FIG. 7 is 1 cycle, the relationship between the number of cycles and the number of rotations of the objects 5 to be frozen rotated by the rotating device 6, which will be described later, is not particularly limited. However, in one rotation time of the objects 5 to be frozen (one rotation of the objects 5 to be frozen rotated by the rotating device 6), the number of cycles of generation of the magnetic field is preferably set to 0.2 to 1000 cycles, more preferably set to 1.5 to 300 cycles, and further preferably set to 8 to 200 cycles.

Further, the rotating device 6 for rotating the objects 5 to be frozen are disposed in a lower portion of the cluster fragmenting device 1G. As shown in FIG. 17, the rotating device 6 comprises a table (loading table) 61 having a disk-like shape (plate-like shape) for loading the objects 5 to be frozen, a motor 62 as a drive source, a power transmission device 63 for transmitting torque of the motor 62 to the table 61, a drive circuit 64 for driving the motor 62 and a control device 65 for controlling the drive circuit 64. In the above, the motor 62 and the power transmission device 63 forms a rotation mechanism for rotating the table 61.

The table 61 is made of, for example, a various kind of metal materials, a various kind of plastic materials, and a various kinds of ceramics. In this case, the table 61 is preferably made of a nonmagnetic metal such as aluminum and copper or a nonmagnetic material such as a various kind of plastics. The upper area of the table 61 is the objects loading space on which the objects 5 to be frozen are loaded.

Type and structure of the motor 62 are not particularly limited. Not only a DC motor but also an AC motor may be employed.

In the constitution shown in the figure, the power transmission device 63 includes a function of transmission, particularly a function of speed reduction device to reduce the rotation of the motor 62, and is composed of a gear train (including flat gear, bevel gear, worm and the like) 631, an rotation axis, bearings, supporting members thereof and the like. If the torque of the motor (drive source) 62 can be transmitted to the table 61, the constitution of the power transmission device 63 is not limited to the constitution shown in the figure. Any constitution may be employed, i.e., for example, a type with pulley and belt, a type with sprocket and chain, and a type including a roller driven by the motor 62, and pressed to contact with the table 61.

The drive circuit 64 supplies the power to the motor 62 to drive the motor 62. The drive circuit 64 operates based on the control signals from the control device 65. Detailed description of the above will be given later.

The control device 65 comprises for example, a microcomputer, a CPU and the like.

Next, the operation of the rotating device 6 will be described.

A control signal from the control device 65 allows to operate the drive circuit 64 and the motor 62 rotates at a constant number of rotations in one direction, the torque of which is transmitted to the table 61 via the power transmission mechanism 63, then the table 61 and the objects 5 to be frozen placed thereon rotate at a constant speed in a fixed direction.

The magnetic fields are imparted to the loading space for the objects to be frozen in a predetermined pattern by the 2A, 2B and 2C. Besides the magnetic fields pattern (variable pattern with time elapsed) imparted by the magnetic field generating devices 2A, 2B and 2C by themselves, own rotations of the objects 5 to be frozen in the loading space of the objects are added. As a result, the objects to be frozen receive the magnetic fields with more complicated variations. Owing to this, in the objects 5 to be frozen, the water clusters contained in the objects 5 can be fragmented more evenly and more effectively. In the case that the generation of the magnetic fields is controlled so that the direction of the magnetic field lines rotates as described above, the rotation direction of the objects 5 may be the same or inverse direction of the rotation direction of the magnetic field lines. However, the latter is preferable.

The rotating device 6 is not limited to the case that the objects 5 to be frozen rotate at a constant speed in a specific direction. Examples of preferable mode will be described below.

<1> The table 61 is rotated intermittently (discontinuously). That is, it is not limited to the case that the table 61 is rotated continuously while the magnetic fields are applied thereto by any of magnetic field generating devices 2, but may be rotated intermittently. This can be carried out by controlling the application timing of the current from the drive circuit 64 to the motor 62 by the control device 65. For example, such an operation can be carried out repeatedly as the rotation of the motor 62 is suspended for a specific period of time after 30° rotation of the table 61, and the rotation of the motor 62 is suspended again for a specific period of time after the next 30° rotation of the table 61.

<2> The rotation direction of the table 61 is changed. That is, the table 61 may be rotated in any direction of forward or inverse turn. This can be carried out by switching over the direction (polarity) of the current applied to the motor 62 from the drive circuit 64 through the control by the control device 65. For example, such constitutions are available as forward or inverse turn of the table 61 can be selected (set), or as the forward turn and the inverse turn of the table 61 occurs alternately with a specific interval.

<3> The rotation speed (number of rotations) of the table 61 is changed. This can be carried out by changing the voltage (current) applied to the motor 62 from the drive circuit 64, or by changing the change gear ratio of the transmission through the control by the control device 65. For example, such constitutions are available that high speed and low speed can be selected (set) as the rotation speed of the table 61, or that the rotation speed of the table 61 is switched over alternately between the high speed and the low speed with a specific interval, and that rotation speed of the table 61 is changed in a stepless manner.

<4> An arbitrary combination of 2 or more of the above <1> to <3>.

In the freezer 10 of the present invention, it may be arranged so that any of the above modes <1> to <4> can be carried out, or such constitution that the above modes <1> to <4> are selectable.

Although it is not shown in FIG. 16, the freezer 10 (cluster fragmenting device 1G) according to this embodiment includes the light irradiating device 26, which has been described in the above second embodiment.

Next, an 8th embodiment of the freezer and the freezing method of the present invention will be described.

Figure 18:
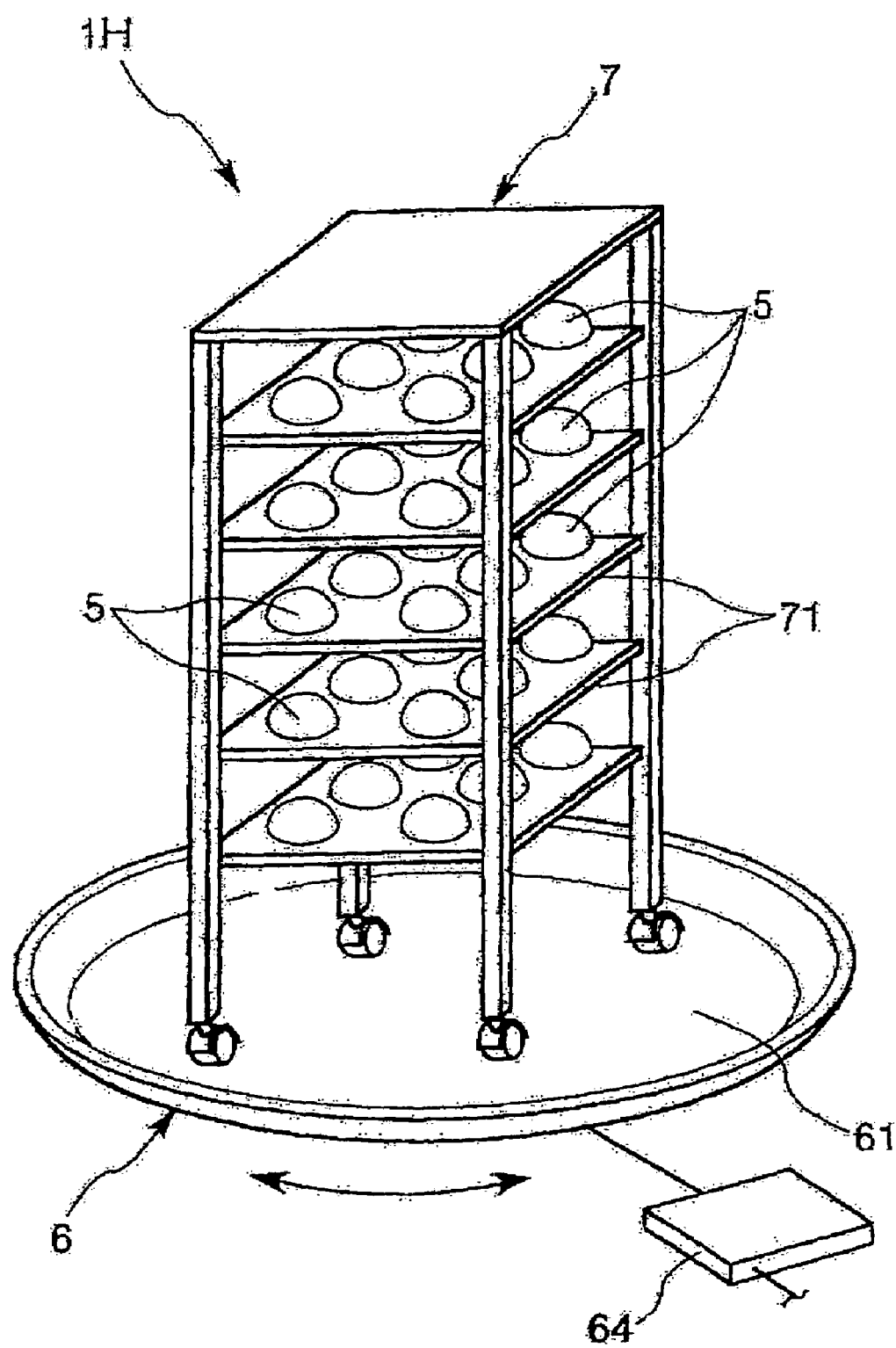
FIG. 18 is a schematic view showing constitution of a cluster fragmenting device included in a freezer in accordance with an 8th embodiment of the present invention.

FIG. 18 is a schematic view showing a constitution of a cluster fragmenting device included in a freezer in accordance with the 8th embodiment of the present invention.

Hereinafter, the freezer and the freezing method according to the 8th embodiment will be described mainly on the points different from the above-described embodiments, and as to the same items, the description thereof will be omitted.

The freezer 10 according to this embodiment has the same constitution as that of the above-described embodiments except the point that the constitution of a cluster fragmenting device 1H is different from those used in the above-described embodiments.

As shown in FIG. 18, the cluster fragmenting device 1H has the same rotating device 6 as described above, and on the table 61 a multi-step loading part (rack) 7 is provided. The component material and/or the like for the loading part (rack) 7 is the same as what is described in the 7th embodiment.

The loading part (rack) 7 is capable of loading (storing) a plurality of objects 5 to be frozen. That is, objects 5 to be frozen are placed on each step of the loading parts (racks) 7.

Also, although it is not shown in FIG. 18, in the periphery area of the loading parts (racks) 7, the magnetic field generating devices 2, which are the same as the cluster fragmenting device 1F, are disposed.

Each of the trays (loading racks) 71 of the loading parts (racks) 7 may be dispose in fixed manner, and also such constitution is preferable as the number of the steps of the trays 71 can be changed, or the space between the trays 71 is adjustable. Owing to this, corresponding to the size and/or number of the objects 5 to be frozen, the objects 5 to be frozen can be optimally placed on the loading part (racks) 7. Thus, the fragmentation of the clusters in the objects 5 to be frozen can proceed more uniformly and efficiently.

In the constitution shown in the figure, the each of the trays 71 of loading part (racks) 7 has a plate-like shape. However, such structure as, for example, frame-like or net-like configuration that allows the air to flow may be employed.

In the constitution shown in the figure, the loading part (racks) 7 have a rectangular shape. However, the configuration is not limited to this, but for example, circular shape (substantially cylindrical shape) may be employed. Also, the loading part (rack) 7 may be previously fixed to the table 61, or the lower portion of the loading part (rack) 7 may be integrated with the table 61.

Further, as for the rotating device, it is not limited to a type in which the objects to be frozen are rotated. Such types may be employed as a type in which at least one of the magnetic field generating devices is rotated, or a type in which both of the objects to be frozen and the magnetic field generating devices are rotated.

Although it is not shown in FIG. 18, the freezer 10 (cluster fragmenting device 1H) according to this embodiment includes the light irradiating device 26, which has been described in the above second embodiment.

Next, a 9th embodiment of the freezer and the freezing method of the present invention will be described.

Figure 19:
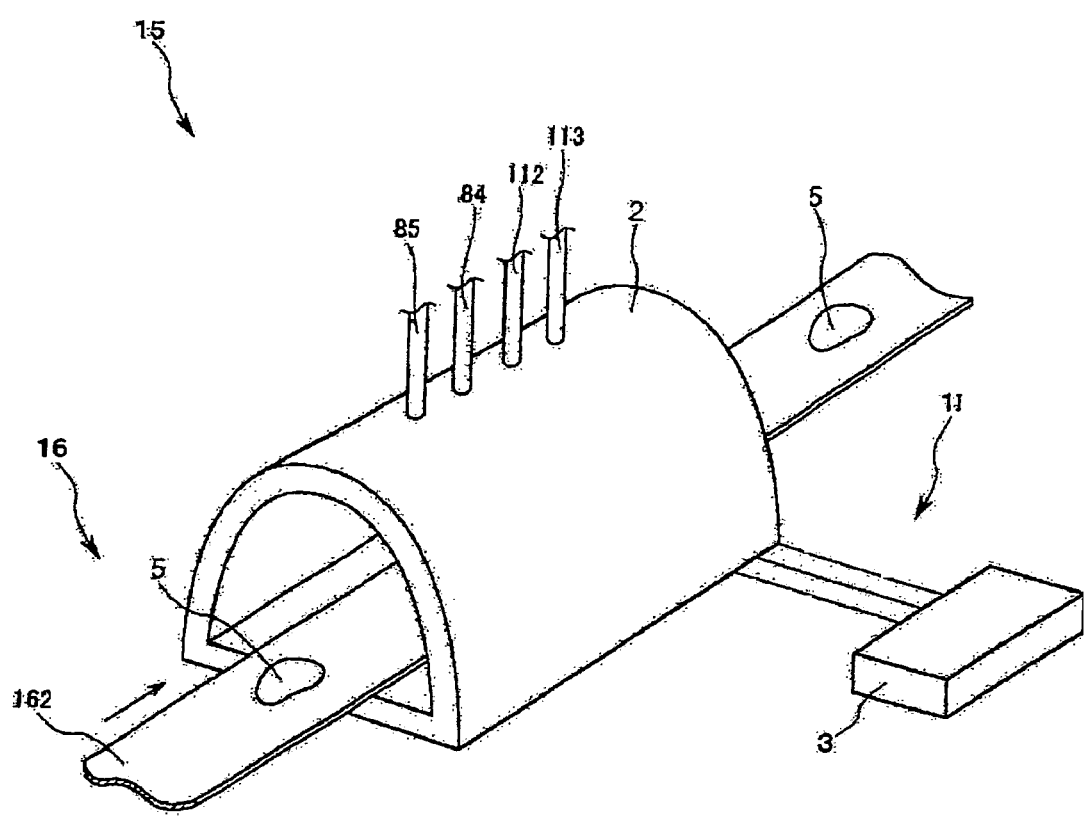
FIG. 19 a perspective view schematically showing a freezer in accordance with a 9th embodiment of the present invention.
Figure 20:
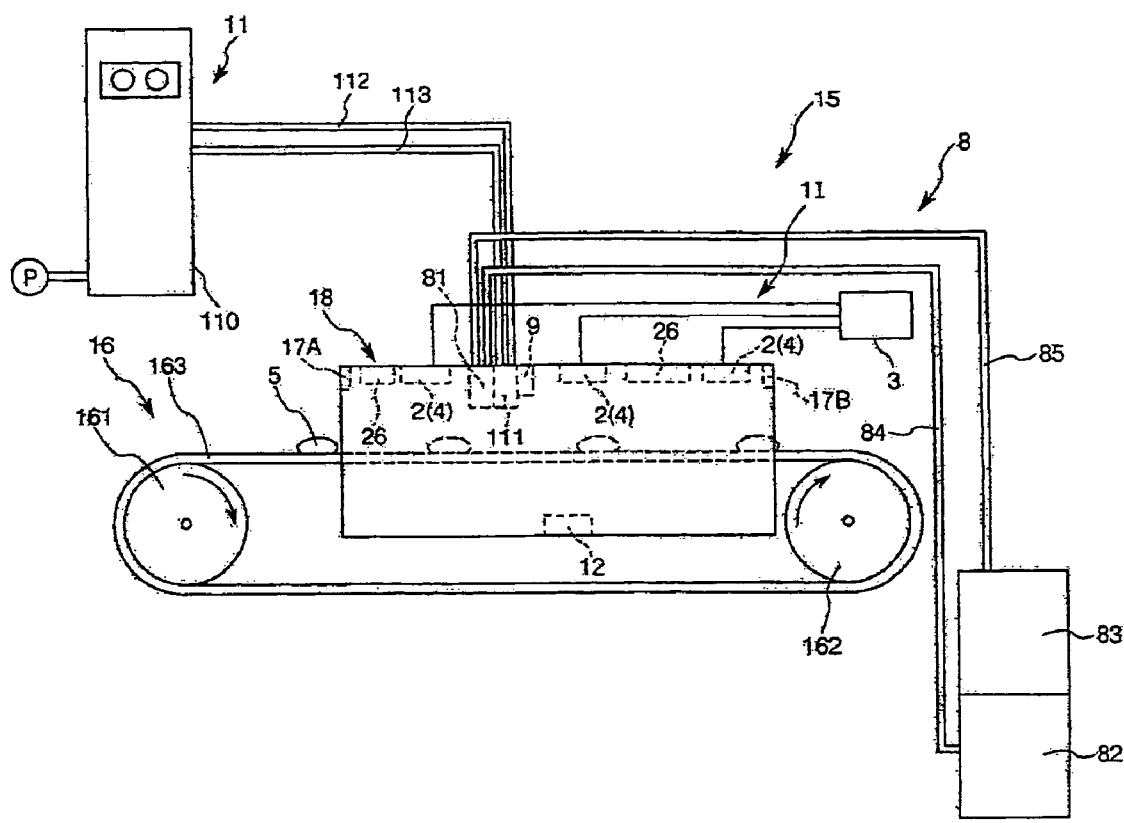
FIG. 20 is a schematic illustration of the freezer shown in FIG. 19 viewed from the side thereof.
Figure 21:
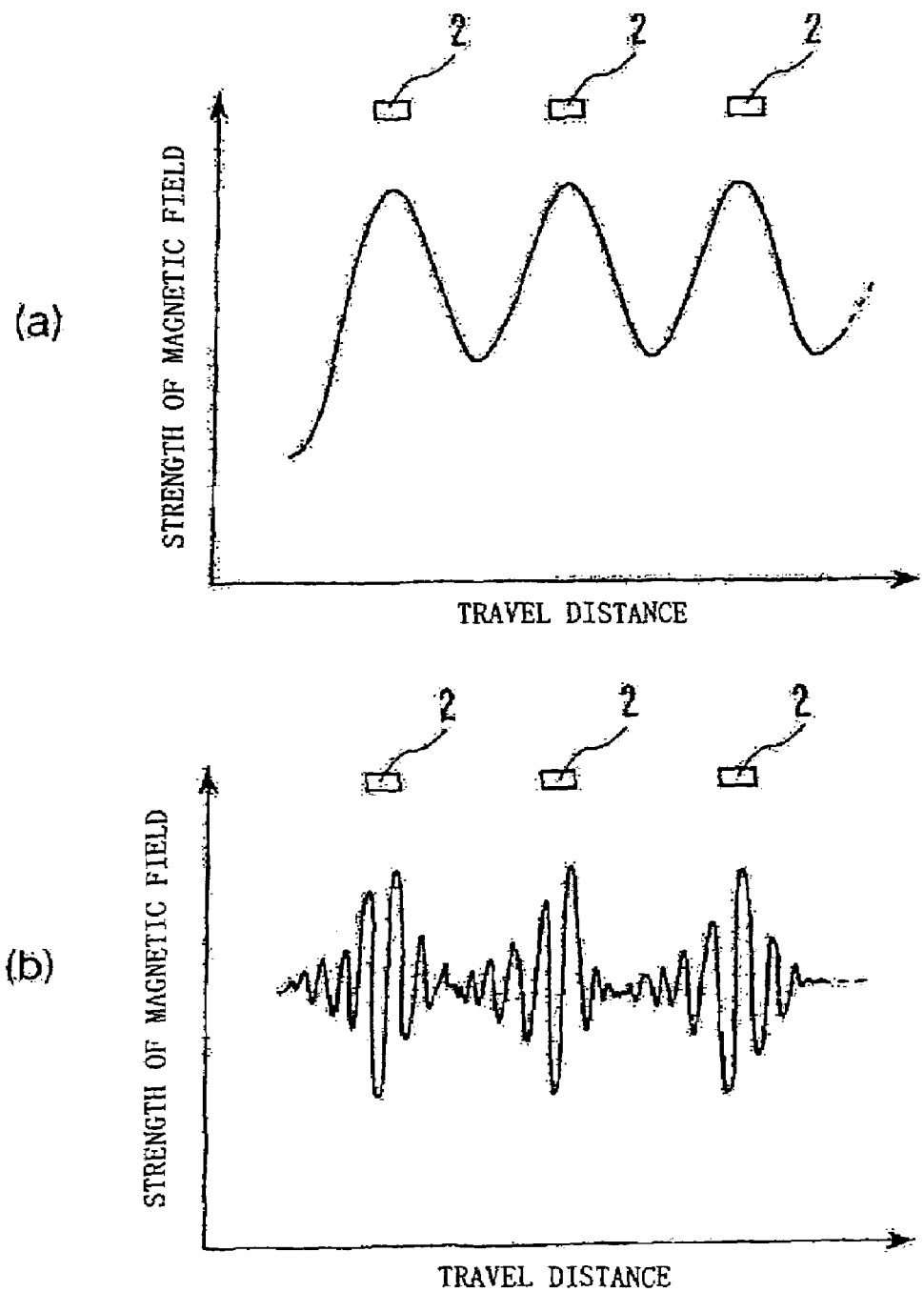
FIG. 21 is a schematic illustration showing the strength of the magnetic fields imparted to objects to be frozen by the magnetic field generating devices installed in the freezer shown in FIG. 19.

FIG. 19 a perspective view schematically showing a freezer in accordance with the 9th embodiment of the present invention, FIG. 20 is a schematic illustration of the freezer shown in FIG. 19 viewed from the side thereof, and FIG. 21 is a schematic illustration showing the strength of the magnetic fields imparted to objects to be frozen by the magnetic field generating devices installed in the freezer shown in FIG. 19.

Hereinafter, the freezer and the freezing method according to the 9th embodiment will be described mainly on the points different from the above-described embodiments, and as to the same items, the description thereof will be omitted.

In a freezer 15 according to this embodiment, the constitution of the cluster fragmenting device 1I is different from those employed in the above-described embodiments, and further this embodiment is different from the above-described embodiments in the point that a tunnel section (freezing compartment) 18, which will be described later, and a belt conveyer (a transport device) 16 are included.

As shown in FIG. 19 and FIG. 20, the freezer 15 according to this embodiment comprises the tunnel section 18, which has a tunnel-like shape, and the belt conveyer 16.

The belt conveyer 16, which will be described later, comprises a pair of rotatable roller 161 and 162 and a transport belt (movable section) 163, which is laid around on the rollers 161 and 162. In an operation, objects 5 to be frozen are placed on the upper face side of the transport belt 163.

On the other hand, the tunnel section 18 has a tunnel-like shape of semi elliptical in section, and is arranged so that the objects 5 to be frozen placed on the transport belt 163 pass through the hollow portion thereof (transported).

As described above, when the freezing compartment through which the objects 5 to be frozen pass through (transported) has a tunnel-like shape, the objects 5 can be frozen while being transported efficiently, and accordingly, for example, the manufacturing efficiency of frozen objects (for example, frozen foods) according to the present invention can be improved.

The length of the tunnel section 18 (length in the direction of the transport belt travel) is not particularly limited; and based on the size, kind and the like of the objects 5 to be frozen, the length thereof is appropriately determined to 3 to 70 m, more preferably to 5 to 60 m, and further preferably to 7 to 40 m.

When the length of the tunnel section 18 is smaller than the above lower limit values, the objects 5 may have difficulty to be frozen satisfactorily depending on the size and/or the like of the objects 5 to be frozen.

On the other hand, when the length of the tunnel section 18 exceeds the above upper limit values, the size of the freezer 15 becomes larger.

In the vicinity of the entrance and the exit of the tunnel section 18, gas jet ports for forming airflow curtain (air curtain), members such as curtains or shutters etc. formed of a various kind of plastic materials, rubber materials or the like, may be provided. A precooling camber to precool the objects 5 to be frozen, and a differential pressure chamber in which the inside pressure is lower than the pressure inside the tunnel section 18 and higher than the outside ambient air pressure (ambient pressure) etc. may be provided. Owing to this, the heat can be efficiently prevented from coming into the tunnel section (freezing compartment) 18 from the outside, and a low temperature state inside the tunnel section 18 can be maintained efficiently. Thus, the energy efficiency of the freezer 15 can be enhanced.

The tunnel section 18 is provided with a magnetic field generating devices 2, a heat exchanger 8, a cold gas supply device (dehumidifying device 11 and fan 9), and sensors 17A and 17B for detecting the transported objects 5 to be frozen. Here, the heat exchanger 8 and the cold gas supply device (dehumidifying device 11 and fan 9) are the same as those employed in the above embodiments. As described above, in the freezer 15 according to this embodiment also, same as the freezers in the above-described embodiments, both of the magnetic field generating devices 2 (cluster fragmenting device 1I) and the cold gas supply device are provided. Owing to this, in this embodiment also, synergy effect as described above can be obtained, and thus, the water clusters can be fragmented efficiently. Accordingly, the quality of the objects to be frozen can be efficiently prevented from being deteriorated.

Further, the heat exchanger 8 has a function to maintain the inside of the tunnel section 18 at a low temperature through exchanging the heat between the inside and the outside of the tunnel section 18. That is, in the heat exchanger 8, the refrigerant filled in the exchanger 8 deprives the heat from the inside of the tunnel section 18 by means of the evaporator 81, thereby the inside of the tunnel section 18 is maintained at a low temperature.

The fan (circulation device) 9 has a function to circulate the dehumidified cold gas inside the tunnel section 18. Since the difference in temperature and humidity at each portion in the tunnel section 18 is small owing to this arrangement, the objects 5 to be frozen can be cooled and frozen at a further stable freezing speed. Further, the pressure value inside the tunnel section (freezing compartment) 18 can be maintained at a higher than the pressure value outside of the tunnel section 18 due to the fact that the fan 9 is provided inside the tunnel section 18. Owing to this, moisture can be efficiently prevented from coming into the inside of the tunnel section 18 even when the air shielding performance inside the freezing compartment (tunnel section 18) is insufficient, compared to the freezers according to the above-described embodiments. Accordingly, the above-described effect becomes further remarkable.

The blowing speed (air blow volume) from the fan 9 is not particularly limited. Following the above embodiments, for example, the blowing speed is preferably 0.5 to 10 m/s, more preferably 2 to 8 m/s.

When the blowing speed from the fan 9 is smaller than the above lower limit value, the difference in temperature at each portion inside the tunnel section 18 may not be controlled to a satisfactorily small level depending on the capacity volume and the like of the tunnel section 18 (volume of hollow portion).

On the other hand, when the blowing speed from the fan 9 exceeds the above upper limit values, the magnetic field generating devices 2 and the cold gas supply device may not function satisfactorily, and there may be such a case that the objects 5 are frozen while the water clusters in the objects 5 is not satisfactorily fragmented. As a result, the quality of the objects 5 to be frozen (foods) may not be satisfactorily prevented or restrained from degrading.

Water vapor content of the cold gas which is supplied by the cold gas supply device is not particularly limited, similar to the above-described embodiments, if it is smaller than the water vapor content (content rate) of the atmosphere. It is preferably $4.0 \times 10^{-3}$ g/L or less, more preferably $3.0 \times 10^{-3}$ g/L or less, and further more preferably $2.0 \times 10^{-4}$ g/L or less. Owing to this, the above-described effects become further remarkable.

Further, during the operation of the freezer 15, the inside pressure of the tunnel section (freezing compartment) 18 is preferably maintained at a higher pressure than the pressure outside the tunnel section (freezing compartment) 18, by 100 Pa or higher, more preferably by 1000 Pa or higher, and further preferably by 3000 Pa or higher. Owing to this, the above-described effects become further remarkable.

Further, during the operation of the freezer 15, the pressure inside the tunnel section (freezing compartment) 18 is preferably controlled to $1.02 \times 10^5$ Pa or higher, more preferably $1.03 \times 10^5$ Pa or higher, and further preferably $1.05 \times 10^5$ to $8 \times 10^5$ Pa. Owing to this, the above-described effects are further remarkable.

When the freezer 15 is in use, the temperature inside the tunnel section 18 (the temperature in the central area of the tunnel section 18 in the longitudinal direction) is not particularly limited if the temperature is low enough to freeze at least a part of the objects 5 to be frozen, however, for example, the temperature is preferably controlled to be −20° C. or less, more preferably −80° C. to −20° C., further preferably −70° C. to −30° C. By controlling the temperature inside of the tunnel section 18 at −20° C. or less, the objects 5 can be frozen in a state that the water clusters contained in the objects 5 is fragmented satisfactorily (in a state that the hydrogen bond is cut off efficiently). As a result, the quality of the objects 5 can be maintained for a satisfactory long period of time.

The objects 5 transported into the tunnel section 18 are frozen. At this time, the water clusters contained in the objects 5 are fragmented (the hydrogen bonds among the moisture molecules are partially cut off) owing to the function of the magnetic field generated by the magnetic field generating devices 2. Further, the magnetic field generating devices 2 are connected to a magnetic field controlling device (magnetic field controller) 3. The magnetic field generating devices 2 and the magnetic field control device 3 are the same as those employed in the above-described embodiments.

The objects 5 to be frozen pass through (transported) the tunnel section 18 by means of the belt conveyer 16, which will be described later in detail. At this time, the relative position between the objects 5 to be frozen and the magnetic field generating devices 2 changes with time. Accordingly, the strength of the magnetic fields imparted to the objects 5 to be frozen from the magnetic field generating devices 2 changes with time elapsed.

When the freezer 15 is in use, as described above, the inside temperature of the tunnel section 18 is controlled at a temperature capable to freeze at least a part of the objects 5 to be frozen. Owing to this, the water clusters contained in the objects 5 to be frozen are solidified in an efficiently fragmented state. Consequently, the crystals of ice formed in the objects 5 to be frozen are also fragmented (crystals with small diameter).

Further, for example, by changing the direction and/or amount of the current passing through the coils 21, the strength of the magnetic field generated by the magnetic field generating devices 2 can be changed. As a result, the strength of the magnetic field imparted to the objects 5 to be frozen, which are transported into the inside of the tunnel section 18 by the belt conveyer 16 (magnetic force received by the objects 5 to be frozen) can be changed further efficiently or further complicatedly. As a result, hydrogen bonds in the objects 5 to be frozen can be cut off further efficiently, and the water clusters can be fragmented efficiently. Accordingly, the quality such as flavor, appearance, fragrance and the like of the objects 5 (foods) to be frozen can be particularly prevented from being deteriorated.

In the tunnel section 18, disposition of at least one magnetic field generating device 2 is sufficient, however, as shown FIG. 20, it is preferred to dispose a plurality of magnetic field generating devices 2. Owing to this, the water clusters in the objects 5 to be frozen can be fragmented further efficiently.

When plural magnetic field generating devices 2 are in use, they are preferably disposed along the transport path of the objects 5 to be frozen (in the constitution shown in the figure, plural magnetic field generating devices 2 disposed on the inner surface upper portion of the tunnel section 18 along the transport path of the objects 5 to be frozen). Owing to this, the water clusters in the objects 5 to be frozen can be fragmented further efficiently. Also, in this case, plural magnetic field generating devices 2 are preferably disposed at substantially uniform intervals. Owing to this, the above-described effects become further remarkable.

Further, the freezer 15 may have the same energy imparting device 4 as that employed in the above embodiments.

The energy imparting device 4 may be disposed in any portion, but is preferably disposed inside the tunnel section 18. Owing to this, the above-described effects become further remarkable.

In the constitution shown in the figure, the magnetic field generating devices 2 and the energy imparting device 4 are integrally formed.

Further, the energy imparting device 4 preferably has low temperature resisting performance, which is capable to withstand the temperature within the tunnel section 18.

Further, the freezer 15 may have the same light irradiating device 26 as what is employed in the above embodiments.

The light irradiating device 26 may be disposed in any portion, but it is preferably to be disposed inside the tunnel section 18 as shown in the figure. Owing to this, the above-described effects become further remarkable.

Further, in the vicinity of the entrance of the tunnel section 18, the sensor 17A for detecting the incoming transported objects 5 to be frozen is disposed. In the case that such a sensor is provided, the operation of the magnetic field generating devices 2 can be controlled based on the information of the objects 5 to be frozen detected by the sensor 17A. Owing to this, the freezing time of the objects 5 to be frozen and the pattern and the like of the magnetic field imparted to the objects 5 can be precisely controlled.

Further, when the detected information of the sensor 17A informs, for example, that there is no object 5 to be frozen in the low temperature condition (when they do not reside inside the tunnel section 18 (hollow portion)), it becomes possible, for example, to stop the magnetic field generation from the magnetic field generating devices 2. For example, it is possible to arrange such configuration that the magnetic field generating devices 2 are kept to suspend the magnetic field generation in a starting up stage of the belt conveyer, and the magnetic field generation starts corresponding to the timing of entering of the objects to the inside of the tunnel section 18, and then the magnetic field generating devices 2 stop the magnetic fields generation if the sensor 17A does not detect the objects 5 to be frozen for predetermined period of time after the detection of the objects to be frozen (last detection). As described above, provision of the sensor 17A improves the energy efficiency of freezing the objects 5 to be frozen.

Further, the constitution shown in FIG. 20 includes a sensor 17B for detecting the transported objects 5 disposed also in the vicinity of the exit of the tunnel section 18. Thus, the operation of the magnetic field generating devices 2 can be controlled further efficiently by disposing the sensor 17B in the vicinity of the exit of the tunnel section 18.

Further, by controlling the operation of the magnetic field generating devices 2 through combining the information detected by the sensors as described above and the parameters of rotation speed of the rollers 161 and 162 (transport speed of the objects 5 to be frozen) and the like, the above-described effects become further remarkable.

The objects 5 to be frozen are transported to the inside of the tunnel section 18 as described above in a state being placed on the transport belt 163 of the belt conveyer (transport device) 16. As described above, since the inside of the tunnel section 18 is maintained at a low temperature by the heat exchanger 8, the transported objects 5 are frozen inside the tunnel section 18.

As described above, since the freezer 15 according to this embodiment has such constitution that the objects 5 can be frozen while being transported, the objects 5 can be frozen continuously, thus the manufacturing efficiency, for example, of the frozen objects (frozen foods, for example) included in the present invention can be increased. Further, according to this embodiment, since the objects 5 to be frozen are transported by the transport device (belt conveyer 16), processes such as packing and the like can be carried out before and after the tunnel section 18. Accordingly, the productivity of the frozen objects can be further improved.

The belt conveyer 16 comprises a pair of rollers 161 and 162 and the transport belt 163 being laid around thereon. The rollers 161 and 162 are driven to rotate by unshown drive source in the direction indicated by the arrows as shown in the figure, and thereby the transport belt 163 is rotated. Owing to this, accompanying the rotation of the transport belt 163, the objects 5 to be frozen placed on the upper face side of the transport belt 163 pass (transported) through the inside of the tunnel section 18.

As for the transport belt 163, for example, on the outer periphery thereof, component members such as plates or trays for placing the objects 5 to be frozen may be provided, or markings and the like for identifying the positions for placing the objects 5 to be frozen may be attached thereto. Owing to this, during the operation of the freezer 15, for example, positions of the objects 5 to be frozen can be easily identified, thus the magnetic fields in the objects 5 to be frozen can be reliably controlled. Accordingly, the water clusters in the objects 5 to be frozen can be fragmented further efficiently.

In the constitution shown in the figure, the transport belt 163 is laid around on the pair of rollers 161 and 162. However, it is needless to say that, between the both end rollers 161 and 162, one or more same rollers may be provided.

The transport speed (relative travel speed with respect to the tunnel section 18) of the objects 5 to be frozen is not particularly limited, but it is preferable to set to 0.1 to 60 m/minute, more preferably set to 0.3 to 10 m/minute, and further preferably set to 0.5 to 6 m/minute.

When the travel speed of the objects 5 to be frozen is set to the lower limit value or less, satisfactory number of the objects 5 to be frozen per unit time may not be ensured.

On the other hand, when the travel speed of the objects 5 to be frozen exceeds the upper limit value, depending on the length and the like of the tunnel section 18, the objects 5 may not be satisfactorily frozen.

The transport speed of the objects 5 to be frozen can be changed by controlling appropriately the rotation speed of the rollers 161 and 162. Owing to this, for example, corresponding to the temperature inside the tunnel section 18 and various conditions (for example, kind, configuration, volume, weight, density, water content rate and the like) of the objects 5 to be frozen, the objects 5 can be transported at a desired speed (for example, when the weight of the objects 5 to be frozen is relatively large, the transport speed is reduced). Consequently, even when objects 5 to be frozen having different conditions, the objects 5 can be reliably frozen under uniform conditions, thus frozen objects with a stable quality can be provided.

In the freezer 15 as described above, the objects 5 to be frozen are placed on the transport belt 163 and transported through the inside of the tunnel section 18 while being subjected to the magnetic fields from the magnetic field generating devices 2. At this time, the objects 5 to be frozen on the transport belt 163 travels relatively with respect to the magnetic field generating devices 2 inside the tunnel section 18.

Accordingly, for example, even when the strength of the magnetic fields generated by the magnetic field generating devices 2 inside the tunnel section 18 are constant, the strength of the magnetic fields imparted to the objects 5 to be frozen can be changed with time elapsed.

FIG. 21(*a*) shows an example of the strength of the magnetic fields imparted to the objects 5 to be frozen when the magnetic fields are generated at a constant strength from the magnetic field generating devices 2. The abscissa axis represents the travel distance of the objects to be frozen, and the vertical axis represents the strength of magnetic field in the objects to be frozen.

As described above, even when the strength of the magnetic fields generated by the magnetic field generating devices 2 is constant, accompanying with the change of distance between the objects 5 to be frozen and the magnetic field generating devices 2, coming closer thereto and going away therefrom inside the tunnel section 18, the strength of the magnetic fields in the objects 5 changes with time elapsed. That is, the strength of the magnetic fields in the objects 5 to be frozen increases as the objects 5 come closer to the magnetic field generating devices 2, and when the distance between the objects 5 and the magnetic field generating devices 2 is the shortest, the strength of the magnetic fields in the objects 5 to be frozen becomes maximum. And as the objects 5 go away from the magnetic field generating devices 2, the strength of the magnetic fields in the objects 5 decreases. As described above, since the strength of the magnetic fields in the objects to be frozen changes with time elapsed, the water clusters in the objects 5 are fragmented efficiently.

Also, FIG. 21(*b*) shows an example of the strength of the magnetic fields imparted to the objects 5 to be frozen when alternate magnetic fields are generated from the magnetic field generating devices 2. The abscissa axis represents travel distance of the objects to be frozen, and the vertical axis represents the strength of the magnetic fields in the objects to be frozen.

As described above, when the alternate magnetic fields are generated from the magnetic field generating devices 2, even when the amplitude of the magnetic fields generated by the magnetic field generating devices 2 is constant, the amplitude of the magnetic fields received by the objects 5 to be frozen changes with time elapsed. That is, the amplitude of the magnetic fields received by the objects 5 to be frozen increases as the objects 5 come closer to the magnetic field generating devices 2, and when the distance between the objects 5 and the magnetic field generating devices 2 is the shortest, the strength of the magnetic fields in the objects 5 become maximum. And, as the objects 5 to be frozen go away from the magnetic field generating devices 2, the amplitude of the magnetic fields received by the objects 5 becomes smaller. As described above, since the amplitude of the magnetic fields received by the objects 5 changes, the water clusters in the objects 5 can be fragmented further efficiently.

Further, such constitution that the frequency, strength and the like of the magnetic fields generated by the magnetic field generating devices 2 are controlled corresponding to, for example, the transport speed and the like of the objects 5 to be frozen may be employed. Owing to this, any wave patterns of the magnetic fields (magnetic field generation pattern) can be formed. For example, corresponding to the temperature inside the tunnel section 18, various conditions such as kind, configuration, volume, weight, density, water content rate of the objects 5 to be frozen, the magnetic fields received by the objects 5 can be controlled to a desired configuration and strength. As a result, the water clusters contained in the objects 5 to be frozen can be fragmented more effectively.

As described above, in the freezer 15 according to this embodiment, since the magnetic field generating devices 2 are provided in the freezing compartment (tunnel section 18), the magnetic fields with desired pattern can be imparted to the objects 5 to be frozen.

Particularly, in the freezer 15 according to this embodiment, since it is arranged so that, as described above, the objects 5 to be frozen receive the magnetic fields while traveling relatively with respect to the magnetic field generating devices 2 disposed in the tunnel section 18, the following effects also can be obtained.

That is, even when the strength of the magnetic fields from the magnetic field generating devices 2 in the tunnel section 18 is constant, the magnetic fields imparted to the objects 5 to be frozen change with time elapsed. Accordingly, the magnetic fields generated by the magnetic field generating devices 2 are not limited to the magnetic fields changing strength with time elapsed. Even when the steady state magnetic fields of which strength is constant, the water clusters in the objects to be frozen can be fragmented efficiently. Accordingly, the range of the selectable patterns of the magnetic fields (size, configuration, and changing pattern with time elapsed etc of the magnetic fields) is wide, and thus a high freedom of apparatus structure is obtained.

Further, particularly, when the magnetic fields generated by the magnetic field generating devices 2 change with time elapsed like alternate magnetic fields and pulse-like magnetic fields, as described above, in addition to the changes of the magnetic fields due to the relative movement of the objects, periodical minute changes of the fields due to the alternate magnetic fields are overlapped with each other, hence the water clusters in the objects 5 to be frozen are fragmented effectively. Accordingly, microscopic structure of the objects 5 to be frozen as described above can be more reliably prevented or restrained from being changed. Accordingly, the conservation performance of the objects 5 can be largely improved.

Further, in this embodiment, magnetic field generating devices, which are disposed in the tunnel section (freezing compartment) in fixed manner, have been described. However, the magnetic field generating devices may be movable in any direction, one-dimensional, two-dimensional or three-dimensional directions. Further, when plural magnetic field generating devices are provided, the movable direction may be the same with or different from each other.

Further, in this embodiment, such constitution has been described that a tunnel-like shape freezing compartment (tunnel section) is provided. However, if a freezing compartment is arranged so that the objects to be frozen can be transported by the transport device, any configuration may be employed.

Further, in this embodiment, such constitution has been described that the magnetic field generating devices 2 are disposed inside the tunnel section 18. However, such constitution that, for example, the magnetic field generating devices 2 are embedded in the tunnel section 18 may be employed.

Further, in this embodiment, such constitution has been described that the belt conveyer is provided as the transport device. However, the transport device is not limited to the above. The transport device for transporting the objects to be frozen may be such a conveyer constitution as, for example, used in circulating sushi restaurants, or may has such constitution that the objects 5 to be frozen are transported on the transport path in a state being hooked on hooks of the transport device.

Next, a 10th embodiment of the freezer and the freezing method of the present invention will be described.

Figure 22:
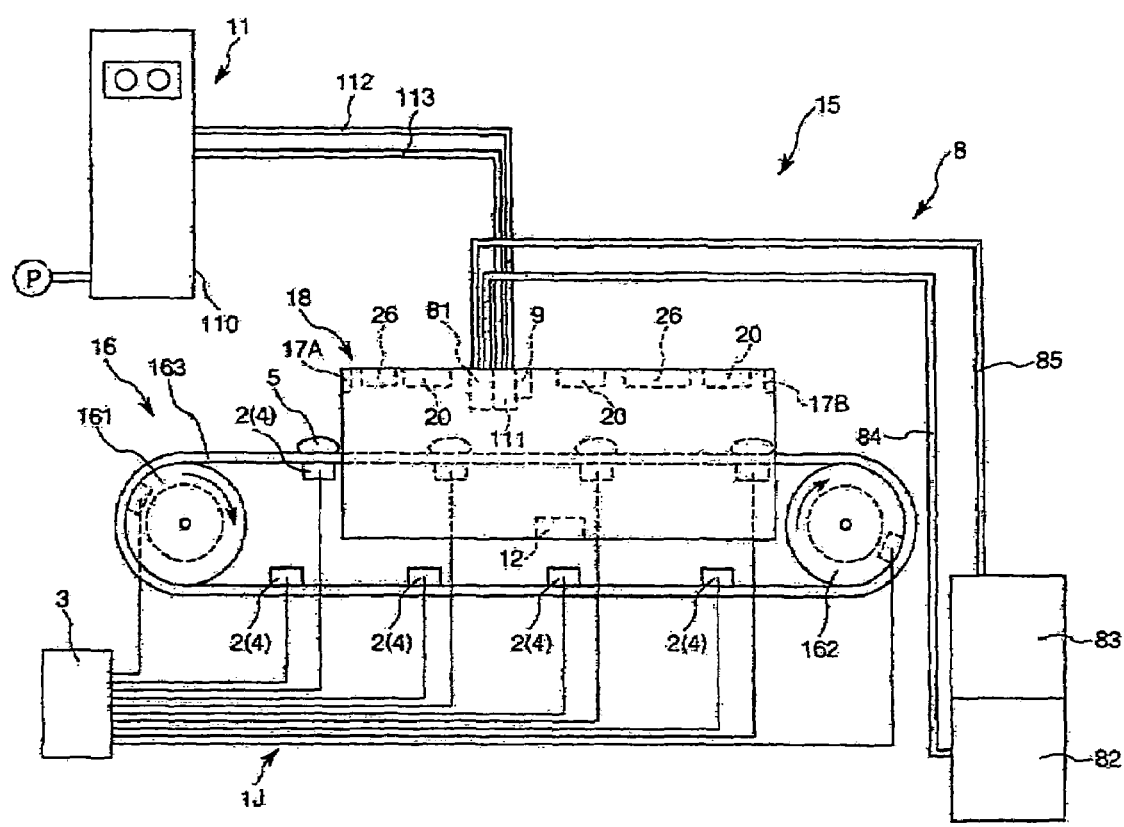
FIG. 22 is a schematic illustration of a freezer in accordance with a 10th embodiment of the present invention viewed from the side thereof.
Figure 23:
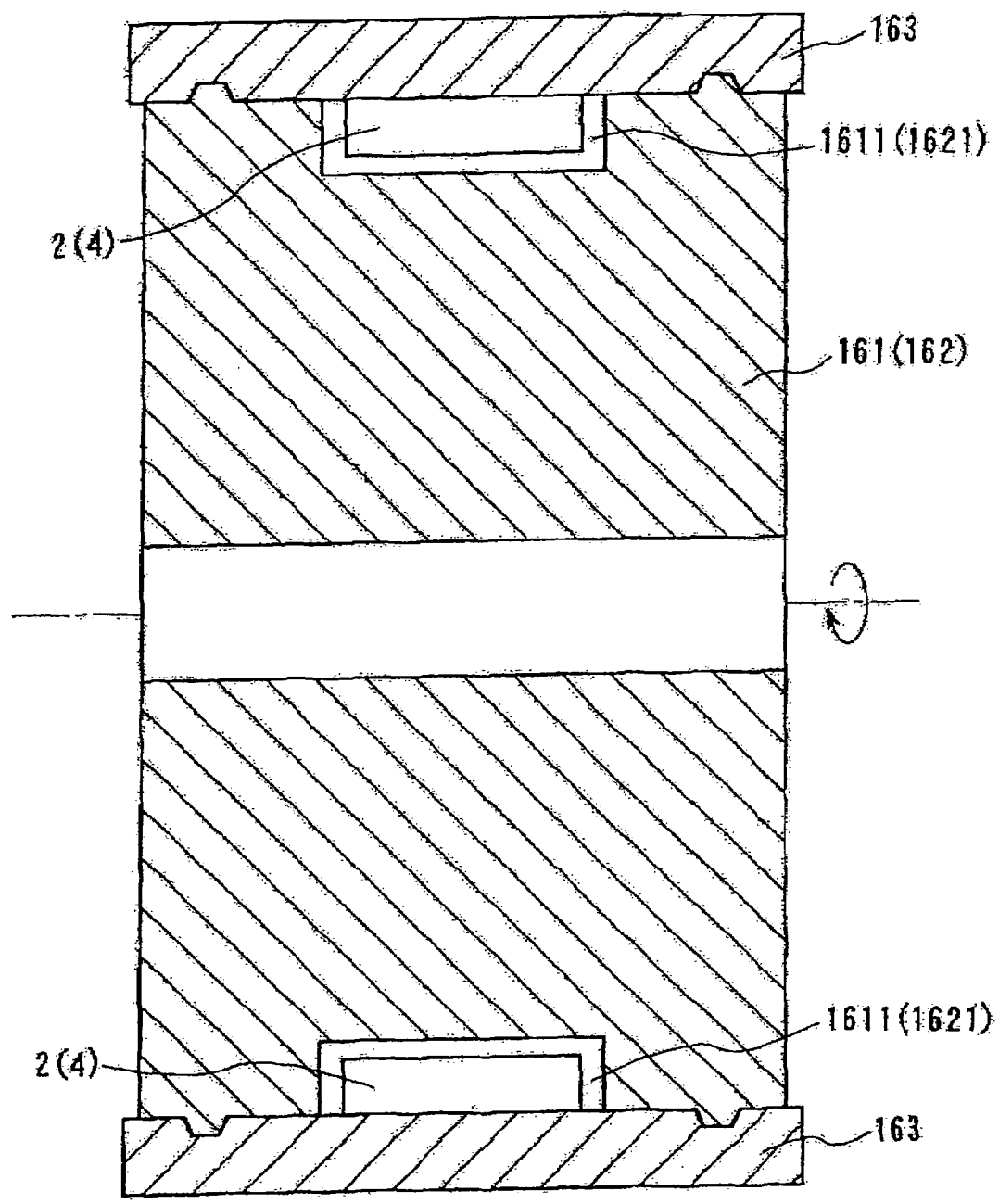
FIG. 23 is a schematic illustration showing a sectional configuration of a roller included in the freezer shown in FIG. 22.

FIG. 22 is a schematic illustration of a freezer in accordance with the 10th embodiment of the present invention viewed from the side thereof, and FIG. 23 is a schematic illustration showing a sectional configuration of a roller included in the freezer shown in FIG. 22.

Hereinafter, the freezer and the freezing method according to the 10th embodiment will be described mainly on the points different from the above-described embodiments, and as to the same items, the description thereof will be omitted.

The freezer 15 according to this embodiment is different from that of the 9th embodiment in a location point of the magnetic field generating devices 2, and further, the freezer 15 is different from that of the 9th embodiment in a point that permanent magnets 20 are included. That is, in the freezer 15 according to this embodiment, the constitution of the cluster fragmenting device 1J is different from what is employed in the above-described embodiments.

As shown in FIG. 22, in the freezer 15 according to this embodiment, the magnetic field generating devices 2, which move accompanying the transportation of the objects 5 to be frozen, are disposed on the inside periphery surface of the transport belt 163. That is, the magnetic field generating devices 2 are arranged so as to circulate along the transportation path of the objects 5 to be frozen. The magnetic field generating devices 2 as described above have at least a function to impart the magnetic fields to the objects 5 to be frozen when the objects 5 pass through the inside of the tunnel section 18. At this time, owing to the function of the magnetic fields generated by the magnetic field generating devices 2, the water clusters contained in the objects 5 to be frozen are fragmented, and the fragmented water clusters are solidified as they are. Owing to this, crystals of ice formed in the objects 5 are also fragmented.

Here, when a plural magnetic field generating devices 2 are disposed on the transport belt 163, a specific magnetic field generating device is detected among plural magnetic field generating devices 2 (for example, the magnetic field generating device 2 which is brought in the inside of the tunnel section 18, or the magnetic field generating device 2, which is brought out of the tunnel section 18), and the detected magnetic field generating device 2 can be controlled to start/stop the magnetic fields generation individually. Owing to this, the above-described effects are demonstrated remarkably.

Further, as shown in FIG. 23, the roller 161 has a relief slot (groove) 1611 on the periphery surface for accommodating magnetic field generating devices 2, and likewise the roller 162 has a relief slot 1621. By providing such relief slots, it is possible to efficiently prevent the magnetic field generating devices 2 provided on the inside periphery surface of the transport belt 163 from coming into contact with the rollers 161 and 162 and to allow the rollers 161 and 162 to rotate smoothly. As a result, the objects 5 to be frozen can be transported smoothly at a desired speed.

The magnetic field generating devices 2 disposed on the transport belt 163 are the same as the magnetic field generating devices described in the above embodiments. Therefore, the strength of the magnetic fields generated by the coils 21 included therein can be changed. Accordingly, it is possible to change the strength of the magnetic fields with time elapsed in the objects 5 to be frozen placed in the vicinity of the magnetic field generating devices 2.

Further, as described above, according to this embodiment, the magnetic field generating devices 2 are arranged so as to circulate along the transport path of the objects 5 to be frozen. Owing to this, even when there are many objects 5, they can be frozen continuously. Accordingly, for example, the manufacturing efficiency of frozen objects (for example, frozen foods) included in the present invention can be further increased.

In the constitution shown in the figure, the magnetic field generating devices 2 are disposed in the vicinity of portions where the objects 5 to be frozen are placed (loading part), i.e., on the inside periphery surface of the transport belt 163 where the objects 5 to be frozen are placed (loading part). By disposing the magnetic field generating devices 2 at such portions as described above, the influence of the magnetic fields generated by the magnetic field generating devices 2 can be imparted to the objects 5 to be frozen more efficiently. As a result, the above-described effects are exercised further remarkably.

Further, in the tunnel section 18, plurality of permanent magnets 20 are disposed so as to face to objects 5 to be frozen placed on the transport belt 163.

By disposing the permanent magnets 20 as described above, the magnetic fields from permanent magnets 20 function along with the magnetic fields generated by the magnetic field generating devices 2, thereby the influence of the magnetic fields on the objects 5 to be frozen can be further increased.

As described, according to this embodiment, the pattern of the magnetic fields generated by the magnetic field generating devices can be changed with time elapsed based on the temperature and the like of the ambient air, because the magnetic field generating devices are provided which move accompanying the feed of the transport device (belt conveyer). Accordingly, the objects can be frozen more efficiently in a state that the clusters in the objects are fragmented.

Further, in this embodiment, such constitution that the magnetic field generating devices are disposed on the movable section (transport belt) of the transport device has been described. However, when the magnetic field generating devices move accompanying the transportation of the objects to be frozen by the transport device, any constitution may be employed. That is, the magnetic field generating devices may not be disposed on the transport device.

Next, an 11th embodiment of the freezer and the freezing method of the present invention will be described.

Figure 24:
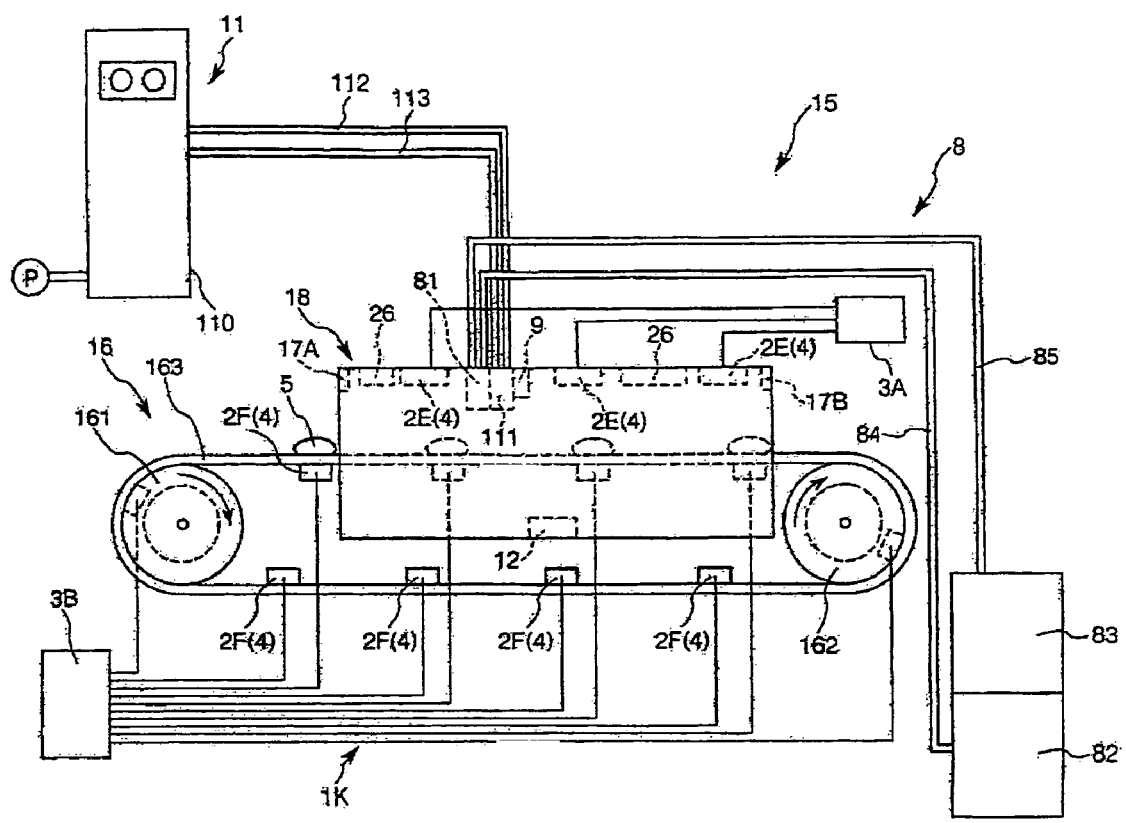
FIG. 24 is a schematic illustration of a freezer in accordance with an 11th embodiment of the present invention viewed from the side thereof.
Figure 25:
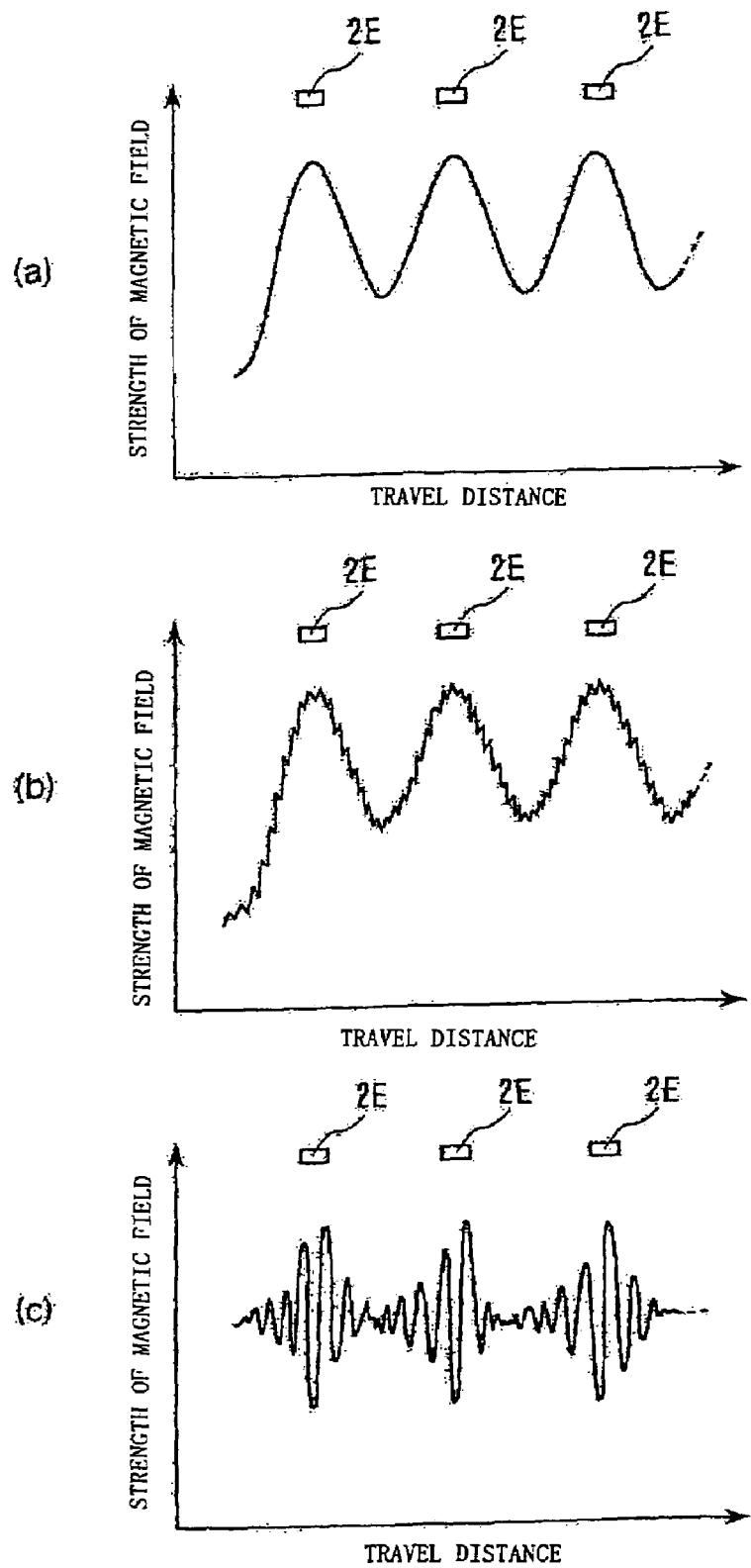
FIG. 25 is a schematic illustration showing the strength of the magnetic fields imparted to objects to be frozen by each of the magnetic field generating devices installed in the freezer shown in FIG. 24.

FIG. 24 is a schematic illustration of a freezer in accordance with the 11th embodiment of the present invention viewed from the side thereof, and FIG. 25 is a schematic illustration showing the strength of the magnetic fields imparted to the objects to be frozen by the magnetic field generating devices installed in the freezer shown in FIG. 24.

Hereinafter, the freezer and the freezing method according to the 11th embodiment will be described mainly on the points different from the above-described embodiments, and as to the same items, the description thereof will be omitted.

The freezer 15 according to this embodiment is different from the 10th embodiment in a point that the magnetic field generating devices are disposed both on the ceiling portion (inner surface of upper portion) of the tunnel section 18 and on the inside periphery surface of the transport belt 163. That is, in the freezer 15 according to this embodiment, the constitution of the cluster fragmenting device 1K is different from what is used in the above-described embodiments.

As shown in FIG. 24, according to this embodiment, plural first magnetic field generating devices (fixed magnetic field generating devices) 2E are disposed on the ceiling portion of the tunnel section 18, and plural second magnetic field generating devices (movable magnetic field generating devices) 2F are disposed on the inside periphery surface of the transport belt 163 on the belt conveyer 16, which travel accompanying the transportation of the objects 5 to be frozen. The constitution and function of the first magnetic field generating devices 2E and the second magnetic field generating devices 2F are the same as the constitution and function of the magnetic field generating devices employed in the above-described embodiments.

Further, according to this embodiment, the objects 5 to be frozen transported into the inside of the tunnel section 18 are frozen. At this time, owing to the function of the magnetic fields generated by the first magnetic field generating devices 2E and the second magnetic field generating devices 2F, the water clusters contained in the objects 5 to be frozen are fragmented. And, the first magnetic field generating devices 2E and the second magnetic field generating devices 2F are connected to the magnetic field control devices 3A and 3B respectively. The constitution and function of the magnetic field control devices 3A and 3B also the same as the constitution and function of the magnetic field control device employed in the above-described embodiments.

In the tunnel section 18, at least one first magnetic field generating devices 2E is sufficient to be disposed. However, as shown in FIG. 24, preferably plurality of first magnetic field generating devices 2E are disposed. Owing to this, the water clusters in the objects 5 to be frozen can be fragmented further efficiently.

When plural first magnetic field generating devices 2E are used, they are preferably disposed along the transportation path of the objects 5 to be frozen.

Further, in the constitution shown in the figure, the first magnetic field generating devices 2E are disposed on the ceiling portion of the tunnel section 18. However, when the magnetic fields of a predetermined strength can be imparted to the objects 5 to be frozen in at least a part of the inside of the tunnel section 18, the installation position thereof is not particularly limited, but may be, for example, installed on the outer side surface or inner side surface etc of the tunnel section 18. Further, the first magnetic field generating devices 2E may be embedded in the tunnel section 18.

The distance (shortest distance) between the first magnetic field generating devices 2E and the objects 5 to be frozen is not particularly limited, but it is preferable to set to, for example, 150 cm or less, more preferably 50 cm or less, and further preferably 20 cm or less.

Further, the second magnetic field generating devices 2F are disposed on the transport belt 163 of the belt conveyer 16. The second magnetic field generating devices 2F are arranged so as to circulate along the transportation path of the objects 5 to be frozen. Owing to this, even when there are many objects 5 to be frozen, they can be frozen continuously. Accordingly, for example, the manufacturing efficiency of frozen objects (for example, frozen foods) according to the present invention can be further improved.

On the transport belt 163, at least one of the second magnetic field generating devices 2F is sufficient to be disposed. However, as shown in FIG. 24, it is preferable to dispose plural second magnetic field generating devices 2F. Owing to this, the water clusters in the objects 5 to be frozen can be fragmented further efficiently.

When a plural second magnetic field generating devices 2F are used, they are preferably disposed at substantially uniform intervals. Owing to this, the above-described effects are exercised further remarkably. Further, in plural second magnetic field generating devices 2F, the strength, cycle, output time duration, phase and the like of the generated magnetic fields may be the same with or different from each other.

The installation position of the second magnetic field generating devices 2F is not particularly limited, but for example, it may be on the outer periphery side of the transport belt 163 and the like. That is, the second magnetic field generating devices 2F may function as the loading part as well. Further, the second magnetic field generating devices 2F may be disposed directly on the surface of the transport belt 163, or for example, may be disposed on the transport belt 163 interposed by a separate member.

Further, in the constitution shown in the figure, it is arranged so that, the first magnetic field generating devices 2E and the second magnetic field generating devices 2F face to each other being interposed by the transport path for the objects 5 to be frozen inside the tunnel section 18. By employing such constitution, the influence of the magnetic fields generated by the first magnetic field generating devices 2E and the second magnetic field generating devices 2F can be efficiently imparted to the objects 5 to be frozen. As a result, the hydrogen bond in the objects 5 to be frozen can be cut off further efficiently, and the water clusters can be fragmented efficiently. Accordingly, the quality of the objects 5 to be frozen (foods) such as flavor, appearance, fragrance and the like is hardly deteriorated particularly.

Here, the magnetic fields generated by the second magnetic field generating devices 2F may have the same strength, cycle, output time duration, phase and the like with those of the first magnetic field generating devices 2E or may have different ones.

Further, the second magnetic field generating devices 2F disposed on the transport belt 163 may have the same constitution with or different constitution from the first magnetic field generating devices 2E disposed on the tunnel section 18.

Each of the first magnetic field generating devices 2E and the second magnetic field generating devices 2F is preferably provided with an energy imparting device 4.

In the freezer 15 as described above, the objects 5 to be frozen are placed on the transport belt 163 and transported through the inside of the tunnel section 18 while receiving the magnetic fields from the first magnetic field generating devices 2E and the second magnetic field generating devices 2F. At this time, the objects 5 to be frozen on the transport belt 163 relatively move with respect to the first magnetic field generating devices 2E on the tunnel section 18.

Accordingly, for example, even when the strength of the magnetic fields, which are generated by the first magnetic field generating devices 2E inside the tunnel section 18 and the second magnetic field generating devices 2F, is constant, the strength of the magnetic fields imparted to the objects 5 to be frozen changes with time elapsed.

FIG. 25(a) shows an example of the strength of the magnetic fields imparted to the objects 5 to be frozen when the magnetic fields are generated at a constant strength from the first magnetic field generating devices 2E and the second magnetic field generating devices 2F. The abscissa axis represents the travel distance of the objects to be frozen; and the vertical axis represents the strength of the magnetic fields in the objects to be frozen.

As shown in FIG. 25(a), inside the tunnel section 18, when the second magnetic field generating devices 2F come closer to the first magnetic field generating devices 2E and go away therefrom, the strength of the magnetic fields in the objects 5 to be frozen changes with time elapsed. That is, the strength of the magnetic field in the objects 5 to be frozen increases as the objects 5 to be frozen come closer to the first magnetic field generating devices 2E, and when the distance between the objects 5 and the first magnetic field generating devices 2E is the shortest, the strength of the magnetic fields in the objects 5 becomes maximum. And as the objects 5 go away from the first magnetic field generating devices 2E, the strength of the magnetic fields in the objects 5 decreases. Owing to the magnetic fields from the tunnel section 18, which change with time elapsed, and the magnetic fields from the second magnetic field generating devices 2F disposed on the transport belt 163, the water clusters in the objects 5 to be frozen can be fragmented efficiently.

Further, FIG. 25(b) shows an example of the strength of the magnetic fields, which are imparted to the objects 5 to be frozen when the strength of the magnetic fields generated by the first magnetic field generating devices 2E is constant and the alternate magnetic fields are generated by the second magnetic field generating devices 2F. The abscissa axis represents the travel distance of the objects to be frozen, and the vertical axis represents the strength of the magnetic fields in the objects to be frozen.

As shown in FIG. 25(b), when the magnetic fields generated by the second magnetic field generating devices 2F disposed on the transport belt 163 are the alternate magnetic fields, in addition to the changes with time elapsed in the strength of the magnetic fields due to the relative movement between the first magnetic field generating devices 2E inside the tunnel section 18 and the objects 5 to be frozen, the changes with time elapsed of the minute magnetic fields due to the alternate magnetic fields from the second magnetic field generating devices 2F overlap with each other. That is, the changes of the strength of the magnetic fields, which are caused by the movement to come closer to and go away from each of the first magnetic field generating devices 2E and the second magnetic field generating devices 2F, and the minute changes of the strength of the magnetic fields, which are caused by the alternate magnetic fields from the second magnetic field generating devices 2F, overlap with each other. As described above, by imparting the magnetic fields, in which the magnetic field pattern by the first magnetic field generating devices 2E and the magnetic field pattern by the second magnetic field generating devices 2F overlap with each other, to the objects 5 to be frozen, the water clusters in the objects 5 to be frozen can be fragmented further effectively. Even when the magnetic fields generated by the second magnetic field generating devices 2F are pulse-like magnetic fields, excepting the point that the periodical changes of the magnetic fields have a pulse-like shape, the same waveform as that shown in FIG. 25(b) is obtained. Accordingly, the water clusters in the objects 5 to be frozen can be fragmented effectively.

Further, FIG. 25(c) shows an example of the strength of the magnetic fields imparted to the objects 5 to be frozen when the strength of the generated magnetic fields from the second magnetic field generating devices 2F is constant and the alternate magnetic fields are generated from the first magnetic field generating devices 2E. The abscissa axis represents the travel distance of the objects to be frozen, and the vertical axis represents the strength of the magnetic fields in the objects to be frozen.

Further, when the alternate magnetic fields are generated by both of the first magnetic field generating devices 2E and the second magnetic field generating devices 2F, the changing pattern of the strength of the magnetic fields imparted to the objects 5 to be frozen becomes further complicated configuration. Accordingly, the above-described effects are exercised further remarkably.

In this embodiment, such constitution has been described that the first magnetic field generating devices 2E disposed on the tunnel section 18 are fixed to the tunnel section 18. However, it may be arranged so that, for example, the first magnetic field generating devices 2E disposed on the tunnel section 18 are movable in the tunnel section in the vertical direction with respect to the transport direction of the objects 5 to be frozen.

Further, in this embodiment, such constitution has been described that second magnetic field generating devices are disposed on the movable section (transport belt) of the transport device. However, any constitution may be employed if the second magnetic field generating devices move accompanying the transportation of the objects to be frozen by the transport device. That is, the second magnetic field generating devices may not be disposed on the transport device.

Next, a 12th embodiment of the freezer and the freezing method of the present invention will be described.

Figure 26:
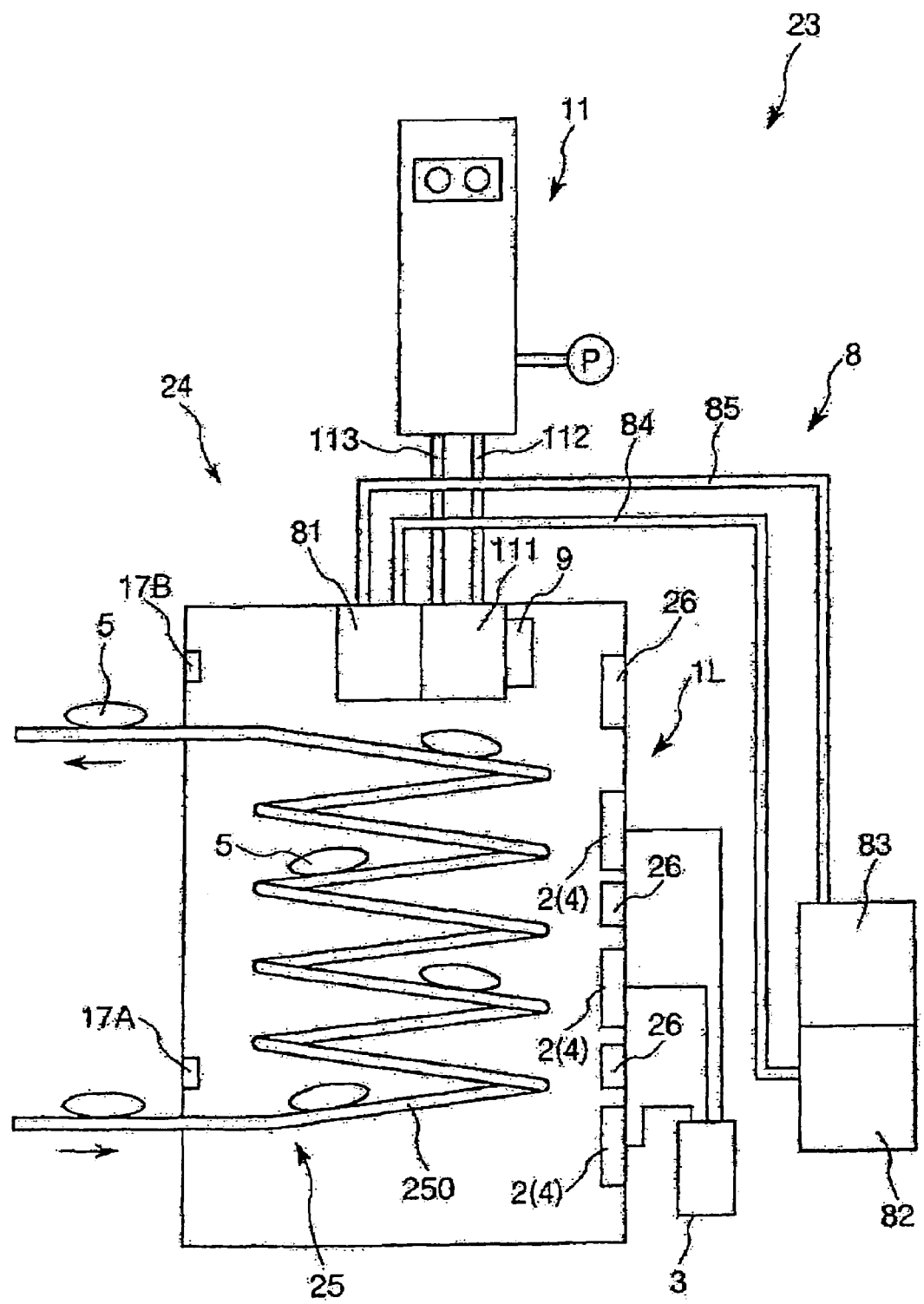
FIG. 26 is a schematic illustration of a freezer in accordance with a 12th embodiment of the present invention viewed from the side thereof.

FIG. 26 is a schematic illustration of a freezer in accordance with the 12th embodiment of the present invention viewed from the side thereof.

Hereinafter, the freezer and the freezing method according to the 12th embodiment will be described mainly on the points different from the above-described embodiments, and as to the same items, the description thereof will be omitted.

The freezer 23 according to this embodiment is, as shown in FIG. 26, different from the above-described 9th to 11th embodiments in the points that, in place of the tunnel section 18, a freezing compartment 24 is provided, and in place of the belt conveyer (transport device) 16, a spiral transport path 25 is provided.

The spiral transport path (spiral conveyer) 25 comprises a guide rail 250, which whirls around the central axis of the freezing compartment 24, plural transport plates (not shown), which are disposed being aligned on the guide rail 250, and a motor (not shown), which provides motive energy to plural transport plates in the direction along the guide rail 250. In the operation, the objects 5 to be frozen are placed on the guide rail 250 via the transport plates.

On the other hand, the freezing compartment 24 has a substantially cylindrical shape including a hollow portion. In the hollow portion, the guide rail 250 is disposed so as to whirl around the central axis of the freezing compartment 24. The objects 5 to be frozen are transported being whirled inside the freezing compartment 24 by the spiral transport path 25 from the lower portion toward the upper portion thereof.

As described above, since the guide rail 250 of the spiral transport path 25 whirls around the central axis of the freezing compartment 24, many objects 5 to be frozen can be received inside the freezing compartment 24 at a time. Accordingly, for example, the manufacturing efficiency of the frozen objects (for example, frozen foods) can be increased as well as the size of the freezing compartment 24 can be reduced.

In the vicinity of the entrance and the exit of the freezing compartment 24, members such as gas jet ports for forming airflow curtain (air curtain), curtains formed of a various kind of plastic material, rubber material or the like, and shutters etc. may be provided. A precooling camber to precool the objects 5 to be frozen, a differential pressure chamber the inside pressure of which is lower than the pressure inside the freezing compartment 24 and higher than the atmosphere pressure (ambient pressure) etc. may be provided. Owing to this, the heat can be efficiently prevented from coming into the freezing compartment from the outside, and a low temperature state inside the freezing compartment 24 can be maintained efficiently. Thus, the energy efficiency of the freezer 23 can be increased.

Same as the freezer according to the above-described embodiments, the freezer 23 according to this embodiment is also provided with a cluster fragmenting device 1L, which is provided with plural magnetic field generating devices 2 and a magnetic field control device 3.

The freezing compartment 24 is provided with a magnetic field generating devices 2, a heat exchanger 8, a cold gas supply device (dehumidifying device 11 and fan 9), and sensors 17A and 17B for detecting the transported objects 5 to be frozen. Particularly, plural magnetic field generating devices 2 are disposed on the inner surface of the freezing compartment 24 along the vertical direction of the freezing compartment 24 facing to the guide rail 250. Here, the heat exchanger 8 and the cold gas supply device(dehumidifying device 11 and fan 9) are the same as those employed in the above embodiments. As described above, in the freezer 23 according to this embodiment also, same as the freezers in the above-described embodiments, both of the magnetic field generating devices (cluster fragmenting device) and the cold gas supply device are provided. Owing to this, in this embodiment also, synergy effect as described above can be obtained, and thus, the water clusters can be fragmented efficiently. Accordingly, the quality of the objects to be frozen can be efficiently prevented from being deteriorated.

The fan 9 has a function to circulate the cold gas (cold air) inside the freezing compartment 24. Owing to this arrangement, the temperature difference at each portion in the freezing compartment 24 is small, thereby the objects 5 to be frozen can be cooled and frozen at a further stable freezing speed. Further, by providing the fan 9 inside the freezing compartment 24, the pressure value inside freezing compartment 24 can be maintained at a higher pressure value than the outside of the freezing compartment 24. Owing to this, compared to the freezers according to the above-described embodiments, moisture can be efficiently prevented from coming into the inside of the freezing compartment 24 even if the air shielding performance inside the freezing compartment 24 is insufficient. Accordingly, the above-described effects are exercised further remarkably.

The blowing speed (air blow volume) from the fan 9 is not particularly limited. For example, same as the above embodiments, the blowing speed is preferably 0.5 to 10 m/s, more preferably 2 to 8 m/s.

When the blowing speed from the fan 9 is smaller than the above lower limit value, depending on the capacity volume and the like of the freezing compartment 24 (volume to contain in the hollow portion), the temperature difference at each portion inside the freezing compartment 24 may not be controlled to a satisfactorily small level.

On the other hand, when the blowing speed from the fan 9 exceeds the above upper limit values, the magnetic field generating devices 2 and the cold gas supply device may not function satisfactorily, and there may be a case that the objects 5 are frozen in a state where the water clusters in the objects 5 is not satisfactorily fragmented. As a result, the quality of the objects 5 to be frozen may not be satisfactorily prevented or restrained from degrading.

Same as the above-described embodiments, the content of water vapor of the cold gas is not particularly limited if the content of water vapor of the cold gas supplied by the cold gas supply device is smaller than the content of water vapor (content) of the atmosphere. It is preferably $4.0 \times 10^{-3}$ g/L or less, more preferably $3.0 \times 10^{-3}$ g/L or less, and further more preferably $2.0 \times 10^{-4}$ g/L or less. Owing to this, the above-described effects become further remarkable.

Further, during the operation of the freezer 23, the inside pressure of the freezing compartment 24 is preferably maintained at a higher pressure than the outside pressure of the freezing compartment 24, by 100 Pa or higher, more preferably by 1000 Pa or higher, and further preferably by 3000 Pa or higher. Owing to this, the above-described effects become further remarkable.

Further, during the operation of the freezer 23, the pressure inside the freezing compartment 24 is preferably controlled to $1.02 \times 10^5$ Pa or higher, more preferably $1.03 \times 10^5$ Pa or higher, and further preferably $1.05 \times 10^5$ to $8 \times 10^5$ Pa. Owing to this, the above-described effects are further remarkable.

When the freezer 23 is in use, the temperature inside the freezing compartment 24 is not particularly limited if the temperature is capable to freeze at least a part of the objects 5 to be frozen. However, for example, the temperature is preferably controlled to $-20°$ C. or less, more preferably $-80$ to $-20°$ C., further preferably $-70$ to $-30°$ C. By controlling the temperature inside of the freezing compartment 24 to $-20°$ C. or less, the objects 5 can be frozen in a state that the water clusters contained in the objects 5 is fragmented satisfactorily. As a result, the quality of the objects 5 can be maintained for a satisfactory long period of time.

The objects 5 transported into the freezing compartment 24 are frozen. At this time, owing to the function of the magnetic field generated by the magnetic field generating devices 2, the water clusters contained in the objects 5 are fragmented. Further, the magnetic field generating devices 2 are connected to a magnetic field controlling device 3. The magnetic field generating devices 2 and the magnetic field control device 3 are the same as those employed in the above-described embodiments.

The objects 5 to be frozen pass through the freezing compartment 24 by means of the spiral transport path 25. At this time, the relative position between the objects 5 to be frozen and the magnetic field generating devices 2 changes with time elapsed. Accordingly, the strength of the magnetic fields imparted to the objects 5 to be frozen from the magnetic field generating devices 2 changes with time elapsed.

As described above, during the operation of the freezer 23, the inside of the freezing compartment 24 is controlled to a temperature capable to freeze at least a part of the objects 5 to be frozen. Owing to this, the water clusters contained in the objects 5 to be frozen are solidified in an efficiently fragmented state. Owing to this, the crystals of ice formed in the objects 5 to be frozen are also fragmented.

Further, for example, by changing the direction and/or amount of the current, which passes through the coils 21 of the magnetic field generating devices 2, the strength of the magnetic field generated by the magnetic field generating devices 2 can be changed. As a result, the strength of the magnetic field imparted to the objects 5 to be frozen, which are transported into the inside of the freezing compartment 24 by the spiral transport path 25 can be changed further efficiently or further complicatedly. As a result, hydrogen bonds in the objects 5 to be frozen can be cut off further efficiently, and the water clusters can be fragmented efficiently. Accordingly, the quality such as flavor, appearance, fragrance and the like of the objects 5 to be frozen can be particularly prevented from being deteriorated.

In the freezing compartment 24, at least one of the magnetic field generating devices 2 is sufficient to be disposed. However, as shown FIG. 26, it is preferable to dispose plural magnetic field generating devices 2. Owing to this, the water clusters in the objects 5 to be frozen can be fragmented further efficiently.

When plural magnetic field generating devices 2 are used, they are preferably disposed so as to face to the spiral section of the guide rail 250. Owing to this, the water clusters in the objects 5 to be frozen can be fragmented further efficiently. Also, in this case, plural magnetic field generating devices 2 are preferably disposed at substantially uniform intervals. Owing to this, the above-described effects become further remarkable.

Further, the freezer 23 may have the same energy imparting device 4 as that employed in the above embodiments.

The energy imparting device 4 may be disposed in any portion, but is preferably disposed inside the freezing compartment 24. Owing to this, the above-described effects become further remarkable.

In the constitution shown in the figure, the magnetic field generating devices 2 and the energy imparting device 4 are integrally formed.

Further, the energy imparting device 4 preferably has low temperature resisting performance, which is capable to endure the temperature inside the freezing compartment 24.

Further, the freezer 23 may have the same light irradiating device 26 as that employed in the above embodiments.

The light irradiating device 26 may be disposed in any portion, but is preferably disposed inside the freezing compartment 24 as shown in the figure. Owing to this, the above-described effects become further remarkable.

Further, in the vicinity of the entrance of the freezing compartment 24, the sensor 17A for detecting the transported objects 5 to be frozen is disposed, and also in the vicinity of the exit of the freezing compartment 24, a sensor 17B for detecting the objects 5 to be frozen being transported is disposed. The effect and function of these sensors 17A and 17B are the same as those of the sensors 17A and 17B used in the above-described embodiment.

As described above, since the freezer 23 according to this embodiment has such constitution that the objects can be frozen while being transported, the objects can be frozen continuously. For example, the manufacturing efficiency of the frozen objects (for example, frozen foods) included in the present invention can be increased. Further, according to this embodiment, since the objects to be frozen are transported by the transport device, processes such as packing and the like can be carried out before and/or after the freezing compartment. Accordingly, the productivity of the frozen objects can be further increased.

Further, since the spiral transport path 25 is disposed so that, in the freezing compartment 24 of cylindrical shape, the guide rail 250 of the spiral transport path 25 in the freezing compartment 24 whirls around the central axis of the freezing compartment 24, the freezing compartment 24 can be formed smaller in size.

The transport speed of the objects 5 to be frozen is not particularly limited, but it is preferable to set to 0.1 to 60 m/minute, more preferably set to 0.3 to 10 m/minute, and further preferably set to 0.5 to 6 m/minute.

When the travel speed of the objects 5 to be frozen is set to the above-mentioned lower limit value or less, satisfactory number of the objects 5 per unit time may not be ensured.

On the other hand, when the travel speed of the objects 5 to be frozen exceeds the above-mentioned upper limit value, depending on the size and the like of the freezing compartment 24, the objects 5 may not be satisfactorily frozen.

In the freezer 23 as described above, the objects 5 to be frozen are placed on the guide rail 250 via transport plates and transported though the inside of the freezing compartment 24 while being subjected to the magnetic field from the magnetic field generating devices 2. At this time, the objects 5 to be frozen on the guide rail 250 relatively travels with respect to the magnetic field generating devices 2 inside the freezing compartment 24.

Further, such constitution may be employed as the frequency, strength and the like of the magnetic fields generated by the magnetic field generating devices 2 are controlled corresponding to, for example, the transport speed or the like of the objects 5 to be frozen. Owing to this, any wave patterns of the magnetic fields can be formed. For example, the magnetic field received by the objects 5 to be frozen can be controlled to a desired configuration and strength, corresponding to the temperature inside the freezing compartment 24, and various conditions such as kind, configuration, volume, weight, density, water content rate of the objects 5 to be frozen. As a result, the water clusters contained in the objects 5 to be frozen can be fragmented more effectively.

Particularly, in the freezer 23 according to this embodiment, since it is arranged so that, as described above, the objects 5 to be frozen receive the magnetic fields while traveling relatively with respect to the magnetic field generating devices 2 disposed in the freezing compartment 24, the following effects also can be obtained.

That is, even when the strength of the magnetic fields from the magnetic field generating devices 2 in the freezing compartment 24 is constant, the magnetic fields imparted to the objects 5 to be frozen change with time elapsed. Accordingly, the magnetic fields generated by the magnetic field generating devices 2 are not always limited to the magnetic fields of which strength changes with time elapsed, but even the steady state magnetic fields of which strength is constant can fragment the water clusters in the objects 5 to be frozen efficiently. Accordingly, the range of the selectable patterns of the magnetic fields (size, configuration, and changing pattern with time elapsed etc. of the magnetic fields) is wide, thus a high freedom for the structure of the apparatus is obtained.

Further, particularly, when the magnetic fields generated by the magnetic field generating devices 2 change with elapsed time like alternate magnetic fields and pulse-like magnetic fields, as described above, in addition to the changes of the magnetic fields due to the relative movement of the objects, periodical minute changes of the fields due to the alternate magnetic fields are overlapped with each other, hence the water clusters in the objects 5 to be frozen are fragmented effectively. Accordingly, microscopic structure of the objects 5 to be frozen as described above can be more reliably prevented or restrained from being changed, hence the conservation performance of the objects 5 can be largely improved.

Further, in this embodiment, magnetic field generating devices, which are disposed inside the freezing compartment in fixed manner, have been described. However, the magnetic field generating devices may be movable in any direction, one-dimensional, two-dimensional or three-dimensional directions. Further, when plural magnetic field generating devices are provided, the movable direction may be the same or different from each other.

Further, in this embodiment, the constitution such that the cylindrical freezing compartment 24 is included has been described. If the objects 5 to be frozen can be transported by the spiral transport path 25, the freezing compartment 24 may have any shape.

Further, in this embodiment, such constitution has been described that the magnetic field generating devices 2 are disposed inside the freezing compartment 24. However, such constitution that the magnetic field generating devices 2 are, for example, embedded in the freezing compartment 24 may be employed.

Next, a 13th embodiment of the freezer and the freezing method of the present invention will be described.

Figure 27:
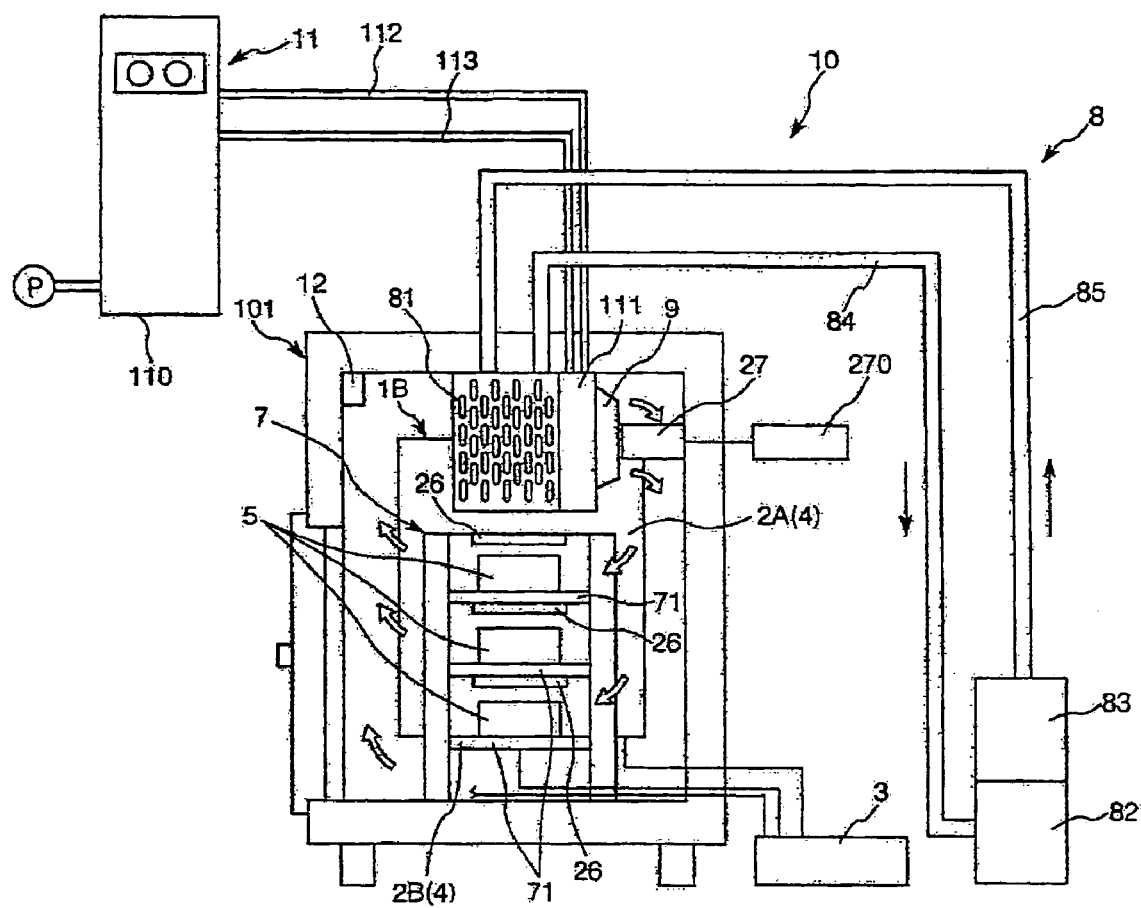
FIG. 27 is a schematic view showing a freezer in accordance with a 13th embodiment of the present invention.
Figure 28:
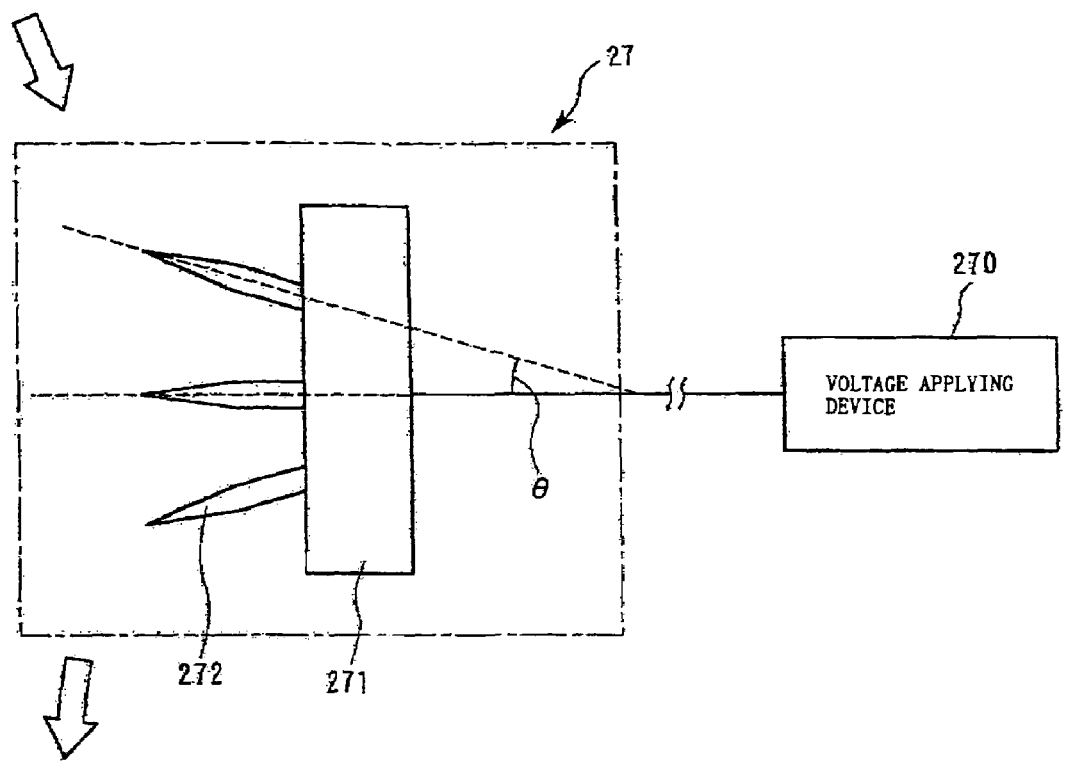
FIG. 28 is a schematic view showing constitution of a minus ion generating device included in the freezer shown in FIG. 27.
Figure 29:
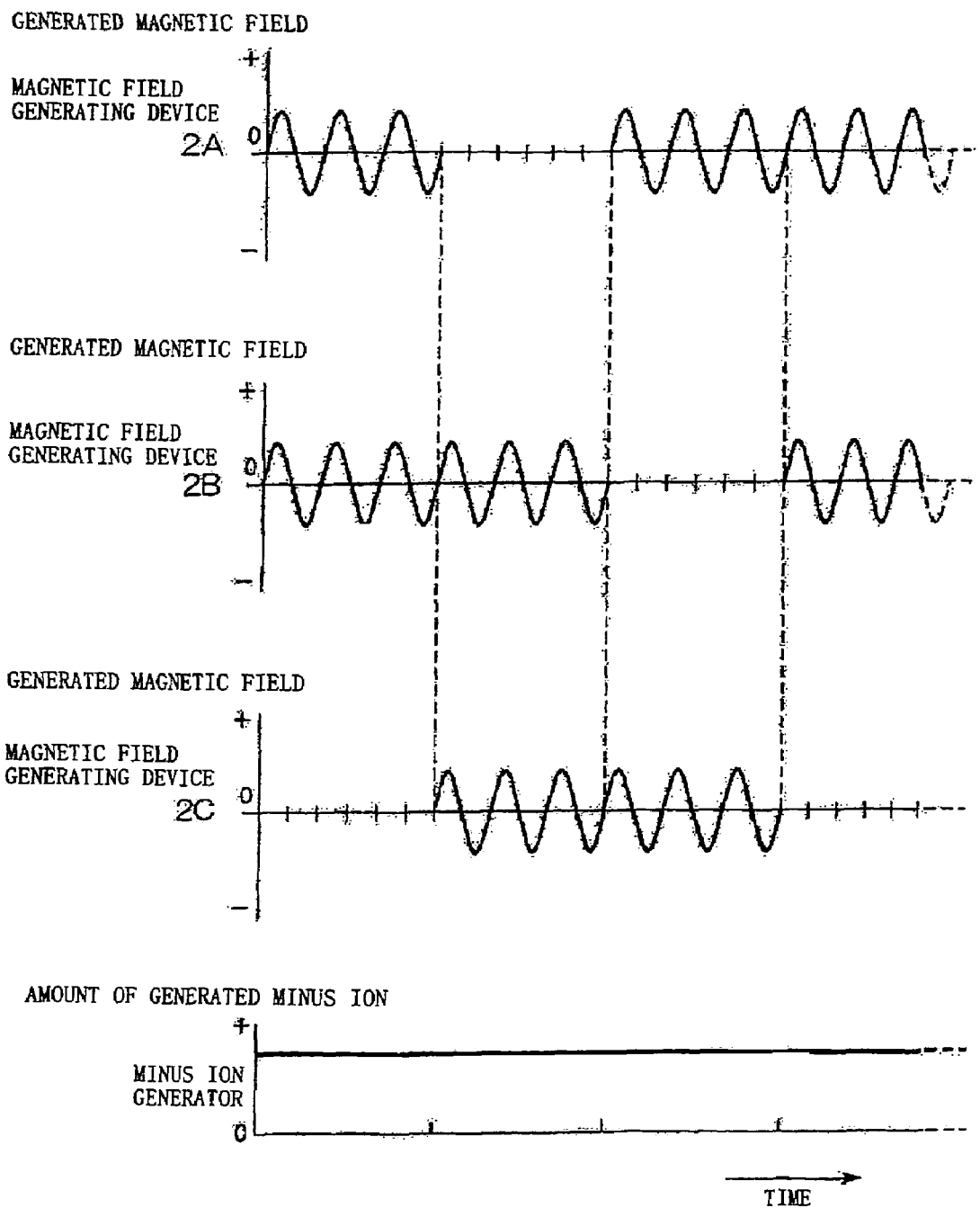
FIG. 29 is an example of a timing chart showing generating timing of magnetic fields from each of the magnetic field generating devices in the cluster fragmenting device.
Figure 30:
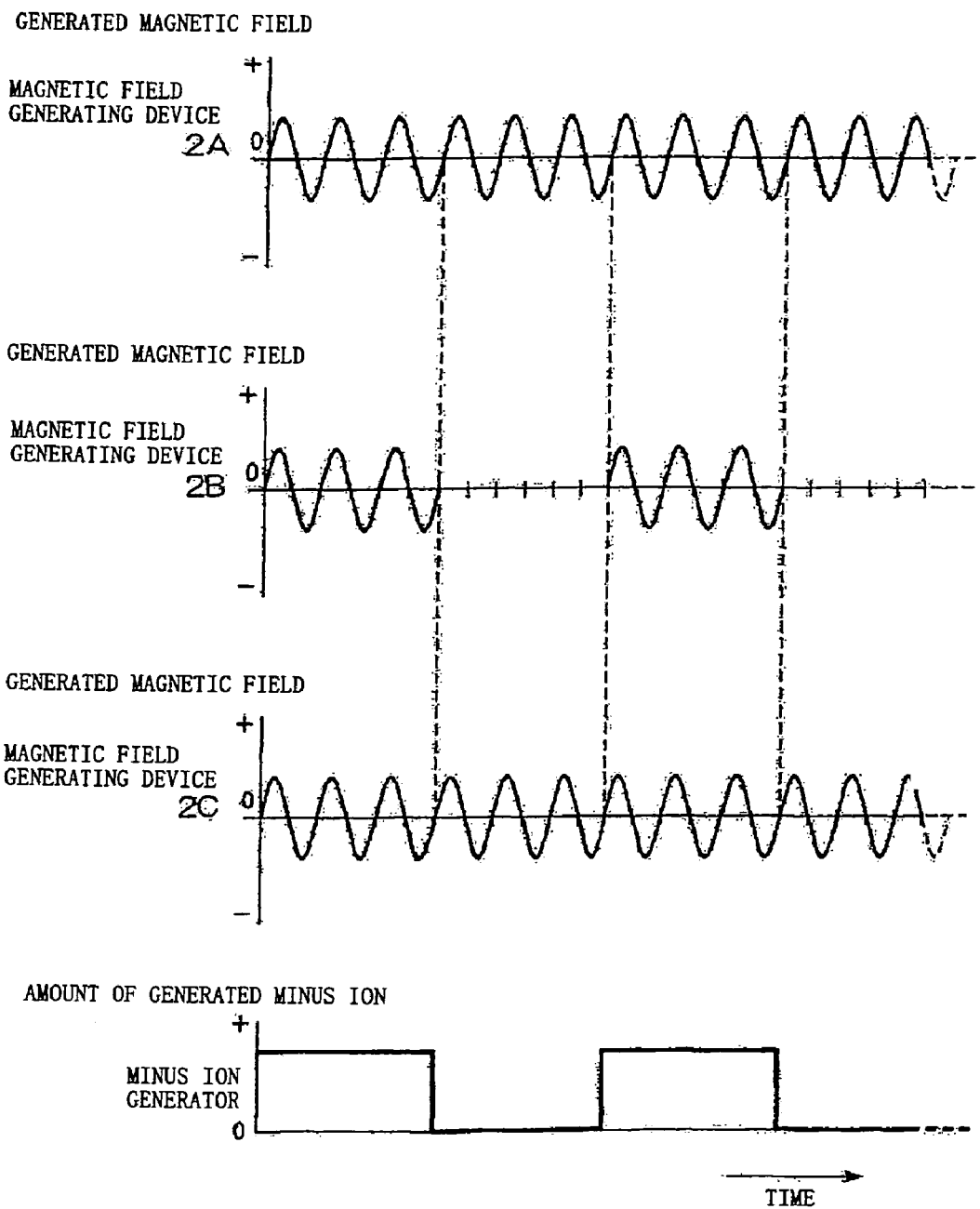
FIG. 30 is an example of a timing chart showing generating timing of magnetic fields from each of the magnetic field generating devices in the cluster fragmenting device.

FIG. 27 is a schematic view showing a freezer in accordance with the 13th embodiment of the present invention, FIG. 28 is a schematic view showing a constitution of a minus ion generating device included in the freezer shown in FIG. 27, FIG. 29 is an example of a timing chart showing generating timing of magnetic fields from each of the magnetic field generating devices in the cluster fragmenting device, and FIG. 30 is an example of a timing chart showing generating timing of magnetic field from each of the magnetic field generating devices in the cluster fragmenting device.

Hereinafter, the freezer and the freezing method according to the 13th embodiment will be described mainly on the points different from the above-described embodiments, and as to the same items, the description thereof will be omitted.

The freezer 10 according to this embodiment has the same constitution as that of the above-described second embodiment except the point that a minus ion generating device 27 is included inside the freezer main body 101.

As shown in FIG. 27, the freezer 10 according to this embodiment comprises a freezer main body 101, a cluster fragmenting device 1B including plural magnetic field generating devices, a loading part (rack) 7, a heat exchanger 8, a cold gas supply device (dehumidifying device 11 and fan 9) and a minus ion generating device 27.

The minus ion generating device 27 generates minus ions through applying voltage. The quality of the objects 5 to be frozen can be maintained satisfactorily for a long period of time by supplying minus ions to the objects 5 to be frozen in addition to the magnetic fields applied by the magnetic field generating devices 2 in the cluster fragmenting device 1B.

As shown in FIG. 28, the minus ion generating device 27 comprises plural discharge electrodes 272 having a needle-like shape (in the constitution shown in the figure: 3 electrodes) and a base 271 that fixes and supports each of the discharge electrodes 272. Further, a voltage applying device 270 is electrically connected to each of the discharge electrodes 272.

When a voltage is impressed to the minus ion generating device 27 by the voltage applying device 270, the minus ion generating device 27 generates minus ions. Specifically, when a voltage is impressed to each of the discharge electrodes 272 by the voltage applying device 270, corona discharge occurs at the front end of each discharge electrode 272, electrons are imparted to molecules residing in the surrounding space thereof, and thus, the minus ions are generated.

The voltage impressed by the voltage applying device 270 is not particularly limited, but it is preferably set to −10 to −1 kV or so, and more preferably set to −8 to −3 kV or so.

The impressed voltage may be either of the direct current and the alternate current, and the voltage may be impressed in a pulse-like manner.

Further, each of the discharge electrodes 272 is disposed so that the front ends thereof are separated away from each other (radially). Owing to this, generated minus ions can be supplied to the space further evenly (so as to unevenness of the concentration is reduced).

The angle formed between the adjacent discharge electrodes 272 (angle θ in FIG. 28) is not particularly limited, but set to, for example, 15° to 45° or so.

The minus ion generating device 27 as described above is preferably disposed in the midway of the flow path of the above-described cold gas (cold air). In this embodiment, the minus ion generating device 27 is disposed in the vicinity of the cold gas outlet port of the fan 9. Owing to this, the minus ions generated by the minus ion generating device 27 can be circulated effectively inside the freezer main body 101. As a result, the minus ions reach to the objects 5 to be frozen further uniformly.

The amount of the minus ions, which reaches to the objects 5 to be frozen, is preferably controllable (increase/decrease) continuously or gradually. That is, the amount of the minus ions (feed rate), which reaches to the objects 5 to be frozen, is preferably changed with time elapsed. Owing to this, the water clusters contained in the objects 5 can be fragmented further effectively.

As an example of the method for changing the amount of the minus ions which reaches to the objects 5 to be frozen, the following methods are available. That is, a method in which the voltage applied to the minus ion generating device 27 (each of the discharge electrodes 272) is increased or decreased to change the generating amount itself of the minus ions, a method in which air blowing volume from the fan 9 (blowing speed) is changed, and a method in which minus ions are captured using a absorbing device (capturing device), thereby the amount of the minus ions included in the space is changed, etc.

Further, the minus ion generating device 27 preferably has the low temperature resisting performance capable to withstand the temperature inside the freezer main body 101. As described later, the inside of the freezer main body 101 is maintained at an extremely low temperature. When the minus ion generating device 27 has the low temperature resisting performance, the durability of the minus ion generating device 27 is improved. Accordingly, the freezer 10 provides stable effect for a long period of time. Further, since the minus ion generating device 27 do not have to be exchanged (or, the number of exchanges of the minus ion generating device 27 can be reduced), the maintenance of the freezer 10 can be carried out easily.

Further, in the minus ion generating device 27 as described above, i.e., in such device that generates minus ions by being impressed with a voltage, along with the generation of the minus ions, ordinarily, ozone is also generated. The ozone has the decomposition action of rotten gas such as, for example, ethylene gas and aldehyde gas. Further, both of the ozone and minus ions have the bactericidal action against the putrefying bacteria. Owing to this, by providing the freezer 10 with the minus ion generating device 27 as described above, the anti-rotting effect on the objects 5 to be frozen can be increased.

In the constitution shown in the figure, the minus ion generating device 27 and the magnetic field generating devices 2 are provided separately (independently). However, they may be formed integrally.

As described above, the water clusters contained in the objects 5 to be frozen are fragmented by applying the magnetic fields, and in addition to that, by supplying minus ions, the water clusters change into a state that the influence of the magnetic fields is further susceptive thereto owing to the electrical effect of the minus ions. As a result, the fragment is further accelerated.

As shown in FIG. 29, minus ions may be arranged to be generated anytime while the magnetic fields are applied by any of magnetic field generating devices 2, or may be arranged to be generated discontinuously (intermittently). In the latter case, for example, as shown in FIG. 30, minus ions can be arranged to be generated (to operate the minus ion generating device 27) being synchronized with the generation of the magnetic field from the magnetic field generating device 2B. In either of the examples shown in FIG. 29 and FIG. 30, the following method is typically shown respectively, i.e., the amount of minus ions, which reach to objects 5 to be frozen, is controlled to increase or decrease (change) by increasing and decreasing (changing) the voltage applied to the minus ion generating device 27 (each discharge electrode 272), thereby the generating amount itself of the minus ions is changed.

In the example shown in FIG. 30, the total strength of the magnetic fields by three magnetic field generating devices is increased and decreased, and the generating amount of the minus ions (amount of the minus ions which reach to the objects 5 to be frozen) is increased and decreased being synchronized with each other. That is, in the example shown in FIG. 30, the timing when three magnetic field generating devices 2A, 2B and 2C are in operation and the timing when two magnetic field generating devices 2A and 2C are in operation come alternately. In the former case, i.e., when the total strength of the magnetic fields is larger, being synchronized with this, a voltage is applied to the minus ion generating device 27 to generate minus ions. Owing to this arrangement, the water clusters contained in the objects 5 to be frozen can be fragmented further effectively.

In the example shown in FIG. 30, it is arranged so that, when the two magnetic field generating devices 2A and 2C are in operation (when the magnetic field generating device 2B is not in operation), the voltage applying is suspended not to generate the minus ions. However, it is not limited to the above. It may be arranged in such a way that when the two magnetic field generating devices 2A and 2C are in operation, the applied voltage is reduced so that the generation amount of the minus ions (i.e., amount of the minus ions which reach to the objects 5 to be frozen) is reduced.

The minus ion generating device 27 in the freezer 10 according to this embodiment is also applicable to the freezers according the above-described embodiments and the above-described effects can be obtained in each embodiment.

Next, a 14th embodiment of the freezer and the freezing method of the present invention will be described.

Figure 31:
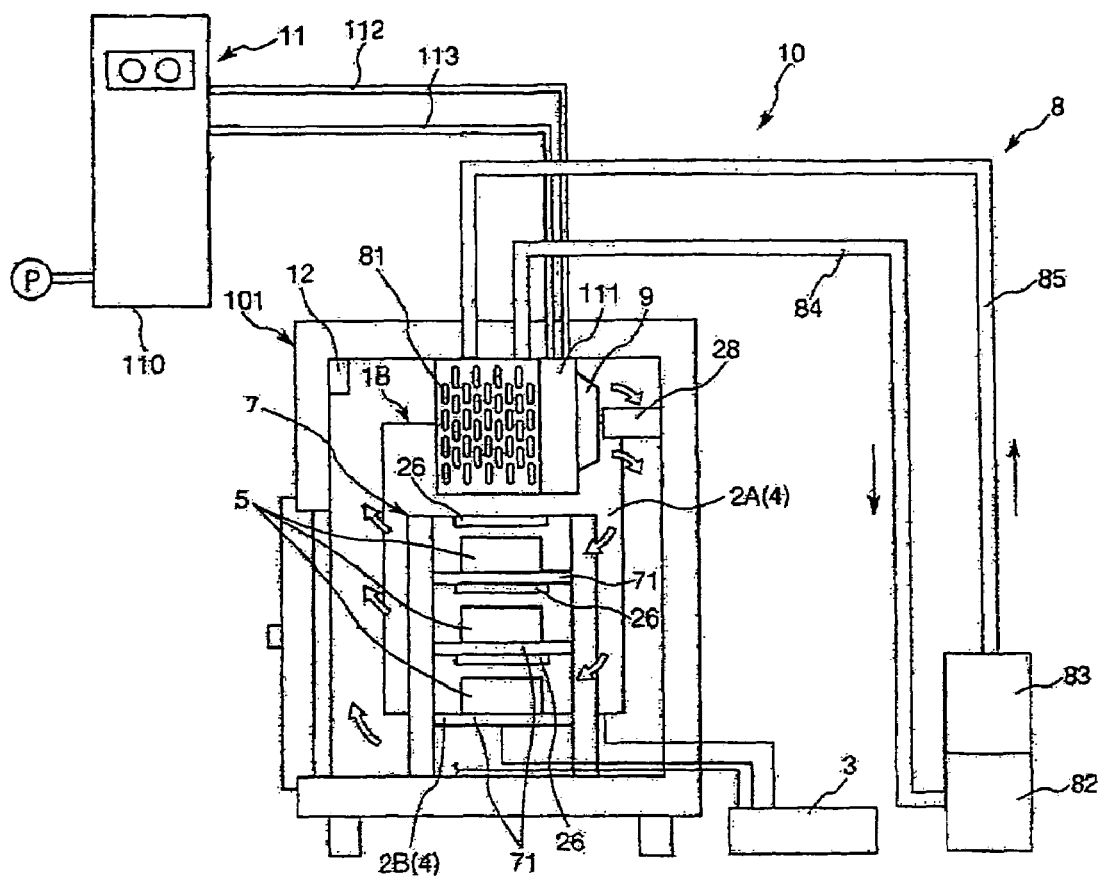
FIG. 31 is a schematic view showing a freezer in accordance with a 14th embodiment of the present invention.
Figure 32:
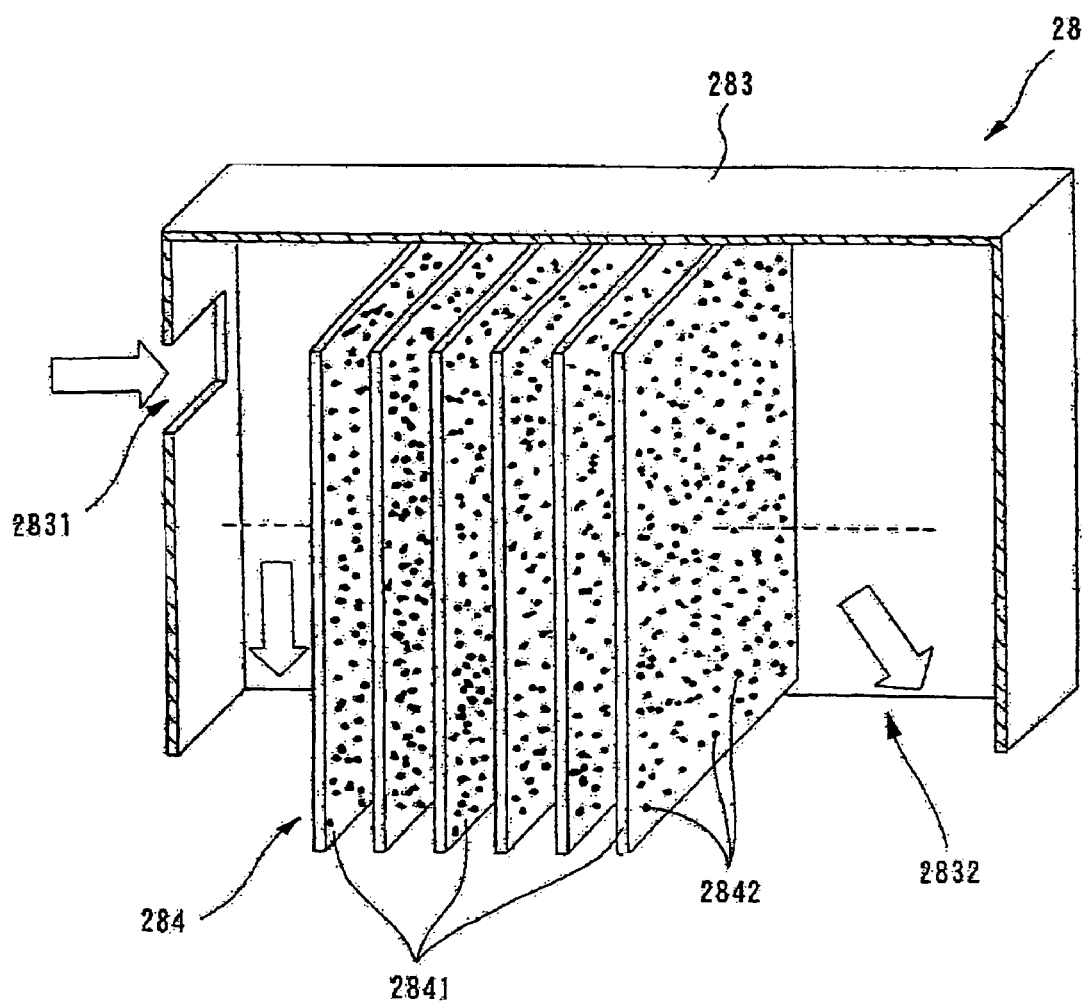
FIG. 32 is a schematic view showing constitution of a minus ion generating device included in the freezer shown in FIG. 31.

FIG. 31 is a schematic view showing a freezer in accordance with the 14th embodiment of the present invention, and FIG. 32 is a schematic view showing a constitution of a minus ion generating device included in the freezer shown in FIG. 31.

Hereinafter, the freezer and the freezing method according to the 14th embodiment will be described mainly on the points different from the above-described embodiments, and as to the same items, the description thereof will be omitted.

The freezer 10 according to this embodiment has the same constitution as that of the above-described 13th embodiment except the point that the constitution of a minus ion generating device provided inside the freezer main body 101 is different therefrom.

As shown in FIG. 31, the freezer 10 according to this embodiment comprises a freezer main body 101, a cluster fragmenting device 1B including plural magnetic field generating devices 2, a loading part (rack) 7, a heat exchanger 8, a cold gas supply device (dehumidifying device 11 and fan 9) and a minus ion generating device 28, which will be described below.

The minus ion generating device 28 is disposed inside the freezer main body 101, and as shown in FIG. 32, includes a case 283 and plural vibration members (minus ion generating sources) 284, which are suspended from the ceiling portion of the case 283 being close to each other.

The case 283 has a box-like shape, and in a predetermined position of the side (in the constitution shown in the figure, in an upper portion of the left side), an intake port 2831 for allowing the ambient air (cold gas) to flow into the freezer main body 101 (to take in the ambient air) is formed. Further, the bottom of the case 283 is opened. From the opening (discharge port) 2832, the cold gas which flows in to the case 283 flows out.

Each of the vibration members 284 contains fine particles 2842 of a substance, which is capable of generating minus ions, on a base member (carrier) 2841 having a plate-like shape (or sheet-like shape).

In the minus ion generating device 28 as described above, the air is allowed to flow through the inside of the case 283 (minus ion generating device 28). At this time, the cold gas flown from the intake port 2831 collides with (comes into contact with) the vibration members 284, i.e., stress is applied to each of the vibration members 284. Owing to this, each of the vibration members 284 is oscillated or vibrated, and thus minus ions are generated in the peripheral space around the fine particles 2842.

The base member 2841 is preferably formed of a member having a mesh-like structure (porous structure). Owing to this, the cold gas is allowed to satisfactorily pass through each of the vibration members 284. Owing to this, each of the vibration members 284 can be oscillated or vibrated effectively. As for the component materials for the base member 2841, for example, various kinds of woods, various kinds of metal materials, various kinds of natural fiber or the like are appropriately employed.

The fine particles 2842 can be easily attached to such base member 2841 by dispersing the fine particles 2842 in an appropriate binder liquid and allowing it to come into contact (for example, splay, soaking or the like) with the base member 2841.

As for the component material for the fine particles 2842 (substance capable of generating minus ions), for example, ores such as tourmaline, David ore, brannerite, uraniferous, ningyoite, autunite, carnotite, thuyamunite, metathuyamunite, francevillite, thorite, coffinite, samarskite, thorianite, thorogummite, MOZUNA and the like, $BaTiO_3$, $PbTiO_3$, $PbZrO_3$, $Pb(Zr, Ti)O_3$, $KNbO_3$, $KTaO_3$, $K(Ta, Nb)O_3$, $LiNbO_3$, rochelle salt, glycine sulfate, dipotassium phosphate, calcium strontium propionate and the like can be listed. From these elements, one or a combination of two or more may be used.

Further, average diameter of the fine particles 2842 is not particularly limited, but it is preferable to set to 3 μm or less, more preferably set to 0.1 to 1 m or so. Owing to this, the fine particles 2842 can generate electrostatic further effectively.

Particularly, in this embodiment, it is arranged to use the cold gas (air flow from the fan 9), which is circulated by the fan 9, to flow the air inside the case 283 (minus ion generating device 28). Owing to this, since additional device for circulating the air inside the minus ion generating device 28 do not have to be provided, it is possible to prevent the freezer 10 from becoming larger in size.

Therefore, the minus ion generating device 28 is preferably disposed in the midway of the above-described flow path of the cold gas. In this embodiment, the minus ion generating device 28 is disposed in the vicinity of the outlet port of the cold gas of the fan 9.

Further, same as the above-described 13th embodiment, the amount of the minus ions, which reach to the objects 5 to be frozen, is preferably arranged to be variable (increase/decrease) continuously or gradually. As a example of methods for varying the amount of the minus ions, which reach to the objects 5, the following methods are available, i.e., a method in which the air blow volume (blowing speed) from the fan 9 is changed, a method in which the amount of the air (intake amount) flown into the minus ion generating device 28 from the fan 9 is changed, or a method in which the minus ions are captured by an absorbing device (capturing device) thereby the amount of the minus ions residing in the space is changed. When the amount of air, which flows into the minus ion generating device 28 from the fan 9 (intake amount), is changed, for example, a cover member, which open and close the above-described intake port 2831 enabling to control the opening thereof, may be employed.

In this embodiment, it is arranged so that the air is circulated inside the case 283 (the minus ion generating device 28) using the airflow from the fan 9. However, it may be arranged such that, for example, each of the vibration members 284 is vibrated by means of a mechanical device such as solenoid.

Further, when the substance for generating minus ions is arranged to be held on the base member 2841, the configuration of the substance is not limited to a powder state (fine particles 2842). For example, any configuration such as grained, lump, flake or the like may be employed. Further, the base member 2841 itself may be formed of a substance capable of generating minus ions.

Further, in this embodiment, it is arranged such that a single minus ion generating device 28 is disposed therein. However, the number of the minus ion generating devices is not particularly limited. Plural minus ion generating devices may be provided.

Further, the constitution of the minus ion generating device 28 is not limited to the constitution of this embodiment. For example, it may be arranged such a way that a plate-like member (thin plate), which is formed of a substance capable of generating minus ions, and receives stress as described above by being imparted with vibration from a vibration source such as a hammer, a piezoelectric element and an ultrasonic transducer.

In this embodiment also, same as the above-described 13th embodiment, as shown in FIG. 29, it may be arranged so that the minus ions are generated anytime while the magnetic fields are applied by any of the magnetic field generating devices 2. Or, as shown in FIG. 30, it may be arranged so that the minus ions are generated intermittently (periodically) being synchronized with the generation of the magnetic field from the magnetic field generating device 2B.

The minus ion generating device 28 in the freezer 10 according to this embodiment is also applicable to the freezers according the above-described embodiments and the above-described effects can be obtained in each embodiment.

Next, a 15th embodiment of the freezer and the freezing method of the present invention will be described.

Figure 33:
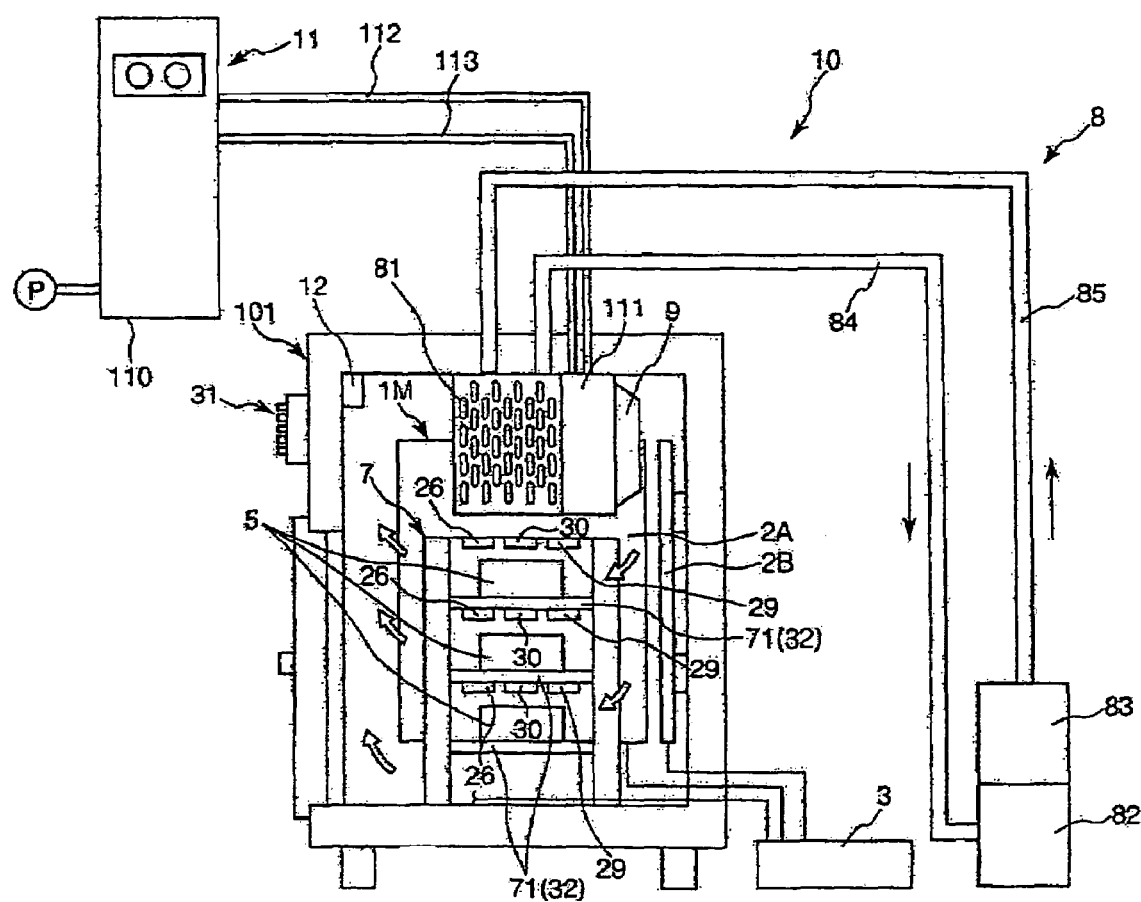
FIG. 33 is a schematic view showing a freezer in accordance with a 15th embodiment (16th and 17th embodiments) of the present invention.

FIG. 33 is a schematic view showing a freezer in accordance with the 15th embodiment.

Hereinafter, the freezer and the freezing method according to the 15th embodiment will be described mainly on the points different from the above-described embodiments, and as to the same items, the description thereof will be omitted.

Same as the above-described 7th embodiment, the, freezer 10 according to this embodiment includes a cluster fragmenting device 1M having plural magnetic field generating devices 2, which are disposed in a U-like shape so as to enclose the portion for placing the objects 5 to be frozen. However, this embodiment is different from the above-described embodiment in the control method of the magnetic field generating devices 2.

In this embodiment, the magnetic fields of a predetermined strength is imparted to the objects 5 to be frozen placed inside the freezer main body 101 for a predetermined period of time T [minute]. And then, the magnetic fields from the magnetic field generating devices 2 are controlled to discontinue or decrease.

The inventor found that, by controlling the magnetic fields from the magnetic field generating devices 2 as described above, the quality of the objects 5 can be reliably maintained for a longer period of time. The reason of this can be understood as described below.

In a state that the magnetic fields, of which strength changes with time elapsed, are continuously generated from the magnetic field generating devices 2, the moisture molecules in the objects 5 to be frozen are vibrating in microscopic level, and thus, the objects 5 to be frozen are hardly frozen. Owing to this, being imparted with the magnetic fields as described above, the objects 5 to be frozen occasionally get into so called super-cooled state, i.e., the objects 5 are not frozen even when the objects 5 are cooled down to a temperature such that the objects are frozen in the case where the magnetic fields are not imparted. Under such super-cooled state as described above, the objects 5 are not frozen but stay in a state that microscopic structures are readily changed. Therefore, when the objects 5 to be frozen are left in a super-cooled state for a long period of time, it is occasionally difficult to satisfactorily prevent the quality thereof from being deteriorated.

Accordingly, after imparting magnetic fields of a predetermined strength to the objects 5 to be frozen placed in the freezer main body 101 for a predetermined period of time T [minute], by controlling the magnetic fields from the magnetic field generating devices 2 so as to be stopped or reduced, the objects 5 can be frozen while further efficiently preventing the quality of the objects 5 from being deteriorated.

When freezing the objects 5 as described above, it is preferred that the temperature at each portion is satisfactorily uniform. Owing to this, the variation of freezing speed at each portion of the objects 5 to be frozen becomes extremely small, and objects 5 can be frozen in a state that the size of the water clusters in each portion of the objects 5 become further uniform. In the water clusters in the frozen objects 5, variation of size at each portion are extremely small. As a result, long-term stability as the whole objects 5 to be frozen becomes particularly outstanding.

The predetermined period of time T is preferably set so that the temperature of the objects 5 to be frozen reaches to such level that, if not imparted with the magnetic fields, the objects 5 are frozen.

Specific range of the predetermined period of time T depends on the kind, dimensions, temperature before placing inside the freezer and the like of the objects 5 to be frozen, but it is preferable in general to set from 10 to 120 minutes.

In the case where the predetermined period of time T is too short, for example, the temperature of the objects 5 to be frozen is not reduced satisfactorily, which may cause that the period of time from that point to a point when the objects 5 are frozen is prolonged. In such a case, the objects 5 are hardly frozen in a state that the water clusters are satisfactorily fragmented. Moreover, when the predetermined period of time T is too short, for example, the temperature at each portion of the objects 5 to be frozen may not be satisfactorily uniform. As described above, when the predetermined period of time T is too short, long-term stability of the objects 5 may be hardly obtained satisfactorily.

On the other hand, when the predetermined period of time T is too long, power consumption in the coils 21 becomes merely wasteful, and effects such as further fragmentation of the clusters or further increase of uniformity in size of the clusters are little obtained. Further, when the predetermined period of time T is too long, the super-cooled state as described above is maintained for unnecessarily long period of time, hence the objects 5 to be frozen cannot be frozen, therefore the satisfactory long term stability of the objects 5 may be hardly obtained.

When the strength of the magnetic fields is reduced after a predetermined of time T has elapsed, the maximum strength of the magnetic fields after reduction is, for example, preferably 60% or less of the maximum strength of the magnetic fields before reduction, more preferably 40% or less. When the maximum strength of the magnetic fields after reduction is too large, depending on the kind of the objects 5 to be frozen, the freezing speed of the objects 5 to be frozen may be reduced, or the power may be consumed wastefully. The frequency of the magnetic fields generated from the magnetic field generating devices 2 may be the same with or different from those before and after the reduction of the magnetic field strength. However, the same frequency permits easy control of the magnetic fields.

Further, when the strength of the magnetic fields is reduced after a predetermined period of time T has elapsed, the magnetic fields from the magnetic field generating devices 2 may be reduced towards nil gradually, or may be kept at a predetermined strength (maximum strength).

As shown in FIG. 33, the freezer 10 according to this embodiment is provided with a temperature sensor 30. Owing to this, for example, the temperature of the objects 5 to be frozen before being placed inside the freezer main body 101 can be detected, and thus, the predetermined period of time T can be correctly determined as more appropriate value. Particularly, when the temperature sensor 30 as shown in the figure is provided, the temperature of the objects 5 to be frozen can be measured in a non-contact manner.

The predetermined period of time T may be determined by any method, but is preferably determined based on, for example, at least one parameter with respect to the objects 5 to be frozen. As for the parameters as described above, for example, the weight, dimensions (particularly, thickness), characteristics of the object matter (for example, kind of the object matter, number and size of the cells constituting the object matter, water content, degree of heat conductivity and the like) of the objects 5 to be frozen and the temperature of the objects 5 to be frozen before being placed inside the freezer main body 101 and the like can be listed.

As described above, the predetermined period of time T is preferably determined based on at least one parameter with respect to the objects 5 to be frozen, and more preferably determined based on two or more parameters. Owing to this, the predetermined period of time T can be determined correctly to a further appropriate value.

Further, the freezing speed of the freezer 10 is preferably taken into consideration to determine the predetermined period of time T. Owing to this, the predetermined period of time T can be determined correctly to a further appropriate value.

As shown in FIG. 33, according to this embodiment, it is arranged so that the weight of the objects 5 to be frozen is measured by means of a weight meter 32, which is integrally provided to the loading part 7 (particularly, with the tray 71).

Further, freezer 10 is provided with also a measure 29 for measuring the thickness of the objects 5 to be frozen. The freezing speed in the vicinity of the central area of the objects 5 to be frozen particularly depends on the thickness among the dimensions of the objects 5 to be frozen. Accordingly, the thickness of the objects 5 to be frozen is preferably used as a parameter for determining the predetermined period of time T. As for the measure 29, for example, a measure, which measures the thickness of the objects 5 to be frozen by means of the irradiation of light, can be used. In this case, the measure 29 is, for example, preferably a type, which scans the upper face side of the objects 5. Owing to this, the thickness at each portion of the objects 5 to be frozen is detected. And based on such information, maximum thickness, average thickness and the like of the objects 5 to be frozen can be obtained more correctly. As a result, the predetermined period of time T can be determine correctly as a further appropriate value.

Further, for example, it may be arranged so that, in the case that the weight meter 32, the measure 29 or the like does not detect objects to be frozen, the magnetic field generating devices 2 are controlled not to operate.

Further, the freezer 10 may be provided with, for example, input buttons 31 for user to manually input conditions necessary for determining the predetermined period of time T. Owing to this, for example, members for measuring parameters as described above can be eliminated or simplified.

In the above description, the description has been made assuming that the temperature inside the freezer main body 101 is relatively high (but, such a level that, in the state the magnetic fields are not imparted to the objects 5 to be frozen, the objects 5 are frozen), and the objects 5 begins to be frozen after the magnetic fields have been stopped or reduced. However, at least a part of the objects 5 to be frozen may be already frozen before the magnetic fields are stopped or reduced. In such case also, the objects 5 to be frozen can be frozen in a state that the water clusters are satisfactorily fragmented while saving the power consumption, and the effects as described above can be exercised satisfactorily.

Further, in this embodiment, as an input section for manually inputting the conditions necessary for determining the predetermined period of time T, such constitution that the input buttons 31 are provided has been described. Such input section may have another mode such as, for example, a touch panel.

The control method of the magnetic field generating devices 2 in this embodiment is applicable to the freezers according to the above-described embodiments, and the above-described effects can be obtained in each embodiment.

Next, a 16th embodiment of the freezer and the freezing method of the present invention will be described. Hereinafter, the freezer and the freezing method according to the 16th embodiment will be described mainly on the points different from the above-described embodiments, and as to the same items, the description thereof will be omitted.

The freezer 10 according to this embodiment is the same as the above-described 15th embodiment in the constitution, but different from the above-described 15th embodiment in the control method of the magnetic field generating devices.

In this embodiment, when the temperature in the vicinity of the surface of the objects 5 to be frozen placed inside the freezer main body 101 reaches a predetermined value Ts [° C.], the magnetic fields from the magnetic field generating devices are controlled so as to stop or decrease.

Owing to this, the objects 5 to be frozen can be frozen swiftly in a state that the water clusters are fragmented further effectively. As a result, the objects 5 can be frozen more effectively while preventing or restraining the quality from being deteriorated.

The Ts is preferably set so that, in a state that the magnetic fields are not imparted to the objects 5 to be frozen, the temperature in the vicinity of the central area of the objects 5 to be frozen is a temperature at which the objects 5 are frozen. Owing to this, the differences in freezing speed at each portion of the objects 5 to be frozen is extremely small, and objects 5 can be frozen in a state that the size of the water clusters in each portion of the objects 5 become further uniform. In the water clusters in the frozen objects 5, the differences in size at each portion are extremely small. As a result, particularly satisfactorily long-term stability of the entire objects 5 can be obtained.

Further, the Ts may be set by any method, but is preferably set using, for example, at least one parameter with respect to the objects 5 to be frozen. As for the parameters described above, for example, the weight, dimensions (particularly, thickness), the temperature of the objects 5 to be frozen on the spot of placing inside the freezer main body 101, characteristics of the subject matter (for example, kind of the object matter, number and size of the cells constituting the object matter, water content, degree of heat conductivity) and the like can be listed.

When the parameter as described above is used, it is preferably arranged so that, for example, the correlation among the parameters, the temperature in the vicinity of the surface the objects 5 to be frozen and the temperature in the vicinity of the central area of the objects 5 to be frozen is obtained through experiments, and the Ts is set using the correlation. When the Ts is set as described above, the freezer 10 can be arranged such a manner, for example, to have a calculating section (not shown), which calculates the Ts by the above-described correlation based on the value of the parameters.

As described above, the Ts is preferably set using at least one parameter with respect to the objects 5 to be frozen, more preferably using two or more parameters in combination. Owing to this, the Ts can be set as a further appropriate value.

Further, the Ts is preferably set with taking freezing speed of the freezer 10 into consideration. Owing to this, the Ts can be set as a further appropriate value.

Specific value of the Ts depends on the conditions such as the above-mentioned parameters but, it is preferable in general to set from −60° C. to −20° C., more preferably set from −55° C. to −25° C., and further preferably set from −50° C. to −30° C.

If the Ts is equal to the above-described lower limit value or less, the super-cooled state as described above is maintained for unnecessarily long period of time, and the objects 5 to be frozen cannot be frozen, hence the satisfactory long term stability of the objects 5 to be frozen may be hardly obtained.

On the other hand, if the Ts exceeds the above-described upper limit value, the period of time from a point when the magnetic fields from the magnetic field generating devices 2 is stopped or reduced to a point when the objects 5 (particularly, in the vicinity of the central area of the objects 5 to be frozen) are frozen is prolonged. During the period of time from a point when the magnetic fields from the magnetic field generating devices 2 is stopped or reduced to a point when the objects 5 are frozen, the fragmented water clusters are occasionally grown up again. Owing to this, freezing occurs while the water clusters are in a large state, and thus, microscopic structures change of the objects 5 cannot be prevented efficiently. As a result, the quality deterioration of the objects 5 can be hardly prevented or restrained more efficiently.

In case that the strength of the magnetic fields is reduced when the temperature in the vicinity of the surface of the objects 5 to be frozen reaches to Ts [° C.], the maximum strength of the magnetic fields after reduction is, for example, preferably 60% or less of the maximum strength of the magnetic fields before reduction, more preferably 40% or less. If the maximum strength of the magnetic fields after reduction is too large, depending on the kind of the objects 5 to be frozen, the freezing speed of the objects 5 may be reduced, or the power may be consumed wastefully. The frequency of the magnetic fields generated from the magnetic field generating devices 2 after the reduction of the magnetic field strength may be the same with or different from those before the reduction. However, the same frequency permits easy control of the magnetic fields.

Further, when the strength of the magnetic field is reduced when the temperature in the vicinity of the surface of the objects 5 to be frozen reaches to Ts [° C.], the magnetic fields from the magnetic field generating devices 2 may be reduced towards nil gradually, or may be kept at a predetermined strength (maximum strength).

The temperature in the vicinity of the surface of the objects 5 to be frozen may be measured by any means or method. For example, the temperature can be detected with a temperature sensor 30 as shown in FIG. 33. By using the temperature sensor 30 like this, the temperature in the vicinity of the surface of the objects 5 to be frozen can be measured in a non-contact manner. Further, even when the temperature difference between the objects 5 to be frozen and the inside of the freezer main body 101 at a point of time when the objects 5 to be frozen are placed inside the freezer 10 is relatively large, the temperature in the vicinity of the surface of the objects 5 to be frozen can be measured more correctly.

Further, since the freezing speed in the vicinity of the central area of the objects 5 to be frozen depends on the thickness particularly among dimensions of the objects 5 to be frozen, the thickness of the objects 5 to be frozen is preferably used as the parameter for setting Ts.

Further, the freezer 10 may be arranged so that, for example, the conditions necessary for setting the Ts as described above are inputted through the input buttons 31.

Further, in the above description, such an arrangement has been described that the magnetic fields from the magnetic field generating devices 2 are stopped or reduced at a point of time when the temperature in the vicinity of the surface of the objects 5 to be frozen reaches to Ts [° C.], i.e., immediately after the temperature in the vicinity of the surface of the objects 5 to be frozen reaches to Ts [° C.]. However, it may be arranged so that the magnetic fields from the magnetic field generating devices 2 are stopped or reduced when a predetermined time has elapsed after the temperature in the vicinity of the surface the objects 5 reaches to Ts [° C.].

The control method of the magnetic field generating devices 2 in this embodiment is applicable to the freezers according to the above-described embodiments, and the above-described effects can be obtained in each embodiment.

Next, a 17th embodiment of the freezer and the freezing method of the present invention will be described.

Figure 34:
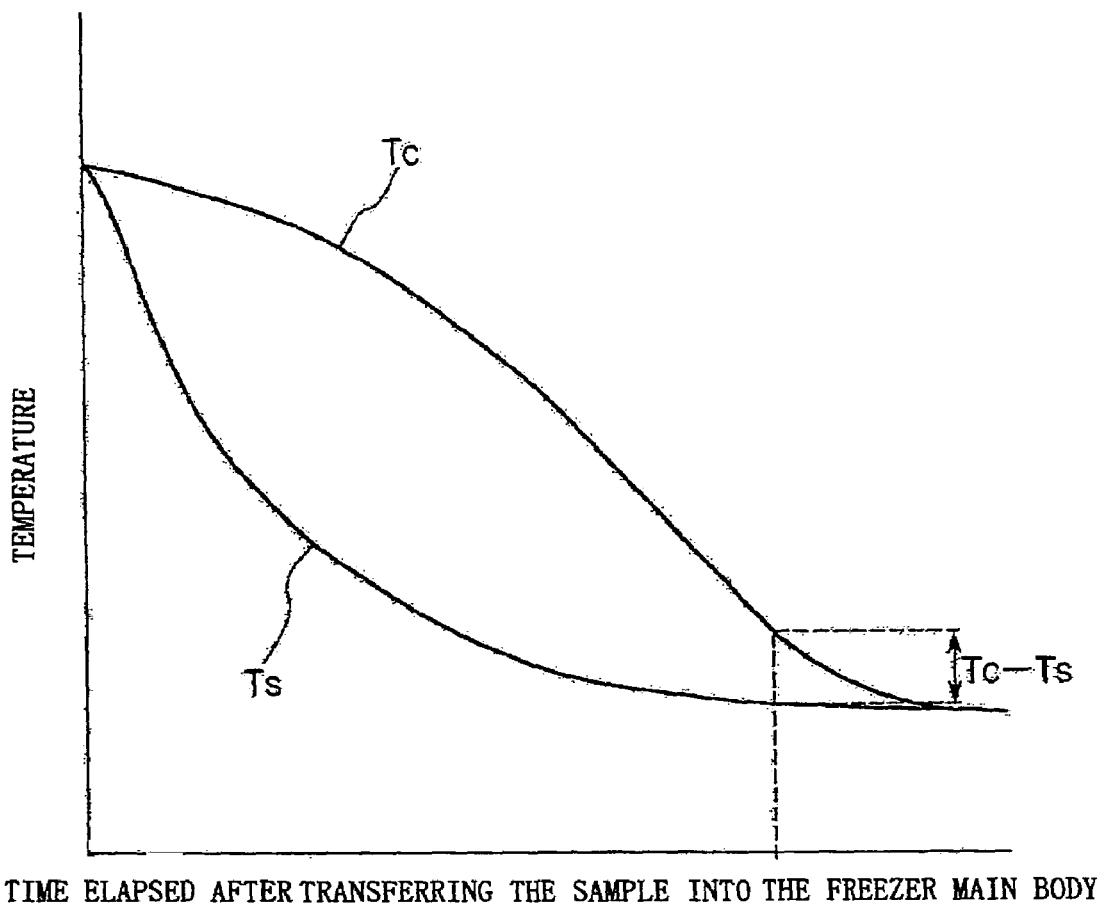
FIG. 34 is a graph schematically showing a relationship between the temperature Ts [° C.] in the vicinity of the surface and the temperature Tc [° C.] in the vicinity of the central area of an object to be frozen placed in the freezer.

FIG. 34 is a graph schematically showing a relationship between the temperature Ts [° C.] in the vicinity of the surface and the temperature Tc [° C.] in the vicinity of the central area of an object to be frozen placed in the freezer.

Hereinafter, the freezer and the freezing method according to the 17th embodiment will be described mainly on the points different from the above-described embodiments, and as to the same items, the description thereof will be omitted.

The freezer 10 according to this embodiment is the same as the above-described 15th embodiment in the constitution, but different from the above-described 15th embodiment in the control method of the magnetic field generating devices.

Generally, when an object is cooled down, the temperature of the object decreases from the surface side. However, this embodiment is characterized in such arrangement that the magnetic field generating devices 2 stops or reduces generating the magnetic fields when the temperature at each portion of the objects 5 to be frozen reaches to satisfactorily uniform state. That is, the embodiment is characterized in that, the magnetic field generating devices 2 are controlled to stop or reduce the magnetic fields (refer to FIG. 34) at a point of time when Tc−Ts is equal to a predetermined value or less, assuming that the temperature in the vicinity of the surface of the objects 5 to be frozen is Ts [° C.], and the estimated value of the temperature in the vicinity of the central area of the objects 5 to be frozen is Tc [° C.]. Owing to this, the objects 5 can be frozen swiftly in a state that the water clusters are fragmented further effectively. As a result, the objects 5 can be frozen while more effectively preventing or restraining the quality from being deteriorated.

Tc−Ts is not particularly limited if it is a satisfactorily small value, but it is preferable to set to 30° C. or less, more preferably set to 20° C. or less. Owing to this, the above-described effects are exercised further remarkably.

Further, after the Tc−Ts has reached a satisfactorily small value, such effects that clusters are further fragmented, or the uniformity of the cluster size is further increased are hardly obtained but just resulting in a waste of power consumption on the coils 21, even though the same magnetic fields are further imparted continuously. Therefore, by stopping or reducing the magnetic fields from the magnetic field generating devices 2 at a point of time when the Tc−Ts has reached to a satisfactorily small value, the waste of power consumption as described above can be eliminated.

When reducing the strength of the magnetic fields after the Tc−Ts has reached to a satisfactorily small value, the maximum strength of the magnetic fields after reduction is, for example, preferably 60% or less of the maximum strength of the magnetic fields before reduction, more preferably 40% or less. When the maximum strength of the magnetic fields after reduction is too large, depending on the kind of the objects 5 to be frozen, the freezing speed of the objects 5 may be reduced, or the power may be consumed wastefully. The frequency of the magnetic fields generated from the magnetic field generating devices 2 after the reduction of the magnetic field strength may be the same with or different from that before the reduction. However, the same frequency permits easy control of the magnetic fields.

Further, when the strength of the magnetic field is reduced after the Tc−Ts has reached to a satisfactorily small value, the magnetic fields from the magnetic field generating devices 2 may be reduced towards nil gradually, or may be kept at a predetermined strength (maximum strength).

The temperature Ts in the vicinity of the surface of the objects 5 to be frozen can be detected with, for example, a temperature sensor 30 as shown in FIG. 33. By using the temperature sensor 30 as described above, the temperature Ts in the vicinity of the surface of the objects 5 to be frozen can be measured in a non-contact manner. Further, even when the temperature difference between the objects 5 to be frozen and the inside of the freezer main body 101 at a point of time when the objects 5 to be frozen are placed inside the freezer 10 is relatively large, the temperature Ts in the vicinity of the surface of the objects 5 to be frozen can be measured more correctly.

By the way the estimated value Tc of the temperature in the vicinity of the central area of the objects 5 to be frozen may be estimated by any method, but is preferably estimated using, for example, at least one parameter with respect to the objects 5 to be frozen. As for the parameters described above, for example, the weight, dimensions (particularly, thickness), characteristics of the object matter (for example, kind of the object matter, number and size of the cells constituting the object matter, water content, degree of heat conductivity) and the like can be listed.

When the Tc is estimated using the parameter as described above, the correlation among he parameters, the temperature in the vicinity of the surface of the objects 5 to be frozen and the temperature in the vicinity of the central area of the objects 5 is obtained through experiments, and the Tc can be estimated using the correlation. When the Tc is estimated as described above, the freezer 10 can be arranged, for example, to have a calculating section (not shown), which calculates the Tc by the above-described correlation based on the value of the parameter and the value measured by the temperature sensor 30.

As described above, the temperature Tc in the vicinity of the central area of the objects 5 to be frozen is preferably estimated using at least one parameter with respect to the objects 5 to be frozen; more preferably, using two or more parameters in combination. Owing to this, the Tc can be estimated further correctly.

Further, the Tc is preferably estimated through taking the freezing speed of the freezer 10 into consideration. Owing to this, the Tc can be estimated further correctly.

Further, the freezing speed in the vicinity of the central area of the objects 5 particularly depends on the thickness among the dimensions of the objects 5 to be frozen. The thickness of the objects 5 to be frozen is preferably used as the parameter for estimating the Tc.

Further, the freezer 10 may be arranged so that, for example, the conditions necessary for setting the Tc as described above are inputted through the input buttons 31.

Further, in this embodiment, such structure has been described that the temperature Ts of the objects 5 to be frozen is measured by the temperature sensor 30. However, for example, the temperature inside the freezer main body 101 may be used as the Ts.

Hereinbefore, the present invention has been described based on preferable embodiments. However, the present invention is not limited to the above.

For example, in the above-described embodiments, such constitutions have been described that a cold gas supply device which is equipped with a dehumidifying device is used. The cold gas supply device is not particularly limited if the device can supply cold gas with less vapor content than the atmosphere. For example, such a cold gas supply device may be used that has a gas container containing a gas (including liquefied gas) such as inert gas. As described above, when a cold gas supply device having a gas container is used, accompanying the change in volume of the gas when the gas is ejected from the steel cylinder, the temperature of the ejected gas can be lowered relatively easily. Owing to this, the cooling efficiency of the objects to be frozen can be particularly improved. Further, when a cold gas supply device having a gas container is used, even when the cooling capacity of the heat exchanger is relatively low, the temperature inside the freezer can be relatively easily lowered to a satisfactorily low level. Further, the power consumption of the freezer can be saved. Further, when an inert gas is used as the supplied cold gas, even when the objects to be frozen is susceptive to the adverse affect by the oxidization and the like, such adverse affect can be more efficiently prevented from occurring.

Further, in the above-described embodiments, foods are taken as an example of objects to be frozen. If water is contained, any objects can be frozen. For example, in the case of anatomy such as an organ used for implanting or the like as an object to be frozen, by freezing the anatomy in a state that the water clusters in the anatomy are fragmented, the cells constituting the above-described anatomy can be efficiently prevented or restrained from being destroyed. Accordingly, it is made possible to store the above-described anatomy for a long period of time while satisfactorily preventing or restraining the function of the anatomy from decreasing. As a result, even after being implanted, the above-described anatomy can satisfactorily exercise its original function.

Further, for example, in the case of chemicals as the objects to be frozen, the quality of the chemicals can be prevented or restrained from being deteriorated.

Further, in the above-described embodiments, such constitution has been described that plural magnetic field generating devices is included. However, at least only one magnetic field generating devices may be provided.

Further, in the above-described embodiments, such constitution has been described that the dehumidifying device, the fan and the heat exchanger are provided one each. However, it may be arranged so that at least one of the above devices has plural devices.

Further, in the above-described embodiments, such constitution has been described that the magnetic field generating devices of the cluster fragmenting device and the energy imparting device are formed integrally. However, in the present invention, each of the magnetic field generating devices and the energy imparting device may be provided independently.

Further, in the above-described embodiments, the magnetic field generating devices which have a plate-like configuration have been described. However, the configuration of the magnetic field generating devices is not particularly limited. For example, any configuration such as cylinder-like, warped plate-like and rod-like shape may be employed.

EXAMPLES

Next, specific examples of the present invention will be described.

Freezing of Objects to be Frozen

Example 1

First of all, the cluster fragmenting device 1A shown in FIG. 2 was manufactured.

As for the component material for the energy imparting device 4, tourmaline was used.

In this example, the magnetic field generating devices 2 (nonmagnetic cover) and the energy imparting device 4 were integrally formed.

Next, using the cluster fragmenting device 1A, the freezer 10 shown in FIG. 1 was manufactured. As for the component material for the rack (loading part 7), aluminum was used.

The freezer 10 obtained as described above was operated under the following conditions.

The generating patterns of the magnetic fields generated by each of the magnetic field generating devices 2 were controlled as shown in FIG. 3. The magnetic field generated by each of the magnetic field generating devices 2 was the alternate magnetic field of 60 Hz respectively.

The maximum strength (absolute value) of the magnetic fields (total magnetic fields generated by each of the magnetic field generating devices 2) generated by the entire cluster fragmenting device 1A was 2000 Gs.

The blowing speed from the fan 9 was 4 m/s. And as the cold gas, cold air was used.

Under the conditions as described above, the freezer 10 was activated. After the temperature inside the freezer main body 101 had reached to −50° C., the objects 5 to be frozen were placed on each of the trays 71 in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

From the start point of the freezer 10, the pump P was driven for a predetermined time (1 hour) to take in the air from the outside of the freezer 10, and the pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and the operation of the pump P was appropriately controlled to keep the pressure higher than the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled in such a way that, when the value of humidity inside the freezer main body 101 detected by the humidity sensor 12 exceeds 10% RH, the device operates and when the value is 10% RH or less, the device stops the operation.

Example 2

First of all, the cluster fragmenting device 1B shown in FIG. 6 was manufactured.

A light irradiating device 26, which is equipped with a blue-violet light lamp with peak wavelength of 420 nm was used as the light source 261. Further, as for the component material for the energy imparting device 4, tourmaline was used. In this example, the magnetic field generating devices 2 (nonmagnetic cover) and the energy imparting device 4 were integrally formed.

Next, using the cluster fragmenting device 1B, the freezer 10 shown in FIG. 5 was manufactured. As for the component material for the rack (loading part 7), aluminum was used.

The freezer 10 obtained as described above was operated under the following conditions.

The generating pattern of the magnetic fields generated by each of the magnetic field generating devices 2 and the pattern of the short-wavelength light generated by the light irradiating device 26 were controlled as shown in FIG. 7. The magnetic fields generated by each of the magnetic field generating devices 2 were the alternate magnetic fields of 60 Hz respectively.

The maximum strength (absolute value) of the magnetic fields (total magnetic fields generated by each of the magnetic field generating devices 2) generated by the entire cluster fragmenting device 1B was 2000 Gs.

The blowing speed from the fan 9 was 4 m/s. And as the cold gas, cold air was used.

Under the conditions as described above, the freezer 10 was activated. After the temperature inside the freezer main body 101 had reached to −50° C., the objects 5 to be frozen were placed on each of the trays 71 in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

From the start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and the operation of the pump P was appropriately controlled to keep the pressure inside higher than the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled such that, when the value of humidity inside the freezer main body 101 detected by the humidity sensor 12 exceeded 10% RH, it operated, and when the value was 10% RH or less, it stopped the operation.

Example 3

The freezer 10 was manufactured in the same manner as the above-described example 2 except that the cluster fragmenting device 1C in which magnetic field generating devices are disposed as shown in FIG. 9, and using the freezer 10, a packed Chinese noodle was frozen under the same conditions as those in the above-described example 2.

Example 4

The freezer 10 was manufactured in the same manner as the above-described example 2 except that the cluster fragmenting device 1D in which magnetic field generating devices were disposed as shown in FIG. 10, and the freezer 10 was operated under the following conditions.

The generating patterns of the magnetic fields generated by each of the magnetic field generating devices 2 were controlled as shown in FIG. 11. The magnetic fields generated by each of the magnetic field generating devices 2 were the alternate magnetic fields of 60 Hz.

The maximum strength (absolute value) of the magnetic fields (total magnetic fields generated by each of the magnetic field generating devices 2) generated by the entire cluster fragmenting device 1D was 2000 Gs.

The blowing speed from the fan 9 was 4 m/s. And as the cold gas, cold air was used.

Further, when the magnetic fields were generated by the magnetic field generating devices 2, the light with peak wavelength of 420 nm was irradiated continuously at a substantially constant strength from the light irradiating device 26 equipped with a blue-violet light lamp as the light source 261.

Under the conditions as described above, the freezer 10 was activated. After the temperature inside the freezer main body 101 had reached to −50° C., the objects 5 to be frozen were placed on each of the trays 71 in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

From the operation start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and the operation of the pump P was appropriately controlled to keep the pressure inside higher than the pressure outside the freezer 10, by 4000 Pa or more. Further, the content of water vapor contained in the cold gas supplied by the cold gas supply device was $1.0 \times 10^{-4}$ g/L or less.

Further, the dehumidifying device (cold gas supply device) was controlled so as to repeat start and stop every 1-hour.

Example 5

The freezer 10 was manufactured in the same manner as the above-described example 2 except that the cluster fragmenting device 1E in which magnetic field generating devices were disposed as shown in FIG. 13, and the freezer 10 was operated under the following conditions.

The generating patterns of the magnetic fields generated by each of the magnetic field generating devices 2 were controlled as shown in FIG. 12. The magnetic fields generated by each of the magnetic field generating devices 2 were the alternate magnetic fields of 60 Hz.

The maximum strength (absolute value) of the magnetic fields (total magnetic fields generated by each of the magnetic field generating devices 2) generated by the entire cluster fragmenting device 1E was 2000 Gs.

The blowing speed from the fan 9 was 4 m/s. And as the cold gas, cold air was used.

Further, when the magnetic fields were generated from the magnetic field generating devices 2, the light with peak wavelength of 420 nm was irradiated continuously at a substantially constant strength from the light irradiating device 26 equipped with a blue-violet light lamp as the light source 261.

Under the conditions as described above, the freezer 10 was activated. After the temperature inside the freezer main body 101 had reached to −50° C., the objects 5 to be frozen were placed on each of the trays 71 in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

From the operation start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and the operation of the pump P was appropriately controlled to keep the pressure inside higher than the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled such that, when the value of humidity inside the freezer main body 101 detected by the humidity sensor 12 exceeds 20% RH, it operated, and when the value is 20% RH or less, it stopped the operation.

Example 6

The freezer 10 was manufactured in the same manner as the above-described example 5 except that the cluster fragmenting device 1F in which magnetic field generating devices were disposed as shown in FIG. 14, and using the freezer 10, a packed Chinese noodle was frozen under the same conditions as those in the above-described example 5.

Example 7

First of all, the cluster fragmenting device 1G shown in FIG. 16 was manufactured.

As for the component material for the energy imparting device 4, tourmaline was used. In this example, the magnetic field generating devices 2 (nonmagnetic cover) and the energy imparting device 4 were integrally formed. Further, in this example, the constitution of the rotating device 6 was as shown in FIG. 17. Further, in this example, the cluster fragmenting device 1G, which includes the light irradiating device 26 (not shown in FIG. 16) was manufactured. A blue-violet light lamp with peak wavelength of 420 nm, which was equipped with the light source 261, was used as the light irradiating device 26.

Next, using the cluster fragmenting device 1G, the freezer 10 as shown in FIG. 15 was manufactured. Aluminum was used as the component material for the rack (loading part 7).

The freezer 10 obtained as described above was operated under the following conditions.

The generating pattern of the magnetic fields generated by each of the magnetic field generating devices 2 and the pattern of the short-wavelength light generated by the light irradiating device were controlled as shown in FIG. 8. The magnetic fields generated by each of the magnetic field generating devices 2 were the alternate magnetic fields of 60 Hz. The magnetic field generating devices 2 was changed over every 20 cycles per rotation of the objects 5 to be frozen.

The maximum strength (absolute value) of the magnetic fields (total magnetic fields generated by each of the magnetic field generating devices 2) generated by the entire cluster fragmenting device 1G was 2000 Gs.

The blowing speed from the fan 9 was 4 m/s. And as the cold gas, cold air was used.

The rotation of the table by the rotating device 6 was controlled in such a way that after forward turn at 1.67 rpm (10°/sec) for 20 seconds, the rotation was stopped for 5 seconds, and then, inverse turn was made at 1.67 rpm for 20 seconds, which was repeated.

Under the conditions as described above, the freezer 10 was activated. After the temperature inside the freezer main body 101 had reached to −50° C., the objects 5 to be frozen were placed on the table of the rotating device 6, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

From the operation start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and the operation of the pump P was appropriately controlled to keep the pressure inside higher than the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled such that when the value of humidity inside the freezer main body 101 detected by the humidity sensor 12 exceeded 20% RH, it operated, and when the value was 20% RH or less, it stopped the operation.

Example 8

The freezer 10 was manufactured in the same manner as the above-described example 7 except that it was arranged so that, as shown in the figure, the entire of the rack (loading part 7) on which the objects 5 to be frozen were placed was rotated by the rotating device 6. Then, using the freezer 10, under the same conditions as those in the above-described example 7, a packed Chinese noodle was frozen.

Example 9

First of all, the freezer 15 shown in. FIG. 19 and FIG. 20 was manufactured.

The length of the tunnel section 18 was 15 m. Further, in the vicinity of the entrance and the exit of the tunnel section 18, a curtain formed of a rubber material was disposed respectively.

Further, in this example, by coating the energy imparting device 4 on the outer surface side of the magnetic field generating devices 2, the magnetic field generating devices 2 and the energy imparting device 4 were integrally formed. As the component material for the nonmagnetic cover 22, acrylic resin was used. Further, the energy imparting device 4 were formed by splaying tourmaline dispersed with melted acrylic resin over the outer surface of the magnetic field generating devices 2

Plural magnetic field generating devices 2 was disposed on the upper portion of the inner surface of the tunnel section 18. Further, these magnetic field generating devices 2 were dispose at 50 cm intervals in the longitudinal direction of the tunnel section 18.

The freezer 15 as described above was operated under the following conditions.

First, the heat exchanger 8 was operated to lower the temperature inside the tunnel section 18 (temperature in the vicinity of central area in the longitudinal direction) to −50° C.

The blowing speed from the fan 9 was 4 m/s. And as the cold gas, cold air was used. Further, the content of water vapor of the cold gas supplied by the cold gas supply device was $1.0 \times 10^{-4}$ g/L or less. Further, when cooling (freezing) of the objects to be frozen, the pump P was driven so that the pressure inside the tunnel section (freezing compartment) 18 was $1.07 \times 10^5$ to $8 \times 10^5$ Pa, and a pressure higher than the pressure outside the tunnel section (freezing compartment) 18 by 4000 Pa or more was maintained.

Further, the dehumidifying device (cold gas supply device) was controlled to repeat start and stop every one-hour.

Then, plurality of objects 5 to be frozen (packed Chinese noodles: 200 g each) were placed on the transport belt 163 in the longitudinal direction at approximately 50 cm intervals.

In the state as described above, the belt conveyer 16 was operated. At this time, the travel speed of the objects 5 to be frozen (transport belt 163) was 1 m/sec.

It was arranged so that, when an object 5 to be frozen reached to the vicinity of the entrance of the tunnel section 18, the sensor 17A detected it and based on the detected information, the magnetic field generating devices 2 started the operation.

The magnetic fields generated by the magnetic field generating devices 2 was the alternate magnetic fields with a frequency of 60 Hz, and the strength of the generated magnetic fields (maximum strength) was 2000 Gs. Further, the distance (shortest distance) between the magnetic field generating devices 2 and the objects 5 to be frozen was 20 cm.

Further, when generating the magnetic fields from the magnetic field generating devices 2, the light with a peak wavelength of 420 nm was continuously irradiated at a substantially constant strength from the light irradiating device 26 equipped with a blue-violet light lamp as the light source 261.

It was arranged so that the magnetic field generating devices 2 was stopped the generation of the magnetic fields based on the detected information by the sensors 17A and 17B.

Example 10

First of all, the freezer 15 shown in FIG. 22 and FIG. 23 was manufactured.

That is, freezer 15 was manufacture in the same manner as that in the above-described example 9 excepting the following points, i.e., plural magnetic field generating devices 2 were disposed on the inner periphery surface of the transport belt 163, and further, the permanent magnets 20 were disposed inside the tunnel section 18. Used as the permanent magnets were bonded magnets (specific coercive forth at room temperature $H_{cJ}$: 640 kA/m, product of maximum magnetic energy (BH) max: 102 kJ/m$^3$), which contains rare earth magnetic powder from R-TM-B (R: rare earth element, TM: at least one transition metal element selected from Fe, Co and Ni, B: boron).

In the freezer 15 as described above, each of the objects 5 to be frozen was placed at a position facing to the magnetic field generating devices 2 being interposed by the transport belt 163. The freezer 15 was operated to freeze the objects 5 to be frozen under the same conditions as those in the above-described example 9 excepting the following point, i.e., the magnetic fields generated by the magnetic field generating devices 2 were controlled so as that the alternate magnetic fields with frequency was 100 Hz, and the strength of generated magnetic fields (maximum strength) was 3000 Gs.

Example 11

First of all, the freezer 15 shown in FIG. 24 was manufactured.

That is, the freezer 15 was manufactured in the same manner as that in the above-described example 9 except the following points, i.e., plural first magnetic field generating devices 2E were disposed on the ceiling portion of the tunnel section 18 at 50 cm intervals, and plural second magnetic field generating devices 2F were disposed on the inside periphery surface of the transport belt 163 in the longitudinal direction of the transport belt 163 with 50 cm intervals.

Further, in this example, each outer surface of the first magnetic field generating devices 2E and the second magnetic field generating devices 2F were coated with energy imparting device 4, thereby each of the first magnetic field generating devices 2E and the second magnetic field generating devices 2F were formed integrally with the energy imparting device 4. An acrylic resin was used as the component material for the nonmagnetic cover 22. Further, the energy imparting device 4 was formed by splaying tourmaline dispersed in melted acrylic resin over the outer surface of the magnetic field generating devices 2.

The freezer 15 as described above was operated under the same conditions as those in the above-described example 9 except the following conditions.

That is, it was arranged so that, when the objects 5 to be frozen reached to the vicinity of the entrance of the tunnel section 18, the sensor 17A detected the same; and based on the detected information, the first magnetic field generating devices 2E and the second magnetic field generating devices 2F operated, and the magnetic fields generated by the first magnetic field generating devices 2E were the alternate magnetic fields with a frequency of 60 Hz, and a strength of generated magnetic fields (maximum strength) of 2000 Gs, and the magnetic fields generated by the second magnetic field generating devices 2F were the alternate magnetic fields with a frequency of 100 Hz, and a strength of generated magnetic fields (maximum strength) of 3000 Gs. And further, based on the detected information by the sensors 17A and 17B, the first magnetic field generating devices 2E and the second magnetic field generating devices 2F were arranged to stop generating the magnetic fields. Further, the distance (shortest distance) between the first magnetic field generating devices 2E and the objects 5 to be frozen were 20 cm.

Example 12

First of all, the freezer 23 shown in FIG. 26 was manufactured.

The total length of the spiral transport path disposed in the freezing compartment 24 was 30 m. Further, in the vicinity of entrance and exit of the freezing compartment 24, a curtain formed of rubber material was dispose respectively.

Further, in this example, by coating the energy imparting device 4 on the outer surface side of the magnetic field generating devices 2, the magnetic field generating devices 2 and the energy imparting device 4 were integrally formed. As the component material for the nonmagnetic cover 22, acrylic resin was used. Further, the energy imparting device 4 were formed by splaying tourmaline dispersed with melted acrylic resin over the outer surface of the magnetic field generating devices 2

Plural magnetic field generating devices 2 were disposed on the upper portion of the inner surface of the freezing compartment 24. Further, these magnetic field generating devices 2 were dispose with 50 cm intervals in the longitudinal direction of the freezing compartment 24.

The freezer 15 as described above was operated under the following conditions.

First, the heat exchanger 8 was operated to lower the temperature inside the freezing compartment 24 (temperature in the vicinity of central area in the vertical direction) to −50° C.

Then, plural objects 5 to be frozen (packed Chinese noodles: 200 g each) were placed being interposed by the transport plates on the guide rail 250 along the transport direction with approximately 50 cm intervals.

In the state as described above, the spiral transport path 25 was operated. At this time, the travel speed of the objects 5 to be frozen was 1 m/sec.

It was arranged so that, when an object 5 to be frozen reached to the vicinity of the entrance of the freezing compartment 24, the sensor 17A detected it, and based on the detected information, the magnetic field generating devices 2 started the operation.

The magnetic fields generated by the magnetic field generating devices 2 was the alternate magnetic fields with a frequency of 60 Hz, and the strength of the generated magnetic fields (maximum strength) of 2000 Gs. Further, the distance (shortest distance) between the magnetic field generating devices 2 and the objects 5 to be frozen was 20 cm.

Further, when generating the magnetic fields from the magnetic field generating devices 2, the light with a peak wavelength of 420 nm was continuously irradiated at a substantially constant strength from the light irradiating device 26 equipped with a blue-violet light lamp as the light source 261.

The blowing speed from the fan 9 was 4 m/s. And as the cold gas, cold air was used. Further, the content of water vapor of the cold gas supplied by the cold gas supply device was $1.0 \times 10^{-4}$ g/L or less. Further, when cooling (freezing) of the objects to be frozen, the pump P was driven so that the pressure inside the freezing compartment 24 was $1.07 \times 10^5$ to $8 \times 10^5$ Pa, and a pressure inside was kept higher than the pressure outside the freezing compartment 24 by 4000 Pa or more.

Further, the dehumidifying device 11 (cold gas supply device) was controlled to repeat start and stop every one-hour.

Further, it was arranged so that the magnetic field generating devices 2 were stopped to generate the magnetic fields based on the detected information by the sensors 17A and 17B.

Example 13

First of all, the cluster fragmenting device 1B shown in FIG. 6 was manufactured in the same manner as that in the above-described example 2.

Next, using the cluster fragmenting device 1B, the freezer 10 shown in FIG. 27 was manufactured. As for the component material for the rack (loading part 7), aluminum was used.

The freezer 10 obtained as described above was operated under the following conditions.

The generating pattern of the magnetic fields generated by each of the magnetic field generating devices 2 and the generating pattern of minus ions generated by the minus ion generating devices 27 were controlled as shown in FIG. 29. The magnetic fields generated by each of the magnetic field generating devices 2 were the alternate magnetic fields of 60 Hz.

The maximum strength (absolute value) of the magnetic fields (total magnetic fields generated by each of the magnetic field generating devices 2) generated by the entire cluster fragmenting device 1B was 2000 Gs.

Further, in the minus ion generating device 27, the angle formed by discharge electrodes was set to 30°, and the applied voltage was set to −5 kV.

Further, when generating the magnetic fields from the magnetic field generating devices 2, the light with a peak wavelength of 420 nm was continuously irradiated at a substantially constant strength from the light irradiating device 26 equipped with a blue-violet light lamp as the light source 261.

The blowing speed from the fan 9 was 4 m/s. And as the cold gas, cold air was used.

Under the conditions as described above, the freezer 10 was activated. After the temperature inside the freezer main body 101 had reached to −50° C., the objects 5 to be frozen were placed on each of the trays 71 in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

From the operation start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and the operation of the pump P was appropriately controlled to keep the pressure inside higher than the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled such that when the value of humidity inside the freezer main body 101 detected by the humidity sensor 12 exceeded 20% RH, it operated, and when the value was 20% RH or less, it stopped the operation.

Example 14

First of all, the cluster fragmenting device 1B shown in FIG. 6 was manufactured in the same manner as that in the above-described example 2.

Further, vibration members 284 were manufactured in such a manner that tourmaline fine particles (average particle diameter=1 μm) which were used as the fine particles 2842 composed of substance capable of generating minus ions were held in a mesh (base member 2841) formed of a cellulolytic fiber. Further, by hanging the vibration member 284 from the ceiling portion of the case 283 formed of aluminum, the minus ion generating device 28 as shown in FIG. 32 was obtained.

Next, using the cluster fragmenting device 28, the freezer 10 shown in FIG. 31 was manufactured. As for the component material for the rack (loading part 7), aluminum was used.

The freezer 10 obtained as described above was operated under the same conditions as those of the above-described example 13. As the objects 5 to be frozen, a packed Chinese noodle (200 g) was used.

Example 15

First of all, the cluster fragmenting device 1B shown in FIG. 6 was manufactured in the same manner as that in the above-described example 2.

Then, using the cluster fragmenting device 1B, the freezer 10 shown in FIG. 33 was manufactured. As for the component material for the rack (loading part 7), aluminum was used.

The manufactured freezer 10 comprised a weight meter 32 for measuring the weight of the objects 5 to be frozen in the loading part 7, a measure 29 for measuring the thickness and a temperature sensor 30 for measuring the temperature in the vicinity of the surface of the objects 5 to be frozen before having been placed inside the freezer main body 101. And further, the freezer 10 comprises a calculating section for calculating a predetermined period of time T in which the magnetic fields of a predetermined strength were imparted to the objects 5 to be frozen based on these values. In the freezer 10, it was arranged so that the weight of the objects 5 to be frozen placed in the loading part 7, the thickness and temperature in the vicinity of the surface the objects 5 to be frozen before having been placed inside the freezer main body 101 were measured automatically, and these measured value were inputted to the calculating section to calculate the predetermined period of time T.

In the freezer 10 of this example, it was arranged so that, when the objects 5 to be frozen were placed inside the freezer main body 101, the alternate magnetic fields of a predetermined strength were generated from the magnetic field generating devices 2, and at a point of time when a predetermined period of time T had elapsed, the magnetic field generating devices 2 were controlled to stop the generation of the magnetic fields.

The freezer 10 obtained as described above was operated under the following conditions.

First of all, the heat exchanger 8, the cold gas supply device (the dehumidifying device 11 and the fan 9) and the cluster fragmenting device 1B were operated, and the temperature inside the freezer main body 101 was lowered to −50° C. At this time, the magnetic fields generated by each of the magnetic field generating devices 2 were alternate magnetic fields of 60 Hz, and the maximum strength (absolute value) of the magnetic fields generated by the entire cluster fragmenting device 1B was controlled so as to be 2000 Gs.

Further, when the magnetic fields were generated from the magnetic field generating devices 2, from the light irradiating device (not shown) equipped with a blue-violet light lamp, the light with a peak wavelength of 420 nm was continuously irradiated at a substantially constant strength.

The blowing speed from the fan 9 was 4 m/s. And as the cold gas, cold air was used.

After the temperature inside the freezer main body 101 had reached to −50° C., the objects 5 of 20° C. to be frozen were placed on each of the trays in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

The generation of the magnetic fields from the magnetic field generating devices 5 was stopped after 20 minutes (predetermined period of time T) had passed from a point of time when the objects 5 to be frozen had been placed inside the freezer main body 101.

From the operation start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and the operation of the pump P was appropriately controlled to keep the pressure inside higher than the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled such that when the value of humidity inside the freezer main body 101 detected by the humidity sensor 12 exceeded 20% RH, it operated, and when the value was 20% RH or less, it stopped the operation.

Example 16

The objects 5 to be frozen placed inside the freezer main body 101 were imparted with alternate magnetic fields with the maximum strength (absolute value) of 2000 Gs and a frequency of 60 Hz for a predetermined period of time T [minute], and after the time T elapsed the magnetic field generating device was controlled so that the maximum strength of alternate magnetic field was 800 Gs. In the same manner as the example 15 except these points mentioned above, packed Chinese noodle (200 g) was frozen. The predetermined period of time T was 20 minutes.

Example 17

First of all, the freezer 10, which has the same constitution as that of the freezer 10 in the above-described example 15, was manufactured.

The manufactured freezer 10 comprised a weight meter 32 for measuring the weight of the objects 5 to be frozen in the loading part 7, a measure 29 for measuring the thickness and a temperature sensor 30 for measuring the temperature in the vicinity of the surface of the objects 5 to be frozen. And further, the freezer 10 comprised a calculating section for calculating a predetermined value Ts based on these values. In the freezer 10, it was arranged so that the weight of the objects 5 to be frozen placed in the loading part 7, the thickness and the temperature in the vicinity of the surface were measured automatically, and these measured value were inputted to the calculating section to calculate the value Ts.

In the freezer 10 of this example, it was arranged so that, when the objects 5 to be frozen were placed inside the freezer main body 101, the alternate magnetic fields of a predetermined strength were generated from the magnetic field generating devices 2, and at a point when the temperature in the vicinity of the surface of the objects 5 to be frozen had reached to −40° C. (predetermined value Tc), the magnetic field generating devices 2 were controlled to stop the generation of the magnetic fields.

The freezer 10 obtained as described above was operated under the following conditions.

First of all, the heat exchanger 8, the cold gas supply device (the dehumidifying device 11 and the fan 9) and the cluster fragmenting device 1B were operated, and the temperature inside the freezer main body 101 was lowered to −50° C. At this time, the magnetic fields generated by each of the magnetic field generating devices 2 were alternate magnetic fields of 60 Hz, and the maximum strength (absolute value) of the magnetic fields generated by the entire cluster fragmenting device 1B was controlled so as to be 2000 Gs.

Further, when generating the magnetic fields from the magnetic field generating devices 2, the light with a peak wavelength of 420 nm was continuously irradiated at a substantially constant strength from the light irradiating device 26 equipped with a blue-violet light lamp as the light source 261.

The blowing speed from the fan 9 was 4 m/s. And as the cold gas, cold air was used.

After the temperature inside the freezer main body 101 had reached to −50° C., the objects 5 of 20° C. to be frozen were placed on each of the trays in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

The generation of the magnetic fields from the magnetic field generating devices 5 was stopped at a point of time when the temperature in the vicinity of the surface of the objects 5 to be frozen reaches −40° C. (predetermined value Tc).

From the operation start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and maintained at a higher pressure compared to the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled such that when the value of humidity inside the freezer main body 101 detected by the humidity sensor 12 exceeded 20% RH, it operated, and when the value was 20% RH or less, it stopped the operation.

Example 18

When the objects 5 to be frozen was placed inside of the freezer main body, the alternate magnetic fields with the maximum strength (absolute value) 2000 Gs, and a frequency of 60 Hz were set to be generated from the magnetic field generating devices, and a packed Chinese noodle (200 g) was frozen in the same manner as that in the above-described example 15 except that the alternate magnetic fields were controlled so that the maximum strength thereof was 800 Gs at a point of time when the temperature in the vicinity of the surface of the objects 5 to be frozen reached to −40° C. (predetermined value Tc).

Example 19

First of all, the freezer 10, which has the same constitution as that of the freezer 10 in the above-described example 17, was manufactured.

The manufactured freezer 10 comprised a weight meter 32 for measuring the weight of the objects 5 to be frozen in the loading part 7, a measure 29 for measuring the thickness and a calculating section for calculating the temperature Tc in the vicinity of the central area of the surface of the objects 5 to be frozen estimated from the values measured by the temperature sensor 30, which measured the temperature in the vicinity of the surface of the objects 5 to be frozen. In the freezer 10, it was arranged so that the weight of the objects 5 to be frozen placed in the loading part 7, the thickness and the temperature in the vicinity of the surface were measured automatically, and these measured values were inputted to the calculating section to calculate the temperature Tc in the vicinity central area of the surface of the objects 5 to be frozen.

In the freezer 10 of this example, it was arranged so that, when the objects 5 to be frozen were placed inside the freezer main body 101, the alternate magnetic fields of a predetermined strength were generated from the magnetic field generating devices 2, and at a point when the difference (Tc−Ts) between the estimated value Tc of the temperature in the vicinity of the central area of the objects 5 to be frozen and the temperature Ts in the vicinity of the surface reaches to 20° C., the magnetic field generating devices 2 were controlled to stop the generation of the magnetic fields.

The freezer 10 obtained as described above was operated under the following conditions.

First of all, the heat exchanger 8, the cold gas supply device (the dehumidifying device 11 and the fan 9) and the cluster fragmenting device 1B were operated, and the temperature inside the freezer main body 101 was lowered to −50° C. At this time, the magnetic fields generated by each of the magnetic field generating devices 2 were alternate magnetic fields of 60 Hz, and the maximum strength (absolute value) of the magnetic fields generated by the entire cluster fragmenting device 1B was controlled so as to be 2000 Gs.

Further, when generating the magnetic fields from the magnetic field generating devices 2, the light with a peak wavelength of 420 nm was continuously irradiated at a substantially constant strength from the light irradiating device 26 equipped with a blue-violet light lamp as the light source 261.

The blowing speed from the fan 9 was 4 m/s. And as the cold gas, cold air was used.

After the temperature inside the freezer main body 101 had reached to −50° C., the objects 5 of 20° C. to be frozen were placed on each of the trays in the loading part 7, and the objects 5 were frozen. At this time, the distance (shortest distance) between the magnetic field generating devices 2 and the objects 5 to be frozen was 5 cm. Packed Chinese noodle (200 g) was used as the objects 5 to be frozen.

The generation of the magnetic fields from the magnetic field generating devices 5 was stopped at a point when the difference (Tc−Ts) between the estimated value Tc of the temperature in the vicinity of the central area of the objects 5 to be frozen and the temperature Ts in the vicinity of the surface reaches to 20° C.

From the operation start point of the freezer 10, the pump P was driven for a predetermined time (1 hour) to take in the air from the outside of the freezer 10. The pressure inside the freezer main body 101 was controlled so as to be higher than the outside pressure. Thus, during the operation of the freezer 10, the pressure inside the freezer main body 101 was maintained at $1.07 \times 10^5$ to $8 \times 10^5$ Pa, and kept at a higher pressure compared to the pressure outside the freezer 10 by 4000 Pa or more. Further, the content of water vapor contained in the cold gas supplied by the cold gas supply device was $1.0 \times 10^{-4}$ g/L or less.

Further, the cold gas supply device (dehumidifying device) was controlled so as, when the value of humidity inside the freezer main body 101 detected by the humidity sensor 12 exceeded 20% RH, it operated, and when the value was 20% RH or less, it stopped the operation.

Example 20

When the objects 5 to be frozen was placed inside of the freezer main body, the alternate magnetic fields with the maximum strength (absolute value) 2000 Gs, and a frequency of 60 Hz were set to be generated from the magnetic field generating devices 2, and a packed Chinese noodle (200 g) was frozen in the same manner as that in the above-described example 15 except that the alternate magnetic fields were controlled so that the maximum strength thereof was 800 Gs at a point of time when the difference (Tc−Ts) between the estimated value Tc of the temperature in the vicinity of the central area of the objects 5 to be frozen and the temperature Ts in the vicinity of the surface is 20° C.

Comparative Example 1

The objects to be frozen were frozen in the same manner as that in the above-described example 1 excepting that the freezer was not equipped with the cluster fragmenting device or the dehumidifying device (cold gas supply device).

Comparative Example 2

Using a freezer, which had the same constitution as that in the above-described example 1 except that the magnetic field control device and the dehumidifying device (cold gas supply device) were not provided, the objects were frozen in the same manner as in the above-described example 1 excepting that steady state magnetic fields of a constant strength were generated continuously from each of the magnetic field generating devices.

Evaluation

Chinese noodles, which were frozen using the respective freezers of the above-described examples and comparison examples, were stored in freezers for three months (examples 1 to 8, examples 13 to 20 and comparison examples 1 and 2: the objects to be frozen were stored for three months in the freezers which were used for freezing the objects; examples 9 to 12: the objects (frozen objects) were frozen by the freezer of each example, and then, swiftly transferred to the freezing compartment of a commercially available freezing device (temperature inside the freezing compartment: −50° C.) and stored for 3 months). And then, these Chinese noodles were unfrozen. Then, the unfrozen Chinese noodles were cooked under the same conditions.

The quality (flavor, appearance, fragrance and the like) of the cooked Chinese noodles was evaluated. The results are shown in Table 1.

TABLE 11

| | Evaluation |
|---|---|
| Example 1 | No change was found in appearance. Little difference was found in texture and taste compared with non-frozen foods. |
| Example 2 | No change was found in appearance. Little difference was found in texture and taste compared with non-frozen foods. |
| Example 3 | No change was found in appearance. Little difference was found in texture and taste compared with non-frozen foods. |
| Example 4 | No change was found in appearance. Little difference was found in texture and taste compared with non-frozen foods. |
| Example 5 | No change was found in appearance. Little difference was found in texture and taste compared with non-frozen foods. |
| Example 6 | No change was found in appearance. No difference was found in texture and taste compared with non-frozen foods. |
| Example 7 | No change was found in appearance. No difference was found in texture and taste compared with non-frozen foods. |
| Example 8 | No change was found in appearance. No difference was found in texture and taste compared with non-frozen foods. |
| Example 9 | No change was found in appearance. No difference was found in texture and taste compared with non-frozen foods. |
| Example 10 | No change was found in appearance. No difference was found in texture and taste compared with non-frozen foods. |
| Example 11 | No change was found in appearance. No difference was found in texture and taste compared with non-frozen foods. |
| Example 12 | No change was found in appearance. No difference was found in texture and taste compared with non-frozen foods. |
| Example 13 | No change was found in appearance. No difference was found in texture and taste compared with non-frozen foods. |
| Example 14 | No change was found in appearance. No difference was found in texture and taste compared with non-frozen foods. |
| Example 15 | Even after having been unfrozen, good flavor, appearance and fragrance were obtained. From the point when the magnetic field generation was stopped onwards, freezing proceeded swiftly. |
| Example 16 | Even after having been unfrozen, good flavor, appearance and fragrance were obtained. From the point when the magnetic field generation was reduced onwards, freezing proceeded swiftly. |
| Example 17 | Even after being unfrozen, good flavor, appearance and fragrance were obtained. From the point when the magnetic field generation was stopped onwards, freezing proceeded swiftly. |
| Example 18 | Even after having been unfrozen, good flavor, appearance and fragrance were obtained. From the point when the magnetic field generation was reduced onwards, freezing proceeded swiftly. |
| Example 19 | Even after having been unfrozen, good flavor, appearance and fragrance were obtained. From the point when the magnetic field generation was stopped onwards, freezing proceeded swiftly. |
| Example 20 | Even after being unfrozen, good flavor, appearance and fragrance were obtained. From the point when the magnetic field generation was reduced onwards, freezing proceeded swiftly. |
| Comparative Example 1 | Noodles became thicker. Compared to non-frozen food, both texture and taste were largely deteriorated. |
| Comparative Example 2 | Noodles became thicker. Compared to non-frozen food, both texture and taste were deteriorated. |

As demonstrated in Table 1, the Chinese noodles (frozen objects), which were frozen using the freezers in examples 1 to 20, were found that satisfactory quality was maintained after being unfrozen. The reason of this is conceivable as described below.

That is, the objects to be frozen were placed under low temperature conditions inside the freezing apparatus (freezer), and frozen. At this time, owing to the influence of the cluster fragmenting device (magnetic field generating devices), the water clusters in the objects to be frozen are fragmented. Particularly, since the freezer of the present invention is equipped with a cold gas supply device for supplying cold gas with content of vapor less than the ambient air outside the freezer, the effect by the cluster fragmenting device (magnetic field generating devices) and the effect by the cold gas supply device act multi-effectively, the water clusters in the Chinese noodles as the objects to be frozen can be cooled down (frozen) in a further efficiently fragmented state.

Accordingly, the objects to be frozen are frozen in a state that the water clusters are fragmented. As a result, the crystals of ice formed in the objects to be frozen are fragmented.

In this way, since the crystals of ice are fragmented, the ice is prevented or restrained efficiently from growing up. Owing to this, it is possible to efficiently prevent or restrain the change of microscopic structure of the above-described objects to be frozen due to grown-up ice from the structure before freezing (the cells constituting the objects to be frozen can be efficiently prevented from being destroyed). As a result, the quality of foods can be prevented or restrained efficiently from being deteriorated.

Further, in the examples 1 to 20, frost inside the freezer (freezing compartment) was efficiently prevented from being generated or accumulated.

Further, in the examples 15 to 20, the freezing proceeded swiftly from a point of time when the magnetic fields from the magnetic field generating devices 2 was stopped or reduced, thus, the period of time up to the objects to be frozen had been frozen was reduced. Further, in the examples 15 to 20, since the magnetic fields from the magnetic field generating devices were discontinued or reduced in the midway, the power consumption of the freezer 10 was also reduced.

To the contrary, in the objects frozen in each comparison example, as shown in Table 1, the quality after unfreezing was largely deteriorated. Particularly, in the object (frozen object), which was frozen using the freezer in the comparison example 1, the deterioration of the quality after unfreezing was extremely remarkable. It is conceivable that it was caused by grown-up ice formed by freezing. That is, such ice largely changes the microscopic structure of the above-described objects from the structure before freezing (it is conceivable that cells constituting the objects to be frozen are destroyed).

Further, in the respective comparison examples, accumulation of frost on the inner surface of the freezer (freezing compartment) and the surface of the objects was clearly found. Further, in the respective comparison examples, there was a big difference of color tone between portions of the objects where the frost accumulated and portions of the objects where the frost did not accumulate.

Further, Chinese noodles without freezing process (30 days later from the manufacturing date of the Chinese noodles which were frozen by the freezers of the above-described examples and comparison examples, the Chinese noodles were manufactured, and then kept under the condition of temperature of 4° C., and the humidity of 30% RH) were cooked in the same manner as the above-described manner. The Chinese noodles cooked as above were still placed for 1 hour at a room temperature along with the Chinese noodles of the above-described examples and comparison examples. After that, the flavor and appearance were evaluated.

As a result, compared to the state immediately after cooking, the Chinese noodles which were frozen by the freezers in the examples 1 to 20, exhibited little deterioration in flavor and appearance. To the contrary, in the Chinese noodles which were frozen by the freezers of each comparison example, and the Chinese noodles which were not frozen, the flavor and appearance were remarkably deteriorated, so to speak "loosed noodles" state. It is conceivable that the reason of this is as follows.

That is, in case that the freezers of the present invention is used, noodles of the objects to be frozen are frozen in the state that the water clusters are fragmented, and thus the crystals of ice formed in the objects are fragmented. Owing to this, even after being frozen, the microscopic structure of the objects to be frozen can be satisfactorily maintained in the state as before freezing (cells constituting objects are prevented or restrained from being destroyed). Further, even after being unfrozen, the water clusters contained in the objects to be frozen are maintained in the fragmented state. Owing to this, during and/or after being cooked, even when the objects come into contact with water having relatively large clusters, the following phenomena hardly occurs, i.e., water having small size clusters contained in the noodles is replaced with outside water having large size clusters, or outside moisture is absorbed excessively, etc. Accordingly, even when the noodles, which are frozen using a freezer of the present invention, are left behind for a long period of time after cooking, compared to the state before cooking, the moisture content is restrained from large increase.

To the contrary, noodles frozen by the freezers referred to as comparison examples or noodles without freezing tend to absorb outside moisture easily, since the size of water clusters contained are large, therefore during and/or after cooking etc, the moisture content tends to increase. Accordingly, when the objects are left behind for a long period of time after cooking, the object is apt to get into the state of, so to speak, "loosen noodles".

Examples 21 to 40

Except that spinach (200 g each) was used as the objects to be frozen, the freezing was carried out under the same conditions as those in the above-described examples 1 to 20.

Frozen spinach by means of the freezers in the examples 21 to 40, was stored for 150 days in the freezers, and then, unfrozen to cook under the same conditions respectively.

As a result of evaluation of cooked spinach quality (flavor, appearance, fragrance and/or the like), which was performed in the same manner as above-described, substantially the same results as described in the Table 1 were obtained.

Further, packed pasta (boiled as al dente) was frozen using the freezers of each above-described example, and then stored them in the same manner as described above. Then, the pasta taken out from the package was unfrozen with boiling water (100° C.), and the quality (texture, flavor, appearance and the like) of the unfrozen pasta was evaluated. As a result, the pasta, which was frozen by the freezers of the examples, maintained the state of al dente even after unfreezing, thus good texture, flavor and appearance were maintained. To the contrary, in the pasta, which was frozen by the freezers of the comparison examples, generally chewy texture of the pasta was lost or texture was largely deteriorated.

Further, using the freezers of the above-described examples and comparison example 1, lumps of pork (100 g each) were frozen. Then, the lumps of pork were stored in the same manner as described above. Then, the lumps of pork were unfrozen using a microwave oven, and the unfrozen lumps of pork were cooked. As a result, the lumps of pork (objects to be frozen), which were frozen using the freezers of the present invention, maintained good quality (flavor, appearance, fragrance and the like) even after unfreezing. To the contrary, lumps of pork (objects to be frozen) frozen by the freezer in the Comparative Example 1, many drips were generated during being unfrozen, and the deterioration in the quality (flavor, appearance, fragrance and the like) was clearly found. Further, during the freezing, the temperature changes with time elapsed in the vicinity of the central area of the objects to be frozen (pork) were measured. As shown in FIG. 35, it was found that the latent heat around the freezing point of water in the freezers of the present invention was small compared to the freezer in the Comparative Example 1. FIG. 35 shows the temperature changes of the objects to be frozen with time elapsed in the case that the freezer in the example 2 was used as the freezer of the present invention. In the cases that the freezers in the example 1 and examples 3 to 20 were used as the freezer of the present invention, substantially the same results were obtained.

Further, using the freezers in each example and comparison example 1 above-described, plural hard type tofu blocks (100 g each) were frozen, and stored in the same manner as described above. Then, the blocks of tofu were unfrozen using a microwave oven. As a result, hard type tofu blocks (objects to be frozen) frozen by the freezers of the present invention preserved good quality (flavor, appearance, fragrance and the like) even after unfreezing. To the contrary, hard type tofu blocks (objects to be frozen) frozen by the freezer in the comparison example 1 showed clear deterioration of quality (flavor, appearance, fragrance and the like). Further, temperature changes in the vicinity of the central area of the objects to be frozen (hard type tofu) with time elapsed during freezing were measured. As shown in FIG. 36, the freezers of the present invention achieved a swifter freezing speed of the objects to be frozen compared to the freezers in the comparison example 1, and the latent heat was extremely small around the freezing point of water, or substantially no latent heat was observed. FIG. 36 shows the temperature changes of the objects to be frozen with time elapsed in the case that the freezer in the example 6 was used as the freezer of the present invention. In the cases that the freezers in the examples 1 to 5 and 7 to 20 were used, substantially the same results were obtained.

Further, the objects to be frozen were frozen in the same manner as described above except that the generated magnetic fields from the magnetic field generating devices 2 was steady state magnetic fields. Then, the frozen objects to be frozen (frozen objects) were stored and cooked in the same manner as described above, and then the same evaluation as described above was made. As a result, no deterioration was found in the flavor and fragrance and satisfactory results were obtained similarly to the above, although the appearance after cooking was slightly deteriorated compared with each example described above.

Further, the objects were frozen in the same manner as described above except that the strength and the frequency of the magnetic fields generated by the magnetic field generating devices 2 was appropriately altered. Then, the objects were stored and cooked in the same manner as described above. The same evaluation as described above was made. As a result, the same results as the above were obtained.

INDUSTRIAL APPLICABILITY

According to the present invention, as described above, a freezer which can prevent or restrain the quality of foods from deterioration can be obtained.

Further, even when the frozen foods are stored for a long period of time, satisfactory quality is preserved.

Further, in case that the objects to be frozen are noodles, a phenomenon of so to speak "loosen noodle" hardly occurs after cooking.

Further, when the frozen foods (particularly, raw foods) are unfrozen, it is possible to efficiently prevent occurrence of drips.

Further, even when the temperature inside the freezing compartment is particularly low (for example, −30° C. or less), frost is hardly accumulated inside the freezing compartment. Accordingly, it is possible to operate continuously for long period of time while preventing or restraining deterioration of the cooling efficiency or the like. Further, since the accumulation of frost is prevented, also the energy efficiency of freezing can be improved.

The invention claimed is:

1. A freezer for freezing an object containing water, which comprises;
   a first and second magnetic field generating device for providing a magnetic field to the object at least during a process of cooling the object,
   a low temperature gas supplying device for supplying low temperature gas containing a lower amount of vapor than atmospheric,
   an ultra sonic wave device or an ultra violet ray irradiating device for the object,
   wherein said first magnetic field generating device moves relative to said object and said second magnetic field generating device does not move relative to said object, wherein said first and second magnetic field generating devices change strength of the magnetic field periodically.

2. The freezer according to claim 1, wherein a magnetic field received by said object is varied in two or three dimensions.

3. The freezer according to claim 1, wherein said low temperature gas supplying device provides a dehumidify device for removing humidity.

4. The freezer according to claim 1, wherein said low temperature supplying device maintains inner pressure of said freezer over those out side thereof.

5. The freezer according to claim 1, further comprising the freezing room for freezing the object, transporting path run through the freezing room, and transporting device for transporting the object along said transporting path, wherein said first magnetic field generating device is provided in the freezing room and provides magnetic field for the object.

6. The freezer according to claim 5, wherein said second magnetic field generating device is moved together with transport by the transporting device.

7. The freezer according to claim 5, wherein said transporting path shows coil like shape.

8. The freezer according to claim 5, wherein a shape of said freezing room is of tunnel shape.

9. The freezer according to claim 1, wherein a device generates a constant magnetic field having constant magnetic field strength.

10. The freezer according to claim 1, wherein a magnetic field generating timing at least from one of the magnetic field generating device is controlled to be different from those from other magnetic field generating device on freezing operation.

11. The freezer according to claim 1, comprising three magnetic field generating devices, wherein a magnetic field generating timing from at least two of the magnetic field generating devices are controlled to be different from those from other magnetic field generating device on freezing operation.

12. The freezer according to claim 1, comprising three magnetic field generating devices, wherein a magnetic field generating timing from at least two of the magnetic field generating devices are controlled to be synchronized to each other, and different from those from other magnetic field generating device on freezing operation, a combination of these two or more magnetic field generating device, which are synchronized in generating timing, are periodically changed.

13. The freezer according to claim 1, wherein at least two magnetic field generating devices are positioned to be faced each other.

14. The freezer according to claim 1, wherein an opposed faces in said magnetic field generating devices are positioned in crossing with right angle.

15. The freezer according to claim 1, further comprising a loading part for loading the object, wherein the magnetic field generation from the magnetic field generating is controlled so as to revolve a magnetic line in the vicinity of the object.

16. The freezer according to claim 1, which further comprising a loading part for loading the object heat exchanger and circulating device for circulating said low temperature gas.

17. The freezer according to claim 1, which comprises said magnetic field generating devices are provided at the loading part and in the vicinity thereof.

18. The freezer according to claim 1, which comprises a device for generating alternate magnetic field.

19. The freezer according to claim 1, wherein said object is frozen under the state that water cluster in the object is pulverized.

20. The freezer according to claim 1, wherein a temperature in the freezer in operation is −20° C. or lower.

21. The freezer according to claim 1, wherein said magnetic field generating device shows low temperature resistance.

22. The freezer according to claim 1, wherein said object to be frozen is food.

23. The freezer according to claim 1, wherein said low temperature gas supplying device has a function for preventing frost in the freezer.

24. The freezer according to claim 1, wherein said low temperature gas supplying device works for start and stop periodically.

25. The freezer according to claim 1, which comprises humidity detecting device for detecting humid in the freezer, to control an operation for said low temperature supplying device.

26. A method for freezing the object to be frozen using the freezer according to claim 1.

27. A method for freezing an object to be frozen comprising supplying low temperature gas containing less moisture than atmospheric into a freezer in a process for freezing the object, irradiating ultra sonic wave or ultra violet ray or both to the object, and providing a magnetic field from a first magnetic field generating device, which generates said magnetic field during transporting of the object, and second magnetic field generating device, wherein direction of the magnetic line received by the object is periodically changed in more than two directions.

28. The method for freezing the object according to claim 27, wherein said low temperature gas is air, which is dehumidified.

29. The method for freezing the object according to claim 27, wherein a strength of the magnetic field is periodically varied in at least freezing process for the object.

30. The method for freezing the object according to claim 27, wherein a pressure in the freezing room is maintained so as to be over those in the out side of the freezing room.

31. The method for freezing the object according to claim 27, wherein the object receives said magnetic field during transporting along with the transporting path, provided in the freezing room.

32. The method for freezing the object according to claim 27, wherein said magnetic field generating device is moved accompany with the transport by the second magnetic field generating device.

33. The method for freezing the object according to claim 27, wherein said transporting path forms spiral shape in the freezing room.

34. The method for freezing the object according to claim 27, wherein a shape of the freezing room is of tunnel like.

35. The method for freezing the object according to claim 27, wherein a timing for generating magnetic field from at least one of the magnetic field generating device is controlled to be different from those generated in other magnetic field generating device.

36. The method for freezing the object according to claim 35, which comprises generating magnetic field from at least one of the three magnetic field generating device, controlling the magnetic field generating timing from at least two magnetic field generating device so as to be different from at least one of the other magnetic field generating device.

37. The method for freezing the object according to claim 35, comprising three magnetic field generating devices, wherein the magnetic field generating timing from at least two of the magnetic field generating devices are synchronized, and those from other magnetic field generating devices is different, and a combination of two or more magnetic field generating devices are periodically changed.

38. The method for freezing the object according to claim 27, comprising a loading part for loading the object, wherein a magnetic field generation from the magnetic field generating devices is controlled so as to be direction of the magnetic line being rotated.

39. The method for freezing the object according to claim 27, wherein the device for generating alternate magnetic field is generated, is used.

40. The method for freezing the object according to claim 27, wherein said object is frozen under the state that water cluster in the object is pulverized.

41. The method for freezing the object according to claim 27, wherein said object is food.

42. A frozen product, characterized by being prepared by using freezer according to claim 1.

43. A frozen product, characterized by being prepared by freeing method according to claim 27.

* * * * *